United States Patent
Yoshioka

(10) Patent No.: US 11,776,735 B2
(45) Date of Patent: Oct. 3, 2023

(54) INDUCTOR COMPONENT AND DC-DC CONVERTER

(71) Applicant: Murata Manufacturing Co., Ltd., Kyoto-fu (JP)

(72) Inventor: Yoshimasa Yoshioka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 313 days.

(21) Appl. No.: 17/389,740

(22) Filed: Jul. 30, 2021

(65) Prior Publication Data

US 2022/0037078 A1   Feb. 3, 2022

(30) Foreign Application Priority Data

Jul. 31, 2020   (JP) .................. 2020-130352

(51) Int. Cl.
*H02M 3/155* (2006.01)
*H01F 27/28* (2006.01)
*H01F 41/04* (2006.01)
*H01F 27/24* (2006.01)

(52) U.S. Cl.
CPC ......... *H01F 27/2823* (2013.01); *H01F 27/24* (2013.01); *H01F 41/04* (2013.01); *H02M 3/155* (2013.01)

(58) Field of Classification Search
CPC ...... H01F 27/2823; H01F 27/24; H01F 41/04; H01M 3/155
See application file for complete search history.

(56) References Cited

U.S. PATENT DOCUMENTS

| | | | |
|---|---|---|---|
| 2022/0059282 A1* | 2/2022 | Yoshioka | H01F 27/292 |
| 2022/0310293 A1* | 9/2022 | Kawakami | H01F 5/00 |
| 2022/0310311 A1* | 9/2022 | Tominaga | H01F 17/04 |

FOREIGN PATENT DOCUMENTS

JP      2013-211330 A    10/2013

* cited by examiner

*Primary Examiner* — Adolf D Berhane
(74) *Attorney, Agent, or Firm* — Studebaker & Brackett PC

(57) ABSTRACT

An inductor component includes an air core coil in which an air core inductor wire is provided in an air core body containing a non-magnetic material, and a magnetic core coil in which a magnetic core inductor wire is provided in a magnetic core body containing a magnetic material. The air core body and the magnetic core body are combined or integrated. A magnetic material content in a peripheral region around the air core inductor wire is lower than 50%. The magnetic material content in a peripheral region around the magnetic core inductor wire is higher than or equal to 50%.

20 Claims, 20 Drawing Sheets

INDUCTOR COMPONENT AND DC-DC CONVERTER

CROSS-REFERENCE TO RELATED APPLICATION

This application claims benefit of priority to Japanese Patent Application No. 2020-130352, filed Jul. 31, 2020, the entire content of which is incorporated herein by reference.

BACKGROUND

Technical Field

The present disclosure relates to an inductor component and a DC-DC converter including the inductor component.

Background Art

Japanese Unexamined Patent Application Publication No. 2013-211330 describes an example of an inductor component having a plurality of inductor wires in a main body containing a magnetic material. The inductor component is an array inductor component in which inductor wires are not electrically connected to one another.

SUMMARY

The operating frequency of a DC-DC converter is commonly several hundreds of kilohertz to several megahertz, and the operating frequency of a DC-DC converter is relatively low for a circuit that uses an inductor component. In addition, in a DC-DC converter, a relatively large inductance is desired for an inductor component. Therefore, an inductor having a structure in which a magnetic flux generated by energizing the inductor wires passes through a magnetic material, as in the case of the above-described inductor component, is employed as a power inductor used in a DC-DC converter. With the thus configured inductor component, an inductance acquisition efficiency that is the inductance of the inductor component per unit volume is improved by the passage of a magnetic flux through a magnetic material. As a result, a high-inductance, small-size, and low-cost inductor component is achieved.

On the other hand, an inductor component having a structure in which a magnetic flux passes through a magnetic material has such a direct-current superposition characteristic that, as a current input to the inductor wires increases, the magnetic material approaches magnetic saturation to cause a magnetic permeability to decrease and, as a result, the inductance decreases. When the inductance decreases in this way, there may be a case where the efficiency of the DC-DC converter decreases or a case where normal operation of the DC-DC converter cannot be maintained. For this reason, for a DC-DC converter, an appropriate inductor component needs to be selected in consideration of a maximum current flowing through inductor wires. However, it is difficult to achieve both high saturation magnetic flux density and a high magnetic permeability in a magnetic material, so, in a DC-DC converter with a large load current, an inductor component that sacrifices at least one of the inductance, outer size, and cost is used.

Accordingly, the present disclosure provides an inductor component capable of supporting a large current while having an inductor with a high inductance acquisition efficiency, and a DC-DC converter including the inductor component.

According to preferred embodiments of the present disclosure, an inductor component includes an air core coil that includes an air core body containing a non-magnetic material, an air-core inductor wire provided in the air core body and extending along a predetermined plane, a first air core outer terminal electrically connected to a first end portion of the air core inductor wire, and a second air core outer terminal electrically connected to a second end portion of the air core inductor wire; and a magnetic core coil that includes a magnetic core body containing a magnetic material, a magnetic core inductor wire provided in the magnetic core body and extending parallel to the predetermined plane, a first magnetic core outer terminal electrically connected to a first end portion of the magnetic core inductor wire, and a second magnetic core outer terminal electrically connected to a second end portion of the magnetic core inductor wire. The first air core outer terminal, the second air core outer terminal, the first magnetic core outer terminal, and the second magnetic core outer terminal are each exposed at a first main surface. In a predetermined cross section taken along a direction perpendicular to a direction in which the air core inductor wire or the magnetic core inductor wire extends, a direction parallel to the predetermined plane is defined as a width direction, a direction perpendicular to the predetermined plane is defined as a thickness direction, a dimension in the width direction of the air core inductor wire or the magnetic core inductor wire in the predetermined cross section is defined as a wire width, and a dimension in the thickness direction of the air core inductor wire or the magnetic core inductor wire in the predetermined cross section is defined as a wire thickness. In the predetermined cross section, an imaginary straight line passing through a portion spaced the wire width apart in the width direction from a first end in the width direction of the air core inductor wire or the magnetic core inductor wire and extending in the thickness direction is defined as a first straight line. In the predetermined cross section, an imaginary straight line passing through a portion spaced the wire width apart in the width direction from a second end in the width direction of the air core inductor wire or the magnetic core inductor wire and extending in the thickness direction is defined as a second straight line. In the predetermined cross section, an imaginary straight line passing through a portion spaced the wire thickness apart in the thickness direction from a first end in the thickness direction of the air core inductor wire or the magnetic core inductor wire and extending in the width direction is defined as a third straight line. In the predetermined cross section, an imaginary straight line passing through a portion spaced the wire thickness apart in the thickness direction from a second end in the thickness direction of the air core inductor wire or the magnetic core inductor wire and extending in the width direction is defined as a fourth straight line. In the predetermined cross section, a portion obtained by removing a wiring portion from a region surrounded by the first straight line, the second straight line, the third straight line, and the fourth straight line is defined as a peripheral region around the air core inductor wire or the magnetic core inductor wire. In the predetermined cross section including an intermediate position between the first air core outer terminal and the second air core outer terminal, a magnetic material content that is a content of magnetic material in the peripheral region around the air core inductor wire is lower than 50%. In the predetermined cross section including an intermediate position between the first magnetic core outer terminal and the second magnetic core outer terminal, the magnetic material content in the peripheral region around the magnetic core inductor wire is higher than or equal to 50%. The air core body and the magnetic core body are combined or integrated.

With the above configuration, the inductor component includes the magnetic core coil in which a magnetic flux passes through magnetic material at a higher rate, and also includes the air core coil in which a magnetic flux passes through magnetic material at a lower rate. Usage of the thus configured inductor component may be, for example, such usage that a current is passed through the magnetic core coil when a load current is relatively small and a current is passed through the air core coil when a load current is relatively large. Therefore, while the inductor component includes the magnetic core coil having a higher inductance acquisition efficiency, the inductor component passes a current through the air core coil when a load current is greater than or equal to a certain value. Therefore, the inductor component is capable of supporting a larger current as compared to an inductor component including only a magnetic core coil.

According to preferred embodiments of the present disclosure, a DC-DC converter includes the above-described inductor component, an air core switching element electrically connected to the air core coil, and a magnetic core switching element electrically connected to the magnetic core coil.

With this configuration, when a load current is relatively small, the air core switching element is turned off, and the magnetic core switching element is turned on, with the result that a current can be passed through the magnetic core coil in which a magnetic flux passes through magnetic material at a higher rate. In addition, when a load current is relatively large, the air core switching element is turned on, and the magnetic core switching element is turned off, with the result that a current can be passed through the air core coil in which a magnetic flux passes through magnetic material at a lower rate. Thus, with the above configuration, while the magnetic core coil having a higher inductance acquisition efficiency is used, it is possible to support a larger load current as compared to a DC-DC converter including only a magnetic core coil.

Other features, elements, characteristics and advantages of the present disclosure will become more apparent from the following detailed description of preferred embodiments of the present disclosure with reference to the attached drawings.

DETAILED DESCRIPTION

First Embodiment

Hereinafter, an embodiment of an inductor component and a DC-DC converter will be described with reference to FIG. 1 to FIG. 20. The accompanying drawings may illustrate components in a magnified view for the sake of easy understanding. The proportion of dimensions of each component may be different from the actual one or the one in other drawings. Hatching is used in the cross-sectional views, and hatching of some components may be omitted for the sake of easy understanding.

Figure 1:
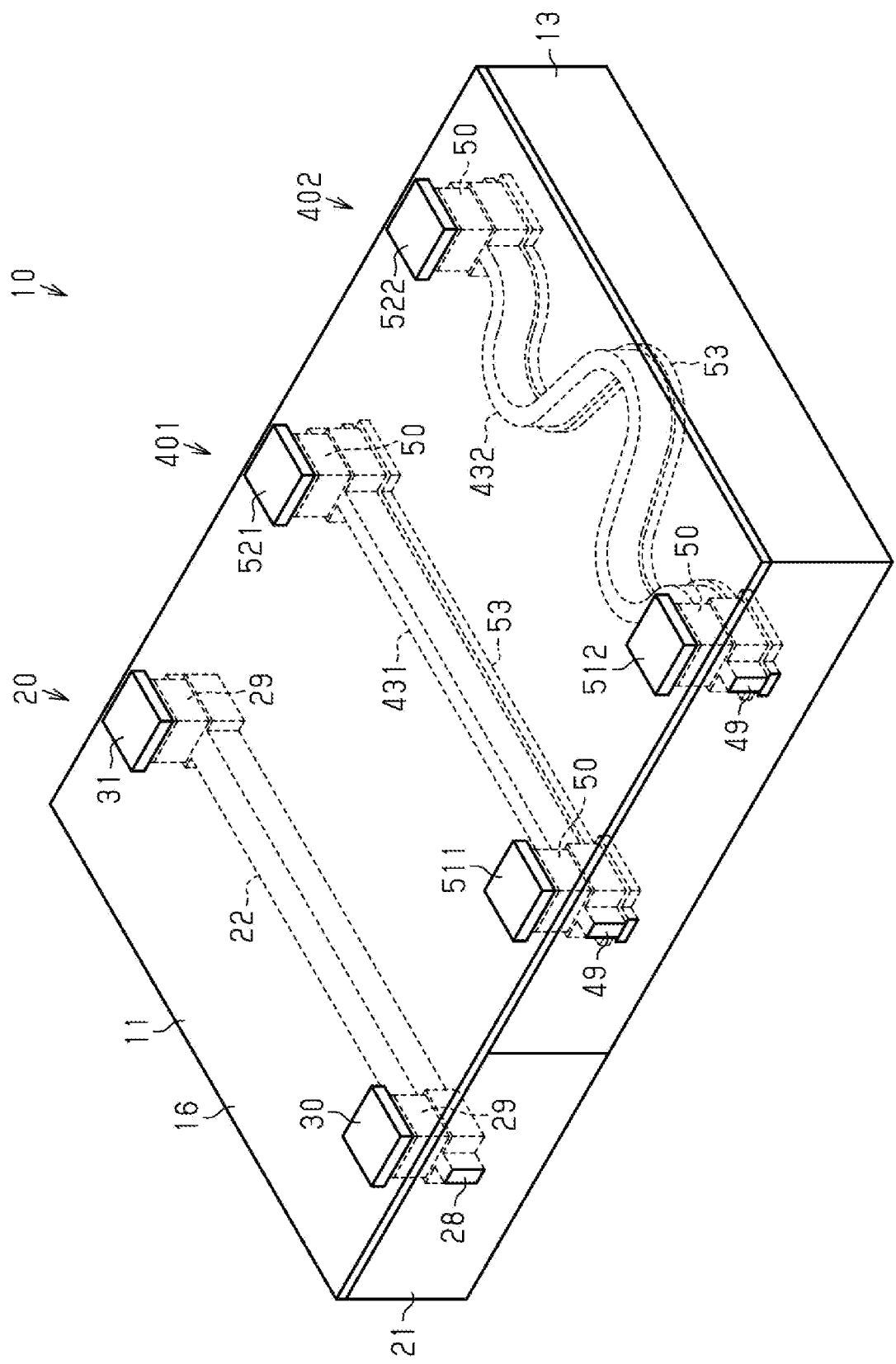
FIG. 1 is a perspective view schematically showing an inductor component.
Figure 2:
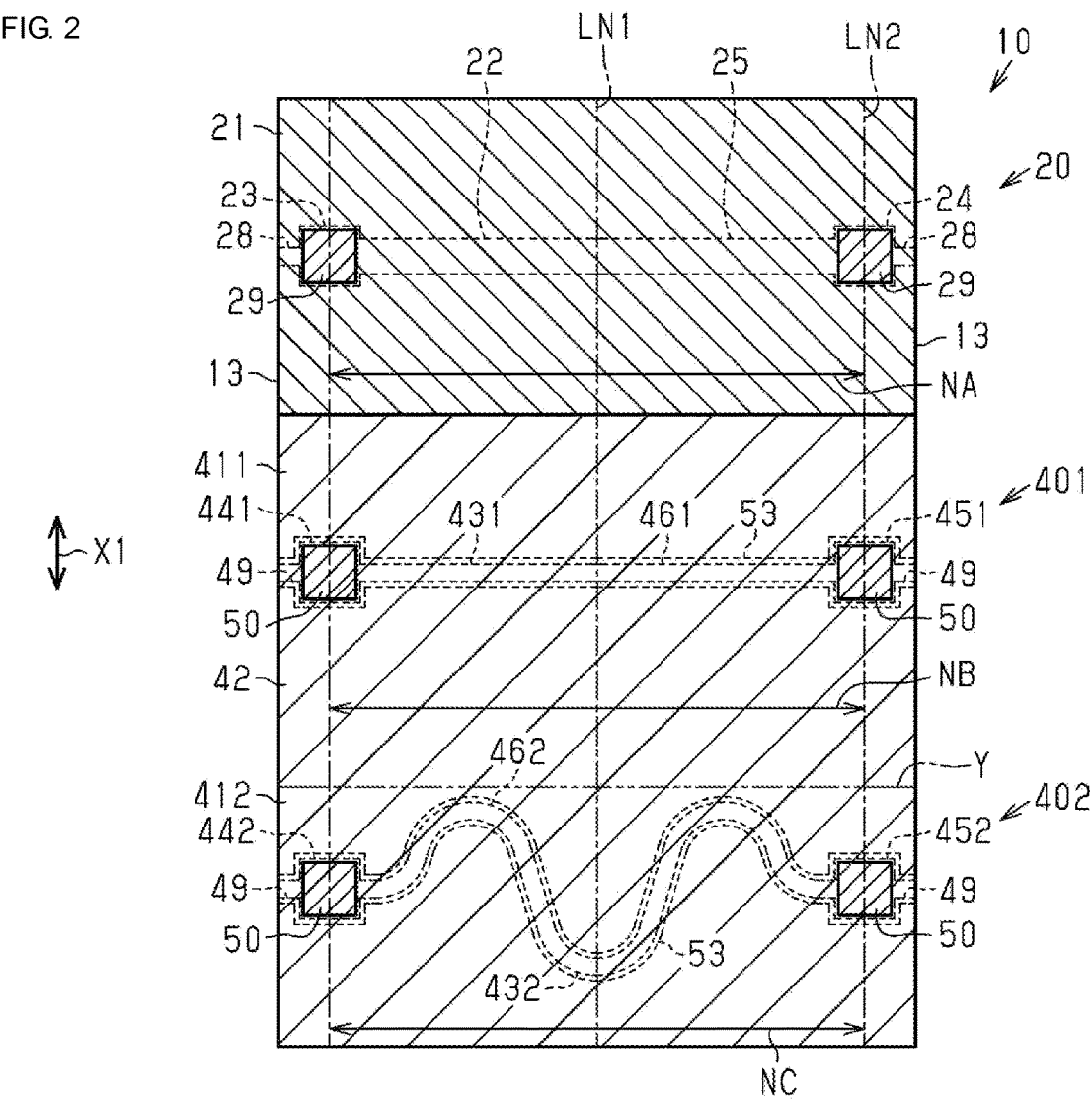
FIG. 2 is a cross-sectional view of the inductor component.

As shown in FIG. 1 and FIG. 2, an inductor component 10 of the present embodiment generates a magnetic field when a current is input to the inductor component 10. The inductor component 10 is an array component in which an air core coil 20 and magnetic core coils 401, 402 are combined or integrated. The air core coil 20 includes an air core body 21, and an air core inductor wire 22 provided in the air core body 21. The magnetic core coil 401 includes a magnetic core body 411, and a magnetic core inductor wire 431 provided in the magnetic core body 411. The magnetic core coil 402 includes a magnetic core body 412, and a magnetic core inductor wire 432 provided in the magnetic core body 412. The air core body 21 and the magnetic core bodies 411, 412 are combined or integrated. Herein, the air core coil may include a core body of the coil including low magnetic material which has magnetic properties lower than that of the magnetic material of the magnetic core coil. The core body of the coil may be made of air, alumina, glass or resin.

The phrase "combining or integrating an air core body and a magnetic core body" means any of the following three cases (A1), (A2), and (A3):

(A1) The air core body and the magnetic core body are completely integrated without an interface.

(A2) There is an interface between the air core body and the magnetic core body, and the air core body and the magnetic core body are in close contact with each other.

(A3) There are boundary surfaces and a gap between the air core body and the magnetic core body, and the air core body and the magnetic core body are joined with a common different member, such as a surface layer and a substrate.

Figure 3:
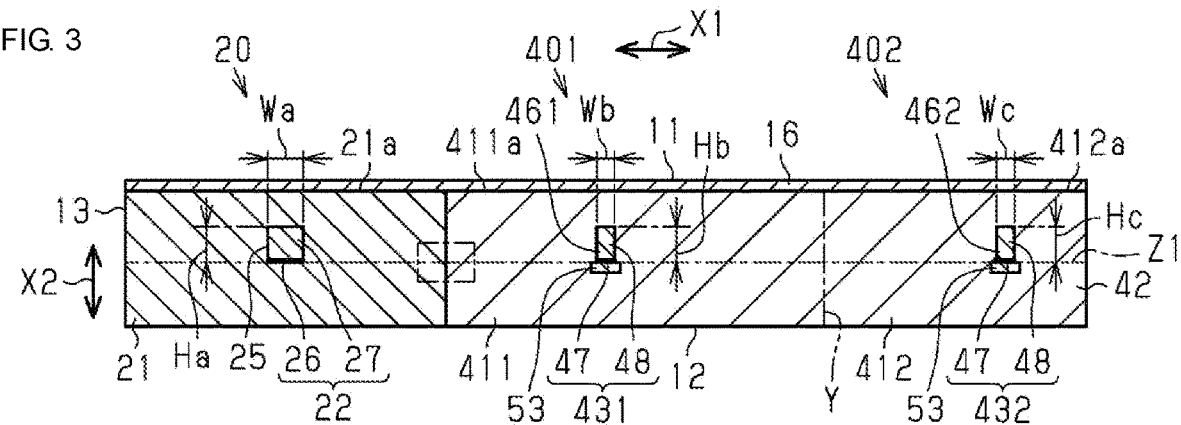
FIG. 3 is a cross-sectional view of the inductor component.

In this example, as shown in FIG. 1, the inductor component 10 has a substantially rectangular parallelepiped shape. Of the side surfaces of the inductor component 10, the top surface in FIG. 3 is referred to as a first main surface 11 of the inductor component 10, and the undersurface in FIG. 3 is referred to as a second main surface 12 of the inductor component 10. The side surfaces of the inductor component 10, other than the first main surface 11 or the second main surface 12, are referred to as non-main surfaces 13. In other words, the side surfaces of the inductor component 10 include the first main surface 11, the second main surface 12, and the non-main surfaces 13. The shape of the inductor component 10 is not limited to a substantially rectangular parallelepiped shape and may be, for example, a substantially cylindrical shape or a substantially polygonal prism shape.

The term "main surface" is, for example, a surface having the largest area among the side surfaces of the inductor component. In this example, the areas of the top surface and the undersurface in FIG. 3 are the largest surfaces among the side surfaces of the inductor component 10, so the top surface and the undersurface in FIG. 3 correspond to main surfaces. When, for example, an inductor component is mounted on a circuit board, both the side surface of the inductor component, facing the circuit board, and the side surface across inductor wires (described later) from the above side surface may be referred to as main surfaces.

Figure 4:
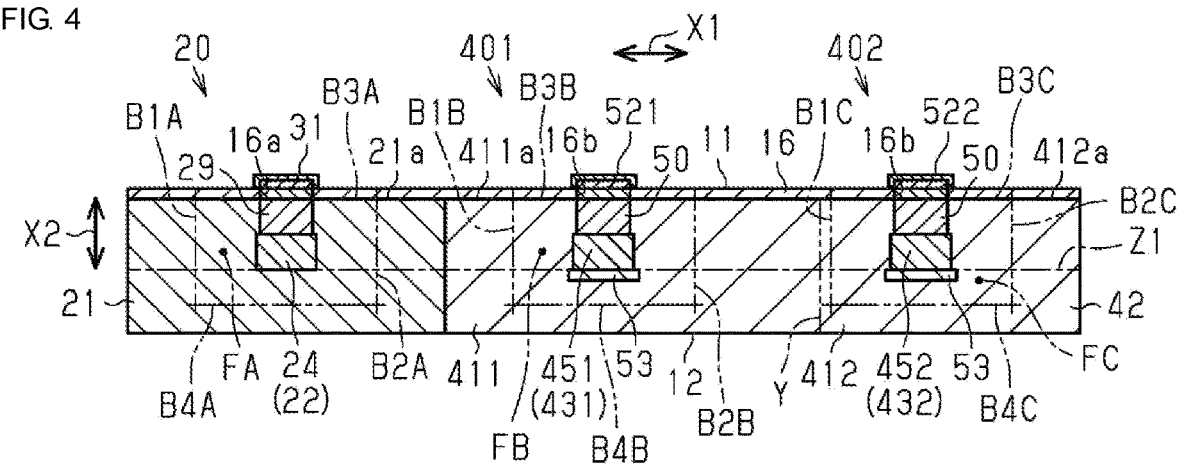
FIG. 4 is a cross-sectional view of the inductor component.

In this example, as shown in FIG. 2, the inductor component 10 includes the one air core coil 20 and the two magnetic core coils 401, 402. In FIG. 2 to FIG. 4, a boundary line Y indicating a boundary between the magnetic core coil 401 and the magnetic core coil 402 is represented by the alternate long and two-short dashed line. The air core coil 20 and the magnetic core coils 401, 402 are arranged in the up-and-down direction in the drawing. In other words, in the up-and-down direction in the drawing, the air core coil 20 and the magnetic core coils 401, 402 are arranged such that the magnetic core coil 401 is disposed between the air core coil 20 and the magnetic core coil 402. As shown in FIG. 3, inductor wires 22, 431, 432 are disposed in a predetermined disposition plane Z1 located between the first main surface 11 and the second main surface 12 in the up-and-down direction in the drawing. The disposition plane Z1 may be parallel to the first main surface 11 and the second main surface 12 as shown in FIG. 3 or may be not parallel to the first main surface 11 or the second main surface 12.

Where an imaginary plane in which the air core inductor wire 22 is disposed is defined as a predetermined plane, the disposition plane Z1 corresponds to the predetermined plane in this example. In this example, the magnetic core inductor wires 431, 432 also extend along the disposition plane Z1 in the disposition plane Z1. Therefore, the magnetic core inductor wires 431, 432 extend parallel to the predetermined plane.

FIG. 3 is a view showing a cross section when the inductor component 10 is cut along the line LN1 indicated by the alternate long and short dashed line in FIG. 2. FIG. 4 is a view showing a cross section when the inductor component 10 is cut along the line LN2 indicated by the alternate long and short dashed line in FIG. 2. The line LN2 is a line extending in the same direction as the line LN1. These lines LN1, LN2 extend along the first main surface 11. Therefore, in FIG. 3 and FIG. 4, the right-and-left direction is a direction along the first main surface 11, and the up-and-down direction is a direction perpendicular to the first main surface 11.

The line LN1 is an imaginary straight line set so as to pass through an intermediate position between a first air core outer terminal 30 (described later) and a second air core outer terminal 31 (described later) electrically connected to the air core inductor wire 22 of the air core coil 20, an intermediate position between a first magnetic core outer terminal 511 (described later) and a second magnetic core outer terminal 521 (described later) electrically connected to the magnetic core inductor wire 431 of the magnetic core coil 401, and an intermediate position between a first magnetic core outer terminal 512 (described later) and a second magnetic core outer terminal 522 (described later) electrically connected to the magnetic core inductor wire 432 of the magnetic core coil 402. The line LN2 is an imaginary straight line set at a position where a second end portion 24 (described later) of the air core inductor wire 22 of the air core coil 20, a second end portion 451 (described later) of the magnetic core inductor wire 431 of the magnetic core coil 401, and a second end portion 452 (described later) of the magnetic core inductor wire 432 of the magnetic core coil 402 can be cut.

The cross sections of the air core inductor wire 22, shown in FIG. 3 and FIG. 4, are cross sections when the air core inductor wire 22 is cut in a direction perpendicular to a direction in which the air core inductor wire 22 extends. More specifically, the cross section of the air core inductor wire 22, shown in FIG. 3, is the cross section of the air core inductor wire 22 at an intermediate position between a first end portion 23 and the second end portion 24 of the air core inductor wire 22 (described later). The cross section of the air core inductor wire 22, shown in FIG. 4, is the cross section of the second end portion 24 of the air core inductor wire 22 (described later). The cross sections of the magnetic core inductor wire 431 of the magnetic core coil 401, shown in FIG. 3 and FIG. 4, are cross sections when the magnetic core inductor wire 431 is cut in a direction perpendicular to a direction in which the magnetic core inductor wire 431 extends. More specifically, the cross section of the magnetic core inductor wire 431, shown in FIG. 3, is the cross section of the magnetic core inductor wire 431 at an intermediate position between a first end portion 441 and the second end portion 451 of the magnetic core inductor wire 431 (described later). The cross section of the magnetic core inductor wire 431, shown in FIG. 4, is the cross section of the second end portion 451 of the magnetic core inductor wire 431 (described later). The cross sections of the magnetic core inductor wire 432 of the magnetic core coil 402, shown in FIG. 3 and FIG. 4, are cross sections when the magnetic core inductor wire 432 is cut in a direction perpendicular to a direction in which the magnetic core inductor wire 432 extends. More specifically, the cross section of the magnetic core inductor wire 432, shown in FIG. 3, is the cross section of the magnetic core inductor wire 432 at an intermediate position between a first end portion 442 and the second end portion 452 of the magnetic core inductor wire 432 (described later). The cross section of the magnetic core inductor wire 432, shown in FIG. 4, is the cross section of the second end portion 452 of the magnetic core inductor wire 432 (described later).

In the cross sections of the inductor component 10, shown in FIG. 3 and FIG. 4, a direction parallel to the disposition plane Z1, which is the right-and-left direction in the drawing, is defined as a width direction X1, and a direction perpendicular to the disposition plane Z1, which is the up-and-down direction in the drawing, is defined as a thickness direction X2. In this case, the thickness direction X2 is a direction perpendicular to the width direction X1. A dimension in the width direction X1 of the air core inductor wire 22 is defined as a wire width Wa of the air core inductor wire 22. A dimension in the thickness direction X2 of the air core inductor wire 22 is defined as a wire thickness Ha of the air core inductor wire 22. A dimension in the width direction X1 of the magnetic core inductor wire 431 is defined as a wire width Wb of the magnetic core inductor wire 431. A dimension in the thickness direction X2 of the magnetic core inductor wire 431 is defined as a wire thickness Hb of the magnetic core inductor wire 431. A dimension in the width direction X1 of the magnetic core inductor wire 432 is defined as a wire width Wc of the magnetic core inductor wire 432. A dimension in the thickness direction X2 of the magnetic core inductor wire 432 is defined as a wire thickness Hc of the magnetic core inductor wire 432.

As shown in FIG. 3 and FIG. 4, the inductor component 10 includes a surface layer 16 that covers a main surface 21a of the air core body 21, which is the top surface of the air core body 21 of the air core coil 20 in the drawing, a main surface 411a of the magnetic core body 411, which is the top surface of the magnetic core body 411 of the magnetic core coil 401 in the drawing, and a main surface 412a of the magnetic core body 412, which is the top surface of the magnetic core body 412 of the magnetic core coil 402 in the drawing. The top surface in the drawing, which is the front surface of the surface layer 16, corresponds to the first main surface 11 of the inductor component 10.

The surface layer 16 is a non-magnetic electrical insulator. The electrical insulation property of the surface layer 16 is higher than the electrical insulation properties of the magnetic core bodies 411, 412. In the present embodiment, an electrical insulator is the one having a specific resistance of higher than or equal to about 1 MΩ·cm. A non-magnetic substance is the one made of a material having a relative magnetic permeability of about one. The surface layer 16 is made of, for example, a polyimide resin, an acrylic resin, an epoxy resin, a phenolic resin, or a liquid crystal polymer. To enhance the electrical insulation performance of the surface layer 16, the surface layer 16 may contain an electrical insulation filler, such as a silica filler.

Next, the air core coil 20 will be described. The air core body 21 of the air core coil 20 has a non-magnetic electrically insulating layer. The air core body 21 may be made up of a single electrically insulating layer or may be a laminated body made up of a plurality of laminated electrically insulating layers. The electrically insulating layer that makes up the air core body 21 contains, for example, a polyimide resin, an acrylic resin, an epoxy resin, a phenolic resin, or a liquid crystal polymer. To enhance the electrical insulation performance of the electrically insulating layer, the electrically insulating layer may contain an electrical insulation filler, such as a silica filler.

As shown in FIG. 2, the air core inductor wire 22 of the air core coil 20 includes the first end portion 23 that is the left end portion of the air core inductor wire 22 in the drawing, the second end portion 24 that is the right end portion of the air core inductor wire 22 in the drawing, and a wire body 25 that connects the first end portion 23 and the second end portion 24. In other words, the cross section of the air core inductor wire 22, shown in FIG. 3, is the cross section of the wire body 25.

The air core inductor wire 22 contains an electrically conductive material. The air core inductor wire 22 contains, for example, at least one of copper, silver, gold, and aluminum as an electrically conductive material. The air core inductor wire 22 may contain, for example, an alloy containing at least one of copper, silver, gold, and aluminum, as an electrically conductive material. As shown in FIG. 3 and FIG. 4, the air core inductor wire 22 includes an air core wire seed layer 26 that is a seed layer, and an electrically conductive layer 27 disposed on the air core wire seed layer 26. The air core wire seed layer 26 contains, for example, copper as an electrically conductive material. A dimension in the thickness direction X2 of the air core wire seed layer 26 is less than a dimension in the thickness direction X2 of the electrically conductive layer 27. The air core wire seed layer 26 may further contain at least one of a layer containing titanium and a layer containing tungsten in the layer.

The electrically conductive layer 27 contains, for example, copper and sulfur. When the electrically conductive layer 27 contains copper and sulfur in this way, it is preferable that, for example, in the electrically conductive layer 27, the ratio of copper be higher than or equal to about 99 wt % and the ratio of sulfur be higher than or equal to about 0.1 wt % and lower than about 1.0 wt % (i.e., from about 0.1 wt % to lower than about 1.0 wt %). With this configuration, good electrical conductivity of the electrically conductive layer 27 is ensured. The ratio is a ratio to the weight of the whole electrically conductive layer 27. The air core inductor wire 22 does not need to include the air core wire seed layer 26.

In the cross section of the wire body 25 of the air core inductor wire 22, shown in FIG. 3, the wire width Wa is, for example, greater than or equal to about 90 μm and less than or equal to about 110 μm (i.e., from about 90 μm to about 110 μm). In the cross section, a dimension in the width direction X1 between a portion located farthest to a first side (left side in the drawing) in the width direction X1 and a portion located farthest to a second side (right side in the drawing) in the width direction X1 in the wire body 25 is regarded as the wire width Wa of the wire body 25 in the cross section.

In the cross section of the wire body 25 of the air core inductor wire 22, shown in FIG. 3, the wire thickness Ha is, for example, greater than or equal to about 35 μm and less than or equal to about 55 μm (i.e., from about 35 μm to about 55 μm). In the cross section, a dimension in the thickness direction X2 between a portion located farthest to a first side (upper side in the drawing) in the thickness direction X2 and a portion located farthest to a second side (lower side in the drawing) in the thickness direction X2 in the wire body 25 is regarded as the wire thickness Ha of the wire body 25 in the cross section.

As shown in FIG. 2, dummy wires disposed in the predetermined disposition plane Z1 are connected to the air core inductor wire 22. Specifically, a dummy wire 28 connected to the first end portion 23 of the air core inductor wire 22 and a dummy wire 28 connected to the second end portion 24 of the air core inductor wire 22 are provided. These dummy wires 28 extend from connection portions with the air core inductor wire 22 to the non-main surfaces 13 of the air core body 21. In other words, the end surfaces of the dummy wires 28 are exposed at the non-main surfaces 13.

As shown in FIG. 2 and FIG. 4, vertical wires extending from connection portions with the air core inductor wire 22 to the main surface 21a of the air core body 21 are provided in the air core body 21. In other words, a vertical wire 29 connected to the first end portion 23 of the air core inductor wire 22 and a vertical wire 29 connected to the second end portion 24 of the air core inductor wire 22 are provided in the air core body 21.

The air core coil 20 includes the first air core outer terminal 30 that is a contact electrically connected to the first end portion 23 of the air core inductor wire 22, and the second air core outer terminal 31 that is a contact electrically connected to the second end portion 24 of the air core inductor wire 22. The first air core outer terminal 30 and the second air core outer terminal 31 are exposed at the first main surface 11. The first air core outer terminal 30 is electrically connected to the first end portion 23 via the vertical wire 29. The second air core outer terminal 31 is electrically connected to the second end portion 24 via the vertical wire 29.

The air core outer terminals 30, 31 are exposed to the outside through the surface layer 16. The air core outer terminals 30, 31 are in contact with both the air core body 21 and the surface layer 16. In other words, the surface layer 16 has through-holes 16a for exposing the main surface 21a of the air core body 21 to the outside. The air core outer terminals 30, 31 are formed so as to fill the through-holes 16a. Therefore, each of the air core outer terminals 30, 31 is in contact with all of the end surface (top surface in FIG. 4) of the vertical wire 29, the main surface 21a of the air core body 21, the peripheral wall of the through-hole 16a, and the first main surface 11.

Each of the air core outer terminals 30, 31 is a laminated body made up of a plurality of laminated layers. The laminated body includes, for example, the following layers:

(B1) A layer containing a substitutional catalyst
(B2) A layer produced by electroless plating A method of forming a layer containing a substitutional catalyst may be, for example, a method of bringing a treatment liquid containing a substitutional catalyst into contact with the portions exposed through the through-holes 16a in the air core body 21 and electroless copper plating layers formed on the vertical wires 29. Thus, a surface portion of the electroless copper plating is substituted by the substitutional catalyst, for example, palladium, and a layer containing the catalyst is formed. After that, electroless nickel plating layers are further formed on the layers containing the substitutional catalyst by, for example, being immersed in a plating solution for electroless nickel plating.

An alkali catalyst process may be a method that does not use a substitutional catalyst. In this case, a catalyst (for example, lead ions) is deposited also on the surface layer 16, and a layer containing the catalyst is formed also on the surface layer 16. For this reason, a layer is also formed on the surface layer 16 by electroless plating. Therefore, an unnecessary layer on the surface layer 16 needs to be removed.

A layer produced by electroless plating is, for example, an electrically conductive layer in which the ratio of copper is lower than or equal to about 99 wt % and the ratio of nickel is higher than or equal to about 0.1 wt %. The ratio is a ratio to the weight of the whole layer produced by electroless plating. For example, the ratio can be calculated based on the content of each element to the whole layer produced by electroless plating. Specifically, the ratio can be calculated by analyzing the layer by using ICP. ICP is an abbreviation of inductively coupled plasma.

Next, the magnetic core coils 401, 402 will be described. The magnetic core bodies 411, 412 of the magnetic core coils 401, 402 include a magnetic layer 42. The magnetic layer 42 contains magnetic particles as a magnetic material. It is preferable that the mean particle diameter of magnetic particles contained in the magnetic layer 42 be greater than or equal to about 1 μm and less than or equal to about 5 μm (i.e., from about 1 μm to about 5 μm). The mean particle diameter is, for example, a median diameter D50. The magnetic material is a material having a relative magnetic permeability of greater than or equal to about one.

A method of measuring a mean particle diameter is, for example, the following method. In the cross sections of the magnetic core bodies 411, 412, shown in FIG. 3, the image of the cross section of the magnetic layer 42 containing 30 or more magnetic particles is acquired at three points different in position from one another. The images of the cross sections are acquired with an SEM (scanning electron microscope) of which the magnification is adjusted to an appropriate size (for example, 1000 times). The particle diameters of the magnetic particles are calculated based on those images as values converted from areas. A value (cumulative 50% value) located at the center among particle diameters when arranged in descending order is a mean particle diameter.

The magnetic layer 42 is made up of, for example, a resin containing metal magnetic particles. When the magnetic layer 42 is made up of a resin containing metal magnetic particles, it is desirable that the magnetic layer 42 contain at least one of iron and an alloy containing iron as metal magnetic particles.

The magnetic layer 42 may contain metal magnetic particles, other than iron-based metals, such as iron and alloys containing iron. Examples of the metal magnetic particles other than iron-based metals include nickel, chromium, copper, aluminum, and alloys of these metals. When the magnetic layer 42 contains metal magnetic particles other than iron-based metals, the magnetic layer 42 may contain magnetic particles of an iron-based metal or does not need to contain magnetic particles of an iron-based metal.

It is preferable that the magnetic layer 42 contain metal magnetic particles about 60 wt % or higher of the total weight. To enhance the fillability of a resin containing metal magnetic particles, it is more preferable that a resin contain two or three types of metal magnetic particles having different particle distributions.

A resin material, such as an epoxy resin, may be a resin for containing metal magnetic particles. In consideration of electrical insulation property and formability, it is preferable that a polyimide resin, an acrylic resin, or a phenolic resin be employed as the resin.

The magnetic layer 42 may be made up of a resin containing ferrite particles instead of metal magnetic particles or may be made up of a resin containing both metal magnetic particles and ferrite particles. Alternatively, for example, the magnetic layer 42 may be a substrate bound by sintering ferrite particles, that is, a sintered body of ferrite.

The volume of the magnetic core body 411 of the magnetic core coil 401 is different from the volume of the magnetic core body 412 of the magnetic core coil 402. In this example, the volume of the magnetic core body 411 is greater than the volume of the magnetic core body 412. Specifically, the dimension of the magnetic core body 411 is the same as the dimension of the magnetic core body 412 in the thickness direction X2 shown in FIG. 3, and the dimension of the magnetic core body 411 is the same as the dimension of the magnetic core body 412 in a direction perpendicular to both the width direction X1 shown in FIG. 2 and the thickness direction X2 shown in FIG. 3; however, the dimension of the magnetic core body 411 is greater than the dimension of the magnetic core body 412 in the width direction X1 shown in FIG. 2. By varying the volume in this way, even when the constituent materials of the magnetic core bodies are the same and the contents of the magnetic materials in the magnetic core bodies are the same, the magnetic permeability of the magnetic core coil 401 can be varied from the magnetic permeability of the magnetic core coil 402. Of course, the volume of the magnetic core body 411 may be the same as the volume of the magnetic core body 412.

As shown in FIG. 2, the magnetic core inductor wire 431 of the magnetic core coil 401 includes the first end portion 441 that is the left end portion of the magnetic core inductor wire 431 in the drawing, the second end portion 451 that is the right end portion of the magnetic core inductor wire 431 in the drawing, and a wire body 461 that connects the first end portion 441 and the second end portion 451. In other words, the cross section of the magnetic core inductor wire 431, shown in FIG. 3, is the cross section of the wire body 461. In this example, as shown in FIG. 2, the first end portion 441 is disposed at the same position as the first end portion 23 of the air core inductor wire 22 in the right-and-left direction in the drawing. The second end portion 451 is disposed at the same position as the second end portion 24 of the air core inductor wire 22 in the right-and-left direction in the drawing.

The magnetic core inductor wire 432 of the magnetic core coil 402 includes the first end portion 442 disposed at the same position as the first end portion 441 of the magnetic core inductor wire 431 in the right-and-left direction in FIG. 2, the second end portion 452 disposed at the same position as the second end portion 451 of the magnetic core inductor wire 431 in the right-and-left direction in FIG. 2, and a wire body 462 that connects the first end portion 442 and the second end portion 452. In other words, the cross section of the magnetic core inductor wire 432, shown in FIG. 3, is the cross section of the wire body 462. The wire body 462 extends from a connection portion with the first end portion 442 to a connection portion with the second end portion 452 while meandering. For this reason, the line length of the magnetic core inductor wire 432 is greater than any of the line length of the magnetic core inductor wire 431 and the line length of the air core inductor wire 22.

Each of the magnetic core inductor wires 431, 432 contains an electrically conductive material. Each of the magnetic core inductor wires 431, 432 contains, for example, at least one of copper, silver, gold, and aluminum as an electrically conductive material. Each of the magnetic core inductor wires 431, 432 may contain, for example, an alloy containing at least one of copper, silver, gold, and aluminum, as an electrically conductive material. As shown in FIG. 3 and FIG. 4, each of the magnetic core inductor wires 431, 432 includes a magnetic core wire seed layer 47 that is a seed layer, and an electrically conductive layer 48 disposed on the magnetic core wire seed layer 47. The magnetic core wire seed layer 47 contains, for example, copper as an electrically conductive material. A dimension in the thickness direction X2 of the magnetic core wire seed layer 47 is less than a dimension in the thickness direction X2 of the electrically conductive layer 48. The magnetic core wire seed layer 47 may further contain at least one of a layer containing titanium and a layer containing tungsten in the layer.

The electrically conductive layer 48 contains, for example, copper and sulfur. When the electrically conductive layer 48 contains copper and sulfur in this way, the ratio of copper may be higher than or equal to about 99 wt % and the ratio of sulfur may be higher than or equal to about 0.1 wt % and lower than about 1.0 wt % in the electrically conductive layer 48, for example. The ratio is a ratio to the weight of the whole electrically conductive layer 48. Each of the magnetic core inductor wires 431, 432 does not need to include the magnetic core wire seed layer 47.

In the cross section of the wire body 461 of the magnetic core inductor wire 431, shown in FIG. 3, the wire width Wb is, for example, greater than or equal to about 40 μm and less than or equal to about 60 μm (i.e., from about 40 μm to about 60 μm). In the cross section, a dimension in the width direction X1 between a portion located farthest to a first side (left side in the drawing) in the width direction X1 and a portion located farthest to a second side (right side in the drawing) in the width direction X1 in the wire body 461 is regarded as the wire width Wb of the wire body 461 in the cross section.

In the cross section of the wire body 461 of the magnetic core inductor wire 431, shown in FIG. 3, the wire thickness Hb is, for example, greater than or equal to about 35 μm and less than or equal to about 55 μm (i.e., from about 35 μm to about 55 μm). In the cross section, a dimension in the thickness direction X2 between a portion located farthest to a first side (upper side in the drawing) in the thickness direction X2 and a portion located farthest to a second side (lower side in the drawing) in the thickness direction X2 in the wire body 461 is regarded as the wire thickness Hb of the wire body 461 in the cross section.

In the cross section of the wire body 462 of the magnetic core inductor wire 432, shown in FIG. 3, the wire width Wc is, for example, greater than or equal to about 40 μm and less than or equal to about 60 μm (i.e., from about 40 μm to about 60 μm). In the cross section, a dimension in the width direction X1 between a portion located farthest to a first side (left side in the drawing) in the width direction X1 and a portion located farthest to a second side (right side in the drawing) in the width direction X1 in the wire body 462 is regarded as the wire width Wc of the wire body 462 in the cross section.

In the cross section of the wire body 462 of the magnetic core inductor wire 432, shown in FIG. 3, the wire thickness Hc is, for example, greater than or equal to about 35 μm and less than or equal to about 55 μm (i.e., from about 35 μm to about 55 μm). In the cross section, a dimension in the thickness direction X2 between a portion located farthest to a first side (upper side in the drawing) in the thickness direction X2 and a portion located farthest to a second side (lower side in the drawing) in the thickness direction X2 in the wire body 462 is regarded as the wire thickness Hc of the wire body 462 in the cross section.

As shown in FIG. 2, the magnetic core coil 401 includes dummy wires 49 connected to the magnetic core inductor wire 431, and the magnetic core coil 402 includes dummy wires 49 connected to the magnetic core inductor wire 432. The dummy wires 49 extend from connection portions with the magnetic core inductor wires 431, 432 to the non-main surfaces 13 of the magnetic core bodies 411, 412. In this example, the dummy wire 49 connected to the first end portion 441 of the magnetic core inductor wire 431, the dummy wire 49 connected to the first end portion 442 of the magnetic core inductor wire 432, the dummy wire 49 connected to the second end portion 451 of the magnetic core inductor wire 431, and the dummy wire 49 connected to the second end portion 452 of the magnetic core inductor wire 432 are provided. These dummy wires 49 extend from the connection portions with the magnetic core inductor wires 431, 432 to the non-main surfaces 13 of the magnetic core bodies 411, 412. In other words, the end surfaces of the dummy wires 49 are exposed at the non-main surfaces 13.

As shown in FIG. 2 and FIG. 4, vertical wires extending from connection portions with the magnetic core inductor wire 431 toward the main surface 411a of the magnetic core body 411 are provided in the magnetic core body 411, and vertical wires extending from connection portions with the magnetic core inductor wire 432 toward the main surface 412a of the magnetic core body 412 are provided in the magnetic core body 412. In other words, a vertical wire 50 connected to the first end portion 441 of the magnetic core inductor wire 431 and a vertical wire 50 connected to the second end portion 451 of the magnetic core inductor wire 431 are provided in the magnetic core body 411, and a vertical wire 50 connected to the first end portion 442 of the magnetic core inductor wire 432 and a vertical wire 50 connected to the second end portion 452 of the magnetic core inductor wire 432 are provided in the magnetic core body 412.

The magnetic core coil 401 includes the first magnetic core outer terminal 511 that is an outer terminal electrically connected to the first end portion 441 of the magnetic core inductor wire 431 and the second magnetic core outer terminal 521 that is an outer terminal electrically connected to the second end portion 451 of the magnetic core inductor wire 431. The magnetic core coil 402 includes the first magnetic core outer terminal 512 that is an outer terminal electrically connected to the first end portion 442 of the magnetic core inductor wire 432 and the second magnetic core outer terminal 522 that is an outer terminal electrically connected to the second end portion 452 of the magnetic core inductor wire 432. The first magnetic core outer terminals 511, 512 and the second magnetic core outer terminals 521, 522 are exposed at the first main surface 11. The first magnetic core outer terminal 511 is electrically connected to the first end portion 441 via the vertical wire 50. The first magnetic core outer terminal 512 is electrically connected to the first end portion 442 via the vertical wire 50. The second magnetic core outer terminal 521 is electrically connected to the second end portion 451 via the vertical wire 50. The second magnetic core outer terminal 522 is electrically connected to the second end portion 452 via the vertical wire 50.

The magnetic core outer terminals 511, 512, 521, 522 are exposed to the outside through the surface layer 16. The magnetic core outer terminals 511, 521 are in contact with both the magnetic core body 411 and the surface layer 16. The magnetic core outer terminals 512, 522 are in contact with both the magnetic core body 412 and the surface layer 16. In other words, the surface layer 16 has through-holes 16b for exposing the main surfaces 411a, 412a of the magnetic core bodies 411, 412 to the outside. The magnetic core outer terminals 511, 512, 521, 522 are formed so as to fill the through-holes 16b. Therefore, each of the magnetic core outer terminals 511, 521 is in contact with all of the end surface (top surface in FIG. 4) of the vertical wire 50, the main surface 411a of the magnetic core body 411, the peripheral wall of the through-hole 16b, and the first main surface 11, and each of the magnetic core outer terminals 512, 522 is in contact with all of the end surface (top surface in FIG. 4) of the vertical wire 50, the main surface 412a of the magnetic core body 412, the peripheral wall of the through-hole 16b, and the first main surface 11.

Each of the magnetic core outer terminals 511, 512, 521, 522 is a laminated body made up of a plurality of laminated layers. The laminated body includes, for example, layers as described in (B1) and (B2). In this example, as shown in FIG. 2 to FIG. 4, an electrically insulating layer 53 that is in contact with the magnetic core inductor wire 431 and the dummy wires 49 is provided in the magnetic core body 411, and an electrically insulating layer 53 that is in contact with the magnetic core inductor wire 432 and the dummy wires 49 is provided in the magnetic core body 412. Each of the electrically insulating layers 53 is disposed between the first main surface 11 and the second main surface 12 of the inductor component 10. More specifically, the electrically insulating layer 53 is disposed between the magnetic core inductor wire 431 and the second main surface 12, and the electrically insulating layer 53 is disposed between the magnetic core inductor wire 432 and the second main surface 12. In other words, as shown in FIG. 3 and FIG. 4, the undersurfaces of the magnetic core inductor wire 431 and the dummy wires 49 in the drawing are in contact with the electrically insulating layer 53, and the undersurfaces of the magnetic core inductor wire 432 and the dummy wires 49 in the drawing are in contact with the electrically insulating layer 53. On the other hand, the top surfaces of the magnetic core inductor wire 431 and the dummy wires 49 in the drawing are not in contact with the electrically insulating layer 53, and the top surfaces of the magnetic core inductor wire 432 and the dummy wires 49 in the drawing are not in contact with the electrically insulating layer 53.

Each of the electrically insulating layers 53 is a non-magnetic electrical insulator. Each of the electrically insulating layers 53 is made of, for example, a polyimide resin, an acrylic resin, an epoxy resin, a phenolic resin, or a liquid crystal polymer. To enhance the electrical insulation performance of each of the electrically insulating layers 53, each of the electrically insulating layers 53 may contain an electrical insulation filler, such as a silica filler.

Figure 5:
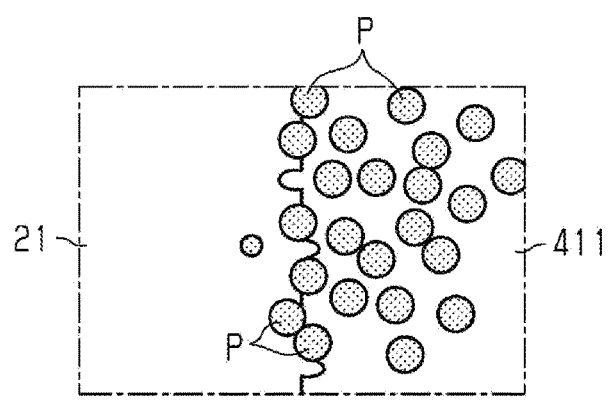
FIG. 5 is an enlarged schematic diagram of a portion surrounded by the alternate long and short dashed line in FIG. 3.

Next, a boundary portion between the air core body 21 and the magnetic core body 411 will be described. FIG. 5 is an enlarged diagram of a portion surrounded by the dashed line in FIG. 3. As shown in FIG. 3 and FIG. 5, the air core body 21 and the magnetic core body 411 are contiguous to each other. At a boundary portion between the air core body 21 and the magnetic core body 411, part of magnetic particles P contained in the magnetic core body 411 may be embedded in the air core body 21. In such a case, an interface between the air core body 21 and the magnetic core body 411 has an irregular shape as shown in FIG. 5. The air core body 21 and the magnetic core body 411 may be in contact with each other in such a mode in which a boundary between the air core body 21 and the magnetic core body 411 contiguous to each other cannot be identified. In FIG. 3 and FIG. 4, the magnetic core body 411 and the magnetic core body 412 are in contact with each other in such a mode in which a boundary between the magnetic core body 411 and the magnetic core body 412 cannot be identified. Not limited to this mode, the magnetic core body 411 and the magnetic core body 412 may be in contact with each other in such a mode in which a boundary between the magnetic core body 411 and the magnetic core body 412 can be identified.

Figure 6:
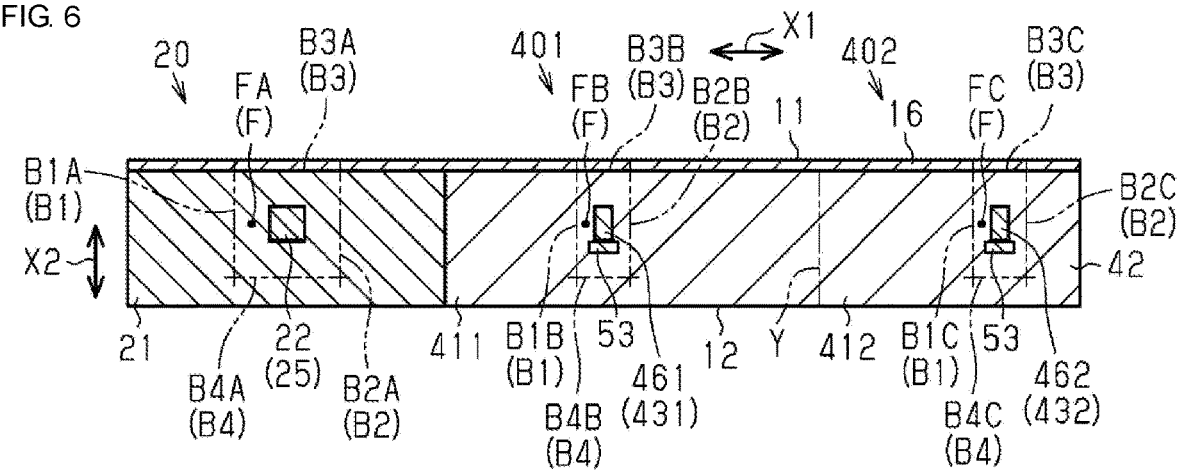
FIG. 6 is a cross-sectional view of the inductor component.

Next, the definition of an air core coil provided in an air core body and the definition of a magnetic core coil provided in a magnetic core body will be described. FIG. 6 is a cross-sectional view when the inductor component 10 is cut along the line LN1 shown in FIG. 2. The cross section shown in FIG. 6 is a cross section of the inductor component 10 in a direction perpendicular to any of the inductor wires 22, 431, 432. In other words, FIG. 6 is a predetermined cross section of the inductor component 10, taken along the direction perpendicular to the direction in which the air core inductor wire 22 extends. In addition, FIG. 6 is a predetermined cross section of the inductor component 10, taken along the direction perpendicular to the direction in which the magnetic core inductor wire 431 extends. In addition, FIG. 6 is a predetermined cross section of the inductor component 10, taken along the direction perpendicular to the direction in which the magnetic core inductor wire 432 extends.

In this example, there is a portion where directions in which the three inductor wires 22, 431, 432 extend are parallel to one another. However, there may be no portion where directions in which the three inductor wires 22, 431, 432 extend are parallel to one another. In such a case, the predetermined cross section of each of the inductor wires 22, 431, 432 cannot be acquired through a single cross section of the inductor component 10. Thus, the predetermined cross section of each of the inductor wires 22, 431, 432 is acquired by individually cutting the inductor component 10 for each of the inductor wires 22, 431, 432.

In the cross section of the inductor component 10, shown in FIG. 6, a region surrounding each inductor wire is set as a peripheral region F. Each peripheral region F is a portion obtained by removing a wiring portion from a region surrounded by a first straight line B1, a second straight line B2, a third straight line B3, and a fourth straight line B4. The wiring portion is a portion provided in the air core body 21 or the magnetic core body 411 and through which a current flows. In other words, in the present embodiment, the wiring portions include the inductor wires 22, 431, 432 and the vertical wires 29, 50. On the other hand, the wiring portions do not contain magnetic particles. The first straight line B1 and the second straight line B2 are imaginary straight lines extending in the thickness direction X2. The third straight line B3 and the fourth straight line B4 are imaginary straight lines extending in the width direction X1. More specifically, when the wire width of the wire body of each inductor wire in FIG. 6 is the wire width of the inductor wire, the first straight line B1 is a line passing through a portion spaced the wire width of the inductor wire apart in the width direction X1 from a first end (left end in the drawing) in the width direction X1 of the inductor wire in the cross section shown in FIG. 6. The second straight line B2 is a line passing through a portion spaced the wire width of the inductor wire apart in the width direction X1 from a second end (right end in the drawing) in the width direction X1 of the inductor wire in the cross section shown in FIG. 6. When the wire thickness of the wire body of each inductor wire in FIG. 6 is the wire thickness of the inductor wire, the third straight line B3 is a line passing through a portion spaced the wire thickness of the inductor wire apart in the thickness direction X2 from a first end (upper end in the drawing) in the thickness direction X2 of the inductor wire in the cross section shown in FIG. 6. The fourth straight line B4 is a line passing through a portion spaced the wire thickness of the inductor wire apart in the thickness direction X2 from a second end (lower end in the drawing) in the thickness direction X2 of the inductor wire in the cross section shown in FIG. 6.

When the content of magnetic material in the peripheral region F is defined as a magnetic material content Ra, an inductor of which the magnetic material content Ra is lower than about 50% is defined as an air core coil. An inductor of which the magnetic material content Ra is higher than or equal to about 50% is defined as a magnetic core coil. A value obtained by setting the sum of the area of a non-magnetic electrical insulator and the area of a portion containing a magnetic material in the peripheral region F is a denominator and the area of a portion containing a magnetic material is a numerator is derived as magnetic material content Ra.

Here, an example of a method of measuring a magnetic material content Ra will be described. When the magnetic material is fine particles, the cross section of the inductor component 10, including the peripheral region F, is taken with an SEM of which the magnification is adjusted to an appropriate size (for example, 1000 times). Subsequently, the total area of a large number of fine particles in the cross section is derived as the area of the portion containing a magnetic material. Then, a value obtained by setting the whole area of the peripheral region F for a denominator and setting the derived area of the portion containing a magnetic material for a numerator is derived as magnetic material content Ra.

The magnetic material may not be fine particles. For example, a sintered body of ferrite can be a magnetic material. In this case, the whole of the sintered body is a magnetic material, so the area of the sintered body in the peripheral region F is derived as the area of a portion containing a magnetic material.

FIG. 6 shows a portion obtained by removing the air core inductor wire 22 from a region surrounded by a first straight line B1A, a second straight line B2A, a third straight line B3A, and a fourth straight line B4A as a peripheral region FA for the air core inductor wire 22. A portion obtained by removing the magnetic core inductor wire 431 from a region surrounded by a first straight line B1B, a second straight line B2B, a third straight line B3B, and a fourth straight line B4B is shown as a peripheral region FB for the magnetic core inductor wire 431. A portion obtained by removing the magnetic core inductor wire 432 from a region surrounded by a first straight line B1C, a second straight line B2C, a third straight line B3C, and a fourth straight line B4C is shown as a peripheral region FC for the magnetic core inductor wire 432. As shown in FIG. 6, the area of the cross section of the air core inductor wire 22 is the greatest of the inductor wires 22, 431, 432. Therefore, the area of the peripheral region FA is the greatest of the peripheral regions FA, FB, FC.

The magnetic material content Ra is lower than about 50% in the peripheral region FA shown in FIG. 6. Specifically, the magnetic material content Ra is about 0%. The magnetic material content Ra is higher than or equal to about 50% in the peripheral region FB shown in FIG. 6. Specifically, the magnetic material content Ra is about 95%. The magnetic material content Ra is higher than or equal to about 50% in the peripheral region FC shown in FIG. 6. Specifically, the magnetic material content Ra is about 95%.

The peripheral region F may extend off the cross section of the inductor component 10 depending on the installation position or shape of the inductor wire. When part of the peripheral region F extends off the cross section of the inductor component 10, the magnetic material content Ra is derived by excluding a portion extending off the cross section from the peripheral region F.

FIG. 4 is a cross-sectional view of the inductor component 10 including the second end portions 24, 451, 452 of the inductor wires 22, 431, 432. More specifically, the cross section shown in FIG. 4 is a cross section when the inductor component 10 is cut along the direction perpendicular to the direction in which the air core inductor wire 22 extends. The cross section shown in FIG. 4 is a cross section when the inductor component 10 is cut along the direction perpendicular to the direction in which the magnetic core inductor wire 431 extends. The cross section shown in FIG. 4 is a cross section when the inductor component 10 is cut along the direction perpendicular to the direction in which the magnetic core inductor wire 432 extends. In other words, FIG. 4 shows a predetermined cross section including the second end portion 24 of the air core inductor wire 22. In addition, FIG. 4 shows a predetermined cross section including the second end portion 451 of the magnetic core inductor wire 431. In addition, FIG. 4 shows a predetermined cross section including the second end portion 452 of the magnetic core inductor wire 432.

FIG. 4 shows a portion obtained by removing the air core inductor wire 22 and the vertical wire 29 from a region surrounded by the first straight line B1A, the second straight line B2A, the third straight line B3A, and the fourth straight line B4A as the peripheral region FA around the second end portion 24 of the air core inductor wire 22. A portion obtained by removing the magnetic core inductor wire 431 and the vertical wire 50 from a region surrounded by the first straight line B1B, the second straight line B2B, the third straight line B3B, and the fourth straight line B4B is shown as the peripheral region FB around the second end portion 451 of the magnetic core inductor wire 431. A portion obtained by removing the magnetic core inductor wire 432 and the vertical wire 50 from a region surrounded by the first straight line B1C, the second straight line B2C, the third straight line B3C, and the fourth straight line B4C is shown as the peripheral region FC around the second end portion 452 of the magnetic core inductor wire 432.

The magnetic material content Ra is lower than about 50% in the peripheral region FA shown in FIG. 4. Specifically, the magnetic material content Ra is about 0%. The magnetic material content Ra is higher than or equal to about 50% in the peripheral region FB shown in FIG. 4. Specifically, the magnetic material content Ra is about 95%. The magnetic material content Ra is higher than or equal to about 50% in the peripheral region FC shown in FIG. 4. Specifically, the magnetic material content Ra is about 95%. The magnetic material content Ra in the peripheral region FA shown in FIG. 4 does not need to be about 0% as long as the magnetic material content Ra is lower than about 50%. The magnetic material content Ra in the peripheral region FB shown in FIG. 4 does not need to be about 95% as long as the magnetic material content Ra is higher than or equal to about 50%. The magnetic material content Ra in the peripheral region FC shown in FIG. 4 does not need to be about 95% as long as the magnetic material content Ra is higher than or equal to about 50%.

Incidentally, as in the case shown in FIG. 4, a peripheral region FA around the first end portion 23 of the air core inductor wire 22 may be set in the cross section of the inductor component 10, taken by cutting the first end portion 23 of the air core inductor wire 22. A peripheral region FB around the first end portion 441 of the magnetic core inductor wire 431 may be set in the cross section of the inductor component 10, taken by cutting the first end portion 441 of the magnetic core inductor wire 431. A peripheral region FC around the first end portion 442 of the magnetic core inductor wire 432 may be set in the cross section of the inductor component 10, taken by cutting the first end portion 442 of the magnetic core inductor wire 432. The magnetic material content Ra in the peripheral region FA around the first end portion 23 is lower than about 50%. Specifically, the magnetic material content Ra is about 0%. The magnetic material content Ra in the peripheral region FB around the first end portion 441 is higher than or equal to about 50%. Specifically, the magnetic material content Ra is about 95%. The magnetic material content Ra in the peripheral region FC around the first end portion 442 is higher than or equal to about 50%. Specifically, the magnetic material content Ra is about 95%.

The magnetic core coils 401, 402 in the present embodiment have the following characteristics. In the magnetic core coil 401, when the frequency of inductor current LC input to the magnetic core inductor wire 431 is higher than or equal to about 1 MHz and lower than or equal to about 50 MHz (i.e., from about 1 MHz to about 50 MHz), the effective magnetic permeability is higher than or equal to about three. In the magnetic core coil 402, when the frequency of inductor current LC input to the magnetic core inductor wire 432 is higher than or equal to about 1 MHz and lower than or equal to about 50 MHz (i.e., from about 1 MHz to about 50 MHz), the effective magnetic permeability is higher than or equal to about three. The inductor current LC is a current flowing through an inductor wire.

The effective magnetic permeability is a magnetic permeability that can be derived from an effective self-inductance in a magnetic core in which leakage flux can be ignored. In other words, the effective magnetic permeability is a magnetic permeability that can be derived from self-inductance. The inductance of a magnetic core coil is measured with, for example, an impedance analyzer or a network analyzer. At this time, a small signal (current) input to the magnetic core coil is a direct-current bias sufficiently small to such an extent that the magnetic core coil is not magnetically saturated. The inductance is measured by sweeping the frequency of the small signal from about 1 MHz to about 50 MHz. Subsequently, an actual measured value of the inductance and a simulated value of the inductance are adjusted by structural simulation of the magnetic core coil. Thus, the overall magnetic permeability of the magnetic core coil, obtained by smoothing the influence of local density of magnetic material, or the like, can be obtained as the effective magnetic permeability of the magnetic core coil.

Next, the difference in characteristics among the air core coil 20, the magnetic core coil 401, and the magnetic core coil 402 in the present embodiment will be described. The range of inductor current LC in which magnetic saturation does not occur in any of the magnetic core coils 401, 402 is referred to as low current range ALC. In this case, when the magnitude of inductor current LC falls within the low current range ALC, magnetic saturation does not occur in the magnetic core coil 401, so the inductance of the magnetic core coil 401 is greater than the inductance of the air core coil 20. Similarly, when the magnitude of inductor current LC falls within the low current range ALC, magnetic saturation does not occur in the magnetic core coil 402, so the inductance of the magnetic core coil 402 is greater than the inductance of the air core coil 20. On the other hand, when the magnitude of inductor current LC is greater than the upper limit of the low current range ALC, magnetic saturation may occur in the magnetic core coil 401 or the magnetic core coil 402. When magnetic saturation occurs in the magnetic core coil 401, the inductance of the magnetic core coil 401 is less than the inductance of the air core coil 20. Similarly, when magnetic saturation occurs in the magnetic core coil 402, the inductance of the magnetic core coil 402 is less than the inductance of the air core coil 20.

The direct current electric resistance of the air core coil 20 is lower than the direct current electric resistance of the magnetic core coil 401 and is lower than the direct current electric resistance of the magnetic core coil 402. Specifically, the line length of the air core inductor wire 22 is equal to the line length of the magnetic core inductor wire 431. On the other hand, as shown in FIG. 3, the area of the cross section of the air core inductor wire 22 when the air core inductor wire 22 is cut in the direction perpendicular to the direction in which the air core inductor wire 22 extends is greater than the area of the cross section of the magnetic core inductor wire 431 when the magnetic core inductor wire 431 is cut in the direction perpendicular to the direction in which the magnetic core inductor wire 431 extends. With this configuration, the direct current electric resistance of the air core coil 20 is made lower than the direct current electric resistance of the magnetic core coil 401.

The line length of the air core inductor wire 22 is less than the line length of the magnetic core inductor wire 432. As shown in FIG. 3, the area of the cross section of the air core inductor wire 22 when the air core inductor wire 22 is cut in the direction perpendicular to the direction in which the air core inductor wire 22 extends is greater than the area of the cross section of the magnetic core inductor wire 432 when the magnetic core inductor wire 432 is cut in the direction perpendicular to the direction in which the magnetic core inductor wire 432 extends. With this configuration, the direct current electric resistance of the air core coil 20 is made lower than the direct current electric resistance of the magnetic core coil 402.

The line length of the magnetic core inductor wire 431 is less than the line length of the magnetic core inductor wire 432. As shown in FIG. 3, the area of the cross section of the magnetic core inductor wire 431 when the magnetic core inductor wire 431 is cut in the direction perpendicular to the direction in which the magnetic core inductor wire 431 extends is equal to the area of the cross section of the magnetic core inductor wire 432 when the magnetic core inductor wire 432 is cut in the direction perpendicular to the direction in which the magnetic core inductor wire 432 extends. With this configuration, the direct current electric resistance of the magnetic core inductor wire 431 is made lower than the direct current electric resistance of the magnetic core coil 402. When, of the magnetic core coils 401, 402, the magnetic core coil having a lower direct current electric resistance is defined as a first magnetic core coil and the magnetic core coil having a higher direct current electric resistance is defined as a second magnetic core coil, the magnetic core coil 401 having the magnetic core inductor wire 431 corresponds to the first magnetic core coil, and the magnetic core coil 402 having the magnetic core inductor wire 432 corresponds to the second magnetic core coil.

The line length of the magnetic core inductor wire 431 is different from the line length of the magnetic core inductor wire 432, so the inductance of the magnetic core coil 401 is different from the inductance of the magnetic core coil 402. When, of the magnetic core coils 401, 402, the magnetic core coil having a greater inductance is defined as a first magnetic core coil and the magnetic core coil having a less inductance is defined as a second magnetic core coil, the magnetic core coil having a greater inductance corresponds to the first magnetic core coil, and the magnetic core coil having a less inductance corresponds to the second magnetic core coil.

Figure 7:
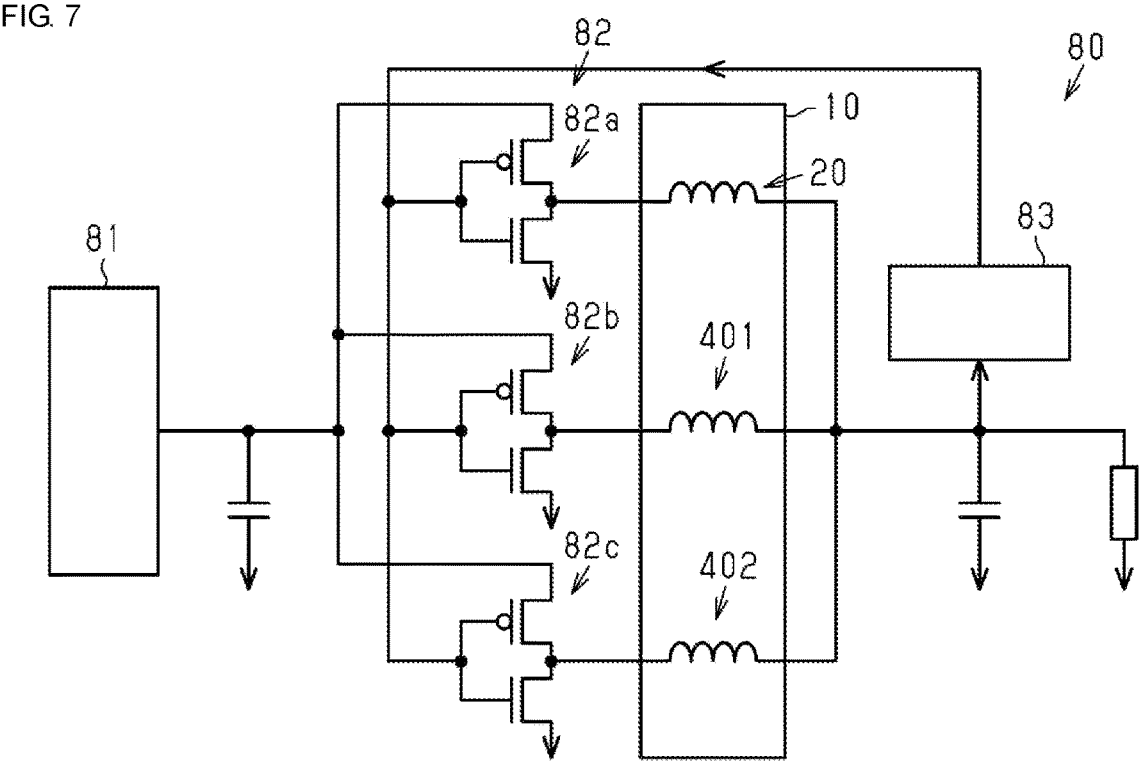
FIG. 7 is a configuration diagram schematically showing a DC-DC converter including the inductor component.

Next, a DC-DC converter 80 on which the inductor component 10 is mounted will be described with reference to FIG. 7. The DC-DC converter 80 includes a switching circuit 82. In the DC-DC converter 80, an input signal (direct current) from a direct-current power supply 81 is input to the inductor component 10 via the switching circuit 82. The switching circuit 82 includes switching elements 82a, 82b, 82c as many as the inductor wires 22, 431, 432 in the inductor component 10. The switching elements 82a, 82b, 82c are disposed in parallel with one another. In other words, of the switching elements 82a, 82b, 82c, an input signal flows from the direct-current power supply 81 to only the inductor electrically connected to the switching element turned on. For example, MOS-FET circuits may be the switching elements 82a, 82b, 82c. Examples of the MOS-FET circuit include the one including two FETs and the one including a MOS-FET and a diode. The MOS-FET circuit including two FETs can be made up of two FETs and a controller 83.

Then, an inductor current LC flows through the electrically connected one of the switching elements 82a, 82b, 82c to an associated one of the inductor wires 22, 431, 432 of the inductor component 10.

The DC-DC converter 80 includes the controller 83 that controls the on/off state of each of the switching elements 82a, 82b, 82c in accordance with the magnitude of current output from the inductor component 10. In other words, one of the inductor wires 22, 431, 432 for passing the inductor current LC is selected by the controller 83.

Assuming that a switching element electrically connected to an air core coil is defined as an air core switching element and a switching element electrically connected to a magnetic core coil is defined as a magnetic core switching element. In this case, the switching element 82a corresponds to the air core switching element, and the switching elements 82b, 82c correspond to the magnetic core switching elements.

Then, when a load current to the inductor component 10 is less than or equal to a first load current determination value, the controller 83 turns off the switching element 82a for the air core coil, and turns on a first switching element and turns off a second switching element of the switching elements 82b, 82c for the magnetic core coils. Thus, a current flows through one of the magnetic core coil 401 and the magnetic core coil 402, having a greater inductance than the air core coil 20. On the other hand, when a load current to the inductor component 10 exceeds the first load current determination value, the controller 83 turns on the switching element 82a and turns off the switching elements 82b, 82c. Thus, a current flows through the air core coil 20 having a better direct-current superposition characteristic than the magnetic core coils 401, 402. In other words, when the magnitude of a load current based on which whether a load is high is determined is defined as a predetermined current, the first load current determination value corresponds to the predetermined current.

In the present embodiment, the inductor component 10 includes the two magnetic core coils 401, 402. Then, it is assumed that the inductance of the magnetic core coil 402 is less than the inductance of the magnetic core coil 401 and the direct current electric resistance of the magnetic core coil 402 is higher than the direct current electric resistance of the magnetic core coil 401. In this case, when a load current is less than or equal to a second load current determination value less than the first load current determination value, the switching element 82c is preferably turned on and the switching elements 82a, 82b are preferably turned off. Thus, a current can be passed through the magnetic core coil 402 having a low inductance and an intermediate direct current electric resistance. When a load current is greater than the second load current determination value and less than or equal to the first load current determination value, the switching elements 82a, 82c are preferably turned off, and the switching element 82b is preferably turned on. Thus, a current can be passed through the magnetic core coil 401 having an intermediate inductance and a low direct current electric resistance. When a load current exceeds the first load current determination value, the switching elements 82b, 82c are preferably turned off, and the switching element 82a is preferably turned on. Thus, a current can be passed through the air core coil 20 having a high inductance and a high direct current electric resistance. By using the three inductors in this way, the inductance acquisition efficiency of the inductor component 10 is enhanced.

In the present embodiment, the following operation and advantageous effects are obtained.

(1-1) The inductor component 10 includes not only the magnetic core coils 401, 402 but also the air core coil 20 having a higher magnetic saturation current than the magnetic core coils 401, 402. For this reason, in the DC-DC converter 80 in which a current to be input to the inductor component 10 is relatively large, the magnetic core coils 401, 402 and the air core coil 20 are used according to the magnitude of a load current, with the result that the DC-DC converter 80 is appropriately operated. Therefore, while the inductor having a high inductance acquisition efficiency is provided, it is possible to support a large current.

(1-2) With the magnetic core coils 401, 402, when the frequency of inductor current LC is higher than or equal to about 1 MHz and lower than or equal to about 50 MHz (i.e., from about 1 MHz to about 50 MHz), the effective magnetic permeability is higher than or equal to about three. Such a frequency range provides switching frequencies to be used in a radio-frequency DC-DC converter for, for example, supplying power to a CPU or a GPU. Therefore, when the magnetic core coils 401, 402 are configured as described above, the inductor component 10 can be made as an inductor component suitable for a DC-DC converter for a CPU or a GPU.

(1-3) The inductance of each of the magnetic core coils 401, 402 is greater than the inductance of the air core coil 20, so the inductance acquisition efficiency of each of the magnetic core coils 401, 402 is higher than the inductance acquisition efficiency of the air core coil 20. When the inductor component 10 includes the magnetic core coils having a high inductance acquisition efficiency in this way, the inductance acquisition efficiency is increased while an increase in the size of the inductor component 10 is suppressed. More specifically, the areas of the first main surface 11 and the second main surface 12 can be reduced. As a result, in mounting the inductor component 10 on a circuit board, it is easy to ensure an installation location for the inductor component 10 on the circuit board.

(1-4) In the DC-DC converter 80, when a load current that is a current flowing to a load side is relatively large, a lower direct current electric resistance is given a higher priority than a greater inductance as the performance desired for an inductor component. In the present embodiment, in the above case, the direct current electric resistance of the air core coil 20 is lower than the direct current electric resistance of each of the magnetic core coils 401, 402. For this reason, in the case where the inductor component 10 is used in the DC-DC converter 80, when a load current is large, a current is passed through the air core coil 20 in which magnetic saturation is less likely to occur. With this configuration, the function of the inductor component 10 can be more easily exercised by the amount by which a decrease in inductance is suppressed.

(1-5) In the present embodiment, the inductor component 10 includes a plurality of inductors, that is, the air core coil 20 and the magnetic core coils 401, 402. For this reason, the inductance of the inductor component 10 can be set to an appropriate value according to a load current at that time by changing the inductor through which a current is passed or changing the number of inductors through which a current is passed according to the magnitude of the load current. Thus, the efficiency of the DC-DC converter 80 is enhanced.

(1-6) In the present embodiment, the inductor wires 22, 431, 432 are disposed in the predetermined disposition plane Z1. For this reason, in comparison with the case where the position in the thickness direction X2 of a part of the inductor wires 22, 431, 432 is different from the positions in the thickness direction X2 of the remaining inductor wires, an increase in the dimension of the inductor component 10 in the thickness direction X2 is suppressed. Therefore, the inductor component 10 is made as an inductor component suitable for a circuit of which component mounting efficiency improves by means of three-dimensional mounting, for example, a circuit around a CPU or a GPU.

(1-7) As shown in FIG. 2, a direct distance NA from the first air core outer terminal 30 to the second air core outer terminal 31 in the air core coil 20, a direct distance NB from the first magnetic core outer terminal 511 to the second magnetic core outer terminal 521 in the magnetic core coil 401, and a direct distance NC from the first magnetic core outer terminal 512 to the second magnetic core outer terminal 522 in the magnetic core coil 402 are equal to one another. Thus, in comparison with the case where a part of the direct distances NA, NB, NC differs from the remaining direct distances, the inductor component 10 can be more easily mounted on a circuit board.

The direct distance between a pair of outer terminals is a distance from the center of a first outer terminal to the center of a second outer terminal of the pair of outer terminals in the first main surface 11 of the inductor component 10. The pair of outer terminals is two outer terminals electrically connected to an inductor wire.

(1-8) By varying the volumes of the magnetic core bodies 411, 412 from each other, both a magnetic core coil having a high magnetic permeability and a low direct-current superposition characteristic and a magnetic core coil having a low magnetic permeability and a high direct-current superposition characteristic can be provided in the inductor component 10 even with the same magnetic material and composition ratio.

(1-9) When the disposition plane Z1 is parallel to the first main surface 11, it is possible to suppress long direct distances from the inductor wires 22, 431, 432 to the outer terminals 30, 31, 511, 521, 512, 522.

(1-10) The inductor component 10 includes the surface layer 16. Thus, oxidation of a metal material contained in the magnetic core bodies 411, 412 is suppressed.

(1-11) When the inductor component 10 in which the air core coil 20 and the magnetic core coils 401, 402 are combined or integrated is used in the DC-DC converter 80, the number of components of the DC-DC converter 80 is reduced as compared to when the air core coil 20 and the magnetic core coils 401, 402 are individually provided in the DC-DC converter 80. As a result, an increase in the size of the DC-DC converter 80 is suppressed. In addition, mounting one component results in mounting a plurality of inductors. Therefore, in comparison with the case where a plurality of inductors is individually mounted, the number of man-hours needed for mounting components is reduced.

(1-12) When the inductor component 10 is used in the DC-DC converter 80, the inductor through which a current is passed can be selected from between the magnetic core coil 401 and the magnetic core coil 402 not under high load. Therefore, it is possible to expand the range of power supply circuits that can be supported by the inductor component 10 and, by extension, to increase the flexibility of design of a power supply circuit.

Next, an example of a manufacturing method for the above-described inductor component 10 will be described with reference to FIG. 8 to FIG. 20. The manufacturing method described here is a method using a semiadditive process to form the inductor wires 22, 431, 432.

Figure 8:
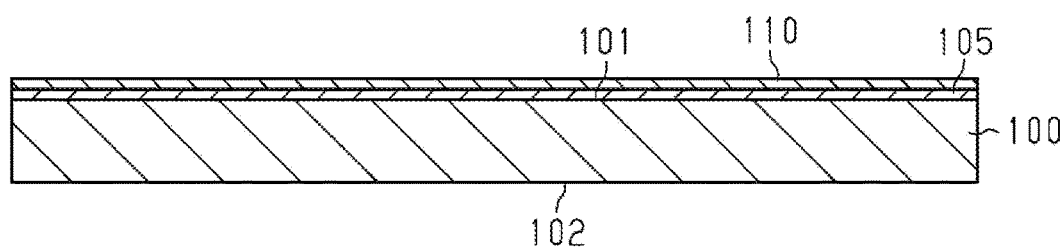
FIG. 8 is a diagram illustrating a manufacturing method for the inductor component.

As shown in FIG. 8, in the first step, a first manufacturing electrically insulating layer 105 is formed on a substrate 100. The substrate 100 has a substantially sheet shape. The material of the substrate 100 may be, for example, ceramic. In FIG. 8, the top surface of the substrate 100 is defined as a front surface 101, and the undersurface of the substrate 100 is defined as a back surface 102. The first manufacturing electrically insulating layer 105 is formed on the substrate 100 to cover the whole front surface 101 of the substrate 100. The first manufacturing electrically insulating layer 105 is made of the same non-magnetic material as the electrically insulating layer 53 and the air core body 21 that are components of the inductor component 10. The first manufacturing electrically insulating layer 105 may be formed by, for example, applying polyimide varnish containing trifluoromethyl group and silsesquioxane onto the front surface 101 of the substrate 100 by spin coating.

When formation of the first manufacturing electrically insulating layer 105 completes, the next step starts. In this step, a second manufacturing electrically insulating layer 110 is formed on the first manufacturing electrically insulating layer 105. As will be described in detail later, part of the second manufacturing electrically insulating layer 110 becomes the electrically insulating layers 53 of the magnetic core coils 401, 402. The second manufacturing electrically insulating layer 110 may be formed by, for example, applying polyimide varnish containing trifluoromethyl group and silsesquioxane onto the first manufacturing electrically insulating layer 105 by spin coating.

Figure 9:
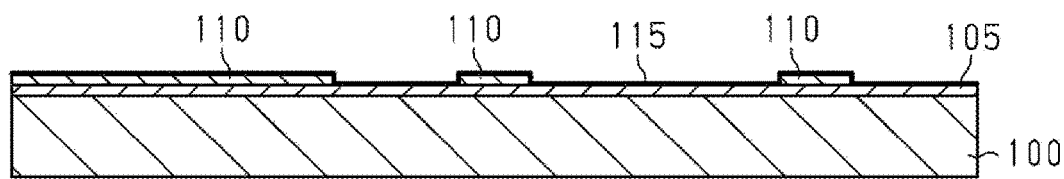
FIG. 9 is a diagram illustrating the manufacturing method.

When formation of the second manufacturing electrically insulating layer 110 completes, the next step starts. In this step, the second manufacturing electrically insulating layer 110 is subjected to working as shown in FIG. 9. Part of the second manufacturing electrically insulating layer 110 is removed by, for example, photolithography. In the example shown in FIG. 9, in the second manufacturing electrically insulating layer 110, a portion where the air core body 21 of the air core coil 20 is formed, a portion caused to function as the electrically insulating layer 53 of the magnetic core coil 401, and a portion caused to function as the electrically insulating layer 53 of the magnetic core coil 401 are left, and the other portion is removed.

Photolithography will be described. Initially, a photoresist is applied onto the second manufacturing electrically insulating layer 110 by spin coating. Subsequently, exposure is performed by using an exposure apparatus. Thus, in the photoresist, a portion covering a removal object portion in the second manufacturing electrically insulating layer 110 can be removed through a development process (described later), and the other portion is cured. When a negative-type resist is employed as a photoresist, an exposed portion of the photoresist is cured and the other portion can be removed. On the other hand, when a positive-type resist is employed as a photoresist, an exposed portion of the photoresist can be removed and the other portion is cured. By controlling a portion to be exposed in a photoresist, part of a portion stuck on the second manufacturing electrically insulating layer 110 can be cured. Subsequently, the removal object portion in the photoresist is removed through a development process using a developer. Then, the cured portion in the photoresist is left as a protective film. A pattern is formed by patterning a protective film in this way. The pattern has an open shape corresponding to the shape of the removal object portion. Subsequently, the exposed portion, that is, a portion not covered with the protective film, in the second manufacturing electrically insulating layer 110 is removed by wet etching. After that, the protective film is removed through a process using a stripper solution.

When working of the second manufacturing electrically insulating layer 110 completes, the next step starts. In this step, a seed layer 115 is formed. In other words, as shown in FIG. 9, the seed layer 115 is formed so as to cover the exposed portion of the first manufacturing electrically insulating layer 105 and the whole top surface of the second manufacturing electrically insulating layer 110 in the drawing. The seed layer 115 containing copper is formed by, for example, sputtering. For example, the seed layer 115 with a thickness of about 200 nm is formed. As will be described in detail later, part of the seed layer 115 becomes the air core wire seed layer 26. Another part becomes the magnetic core wire seed layer 47.

Figure 10:
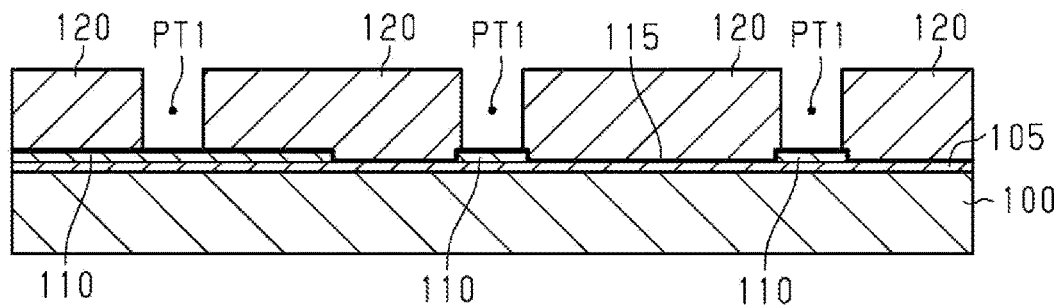
FIG. 10 is a diagram illustrating the manufacturing method.

When formation of the seed layer 115 completes, the next step starts. In this step, a first protective film 120 is formed as shown in FIG. 10. A photoresist is applied to the seed layer 115 by, for example, spin coating. Subsequently, exposure is performed by using an exposure apparatus. Thus, in the photoresist, portions corresponding to positions where the inductor wires 22, 431, 432 are formed can be removed through a development process (described later), and the other portion is cured. Subsequently, as shown in FIG. 10, portions corresponding to positions where the inductor wires 22, 431, 432 are formed in the photoresist are removed through a development process using a developer. The cured portion of the photoresist is left as the first protective film 120. A wiring pattern PT1 is formed by patterning the first protective film 120 in this way. The wiring pattern PT1 has opening shapes corresponding to the shapes of the inductor wires 22, 431, 432.

Figure 11:
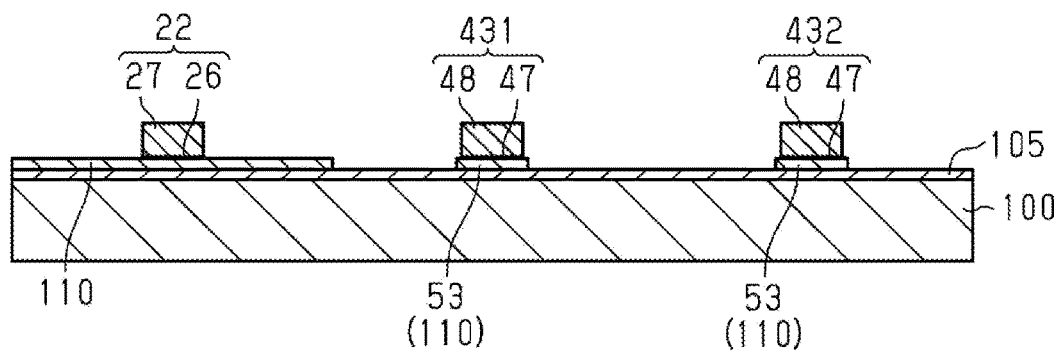
FIG. 11 is a diagram illustrating the manufacturing method.

When formation of the wiring pattern PT1 completes, the next step starts. In this step, the electrically conductive layers 27, 48 as shown in FIG. 11 are formed by supplying an electrically conductive material into the wiring pattern PT1. Copper and a small amount of sulfur mainly precipitate on the exposed portion of the seed layer 115 by, for example, performing electrolytic copper plating using a copper sulfate solution. Thus, the electrically conductive layers 27, 48 are formed. Since a copper sulfate solution is used, sulfur is contained in the electrically conductive layers 27, 48. The inductor wire 22 is made up of the electrically conductive layer 27 and a portion with which the electrically conductive layer 27 contacts in the seed layer 115. Each of the inductor wires 431, 432 is made up of the electrically conductive layer 48 and a portion with which the electrically conductive layer 48 contacts in the seed layer 115. In other words, in the seed layer 115, the portion with which the electrically conductive layer 27 contacts becomes the air core wire seed layer 26, and the portions with which the electrically conductive layers 48 contact become the magnetic core wire seed layers 47.

When formation of the electrically conductive layers 27, 48 completes, the first protective film 120 is removed as shown in FIG. 11 through a process using a stripper solution. When removal of the first protective film 120 completes, a portion that has been in contact with the first protective film 120 in the seed layer 115 is removed. The portion that has been in contact with the first protective film 120 in the seed layer 115 is removed by, for example, wet etching. In other words, portions other than the portions that become the air core wire seed layer 26 or the magnetic core wire seed layers 47 in the seed layer 115 are removed.

Figure 12:
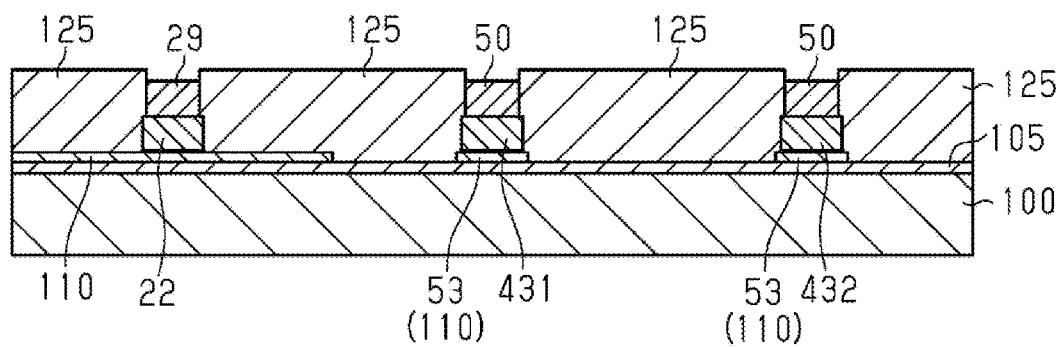
FIG. 12 is a diagram illustrating the manufacturing method.

In the next step, a second protective film 125 is formed as shown in FIG. 12. In other words, a photoresist is applied so as to hide the inductor wires 22, 431, 432. A photoresist is applied by, for example, spin coating. Subsequently, exposure is performed by using an exposure apparatus. Thus, in the photoresist, portions corresponding to positions where the vertical wires 29, 50 are formed can be removed through a development process (described later), and the other portion is cured. Subsequently, in the photoresist, non-cured portions are removed and the cured portions are left as the second protective film 125 through a development process using a developer. Thus, a vertical pattern that is a pattern for forming the vertical wires 29, 50 is formed.

Figure 13:
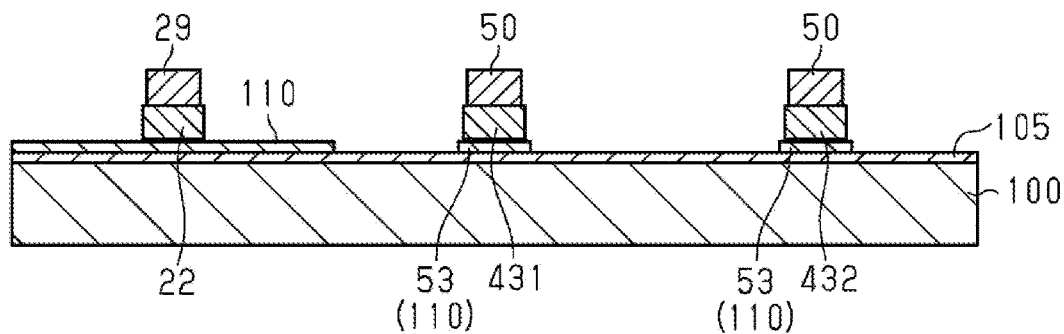
FIG. 13 is a diagram illustrating the manufacturing method.

When formation of the vertical pattern completes, the next step starts. In the next step, the vertical wires 29, 50 are formed as shown in FIG. 12. An electrically conductive material is supplied into the vertical pattern by, for example, performing electrolytic copper plating using a copper sulfate solution, with the result that the vertical wires 29, 50 are formed. In this case, when the inductor wires 22, 431, 432 are supplied with electric power via the dummy wires 28, 49, copper that is an electrically conductive material is supplied into the vertical pattern. When a copper sulfate solution is used in this way, a small amount of sulfur is contained in the vertical wires 29, 50. When formation of the vertical wires 29, 50 completes, the second protective film 125 is removed as shown in FIG. 13 through a process using a stripper solution.

Figure 14:
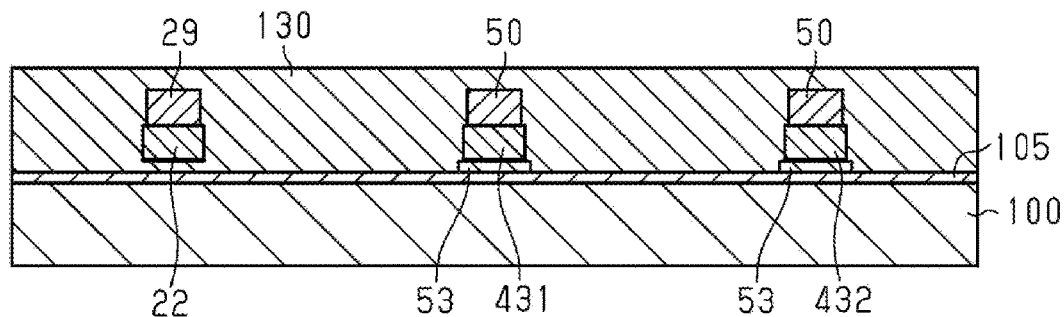
FIG. 14 is a diagram illustrating the manufacturing method.

When removal of the second protective film 125 completes, the next step starts. In this step, a third manufacturing electrically insulating layer 130 that covers the inductor wires 22, 431, 432 as shown in FIG. 14 is formed by applying the same non-magnetic electrically insulating material as the second manufacturing electrically insulating layer 110 by spin coating or the like. Part of the third manufacturing electrically insulating layer 130 becomes the air core body 21 of the air core coil 20.

Figure 15:
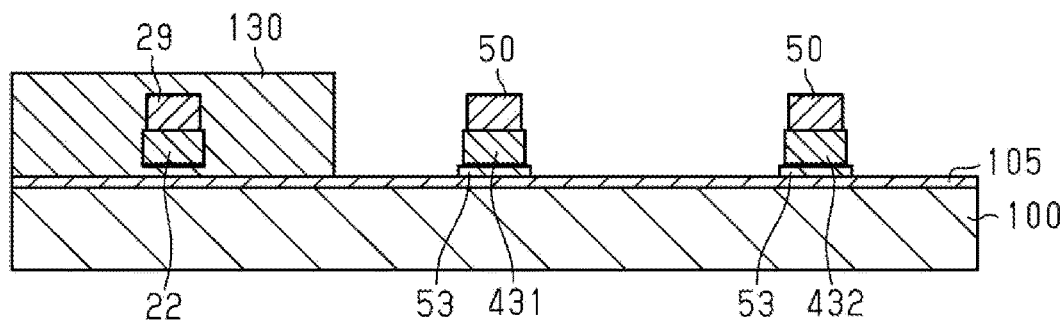
FIG. 15 is a diagram illustrating the manufacturing method.

Subsequently, as shown in FIG. 15, portions that cover the magnetic core inductor wires 431, 432 in the third manufacturing electrically insulating layer 130 are removed. Portions that cover the magnetic core inductor wires 431, 432 in the third manufacturing electrically insulating layer 130 can be removed by, for example, photolithography. Removal of the portions may be performed by using a laser for scraping the portions instead of photolithography.

Figure 16:
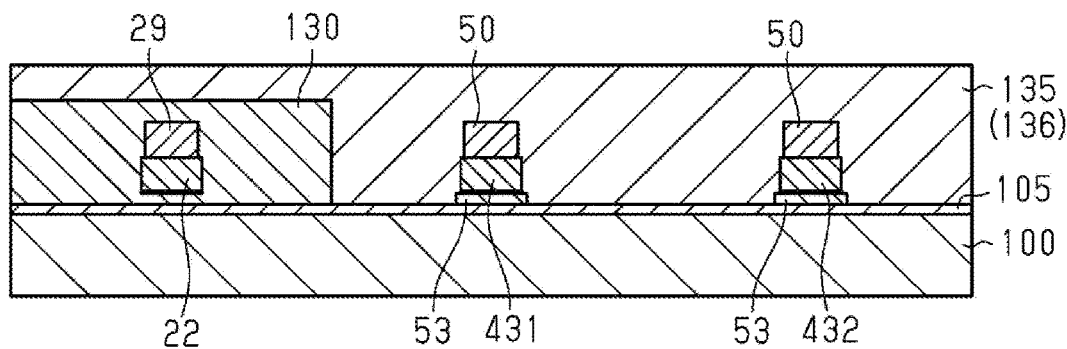
FIG. 16 is a diagram illustrating the manufacturing method.

When the magnetic core inductor wires 431, 432 are exposed through such a process, the next step starts. In this step, a manufacturing magnetic layer 136 is formed by pressing a magnetic sheet 135 from the upper side in FIG. 16. At this time, the manufacturing magnetic layer 136 may be formed by laminating a plurality of magnetic sheets 135 in the up-and-down direction in the drawing. When the manufacturing magnetic layer 136 is formed, the magnetic core inductor wires 431, 432 and the third manufacturing electrically insulating layer 130 are covered with the manufacturing magnetic layer 136 as shown in FIG. 16.

Figure 17:
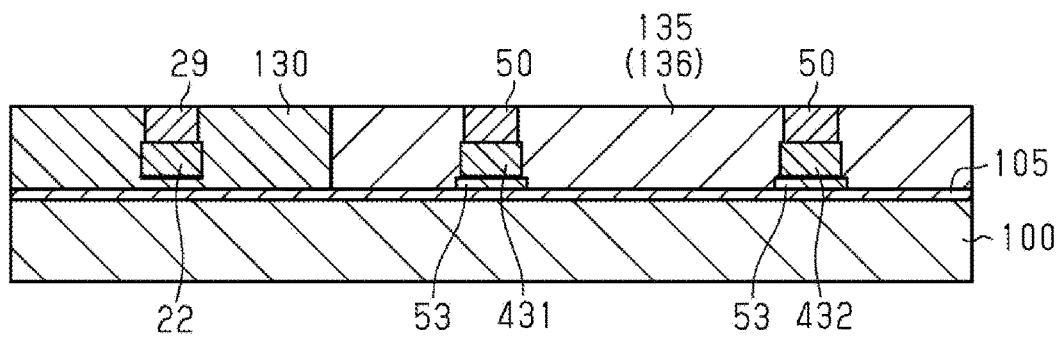
FIG. 17 is a diagram illustrating the manufacturing method.

When formation of the manufacturing magnetic layer 136 completes, the next step starts. In this step, the manufacturing magnetic layer 136 and the third manufacturing electrically insulating layer 130 are ground. As shown in FIG. 17, grounding is performed until the end surfaces (top surfaces in the drawing) of the vertical wires 29, 50 are exposed. A remaining portion in the third manufacturing electrically insulating layer 130 functions as the magnetic layer 42 of the magnetic core bodies 411, 412.

Figure 18:
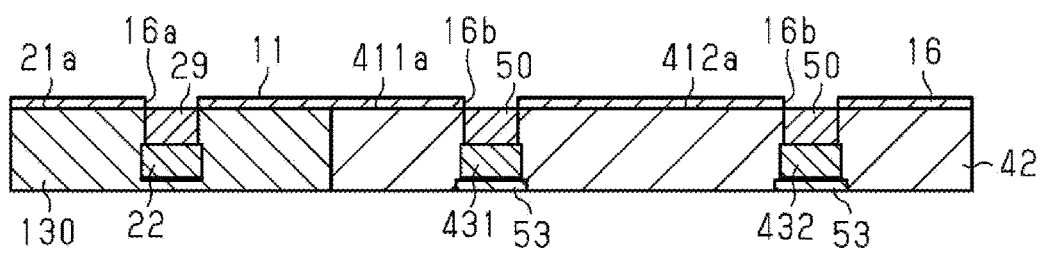
FIG. 18 is a diagram illustrating the manufacturing method.

When grinding completes, the next step starts. In this step, the surface layer 16 is formed on the top surfaces of the third manufacturing electrically insulating layer 130 and the magnetic layer 42 in the drawing, as shown in FIG. 18. In other words, the top surface of the third manufacturing electrically insulating layer 130 in the drawing becomes the main surface 21a of the air core body 21 of the air core coil 20. Of the top surface of the magnetic layer 42 in the drawing, the left-side portion in the drawing becomes the main surface 411a of the magnetic core body 411 of the magnetic core coil 401, and the right-side portion in the drawing becomes the main surface 412a of the magnetic core body 412 of the magnetic core coil 402. The surface layer 16 is formed by, for example, applying a non-magnetic electrically insulating resin. In this state, the vertical wires 29, 50 are also covered with the surface layer 16. Then, the through-holes 16a, 16b are formed at positions where the outer terminals 30, 31, 511, 512, 521, 522 are formed in the surface layer 16. The through-holes 16a, 16b can be formed by, for example, applying a laser beam to the surface layer 16. When the surface layer 16 is formed, the surface layer 16 may be formed by patterning a non-magnetic electrically insulating resin on the top surface in the drawing by using photolithography. In this case, the surface layer 16 having the through-holes 16a, 16b can be formed by photolithography, so a step of forming the through-holes 16a, 16b by using a laser can be omitted.

When formation of the surface layer 16 completes, the next step starts. In this step, as shown in FIG. 18, the substrate 100 and the first manufacturing electrically insulating layer 105 are removed by grinding. Grinding is performed until the magnetic layer 42 appears.

Figure 19:
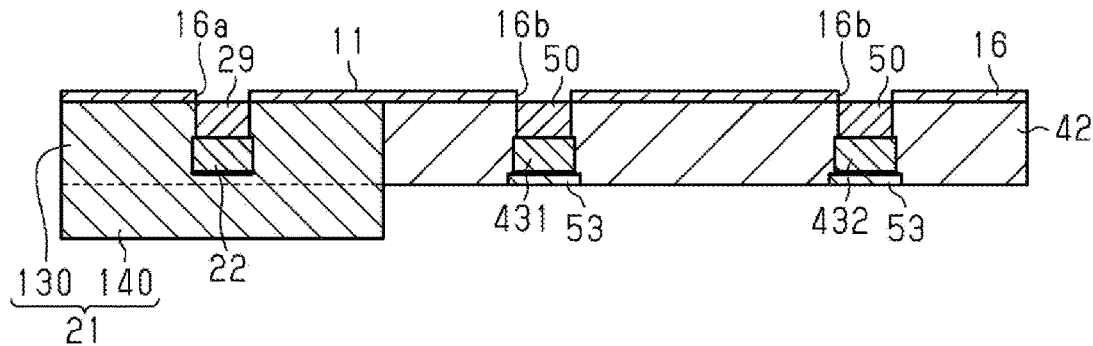
FIG. 19 is a diagram illustrating the manufacturing method.

When grinding completes, the next step starts. In this step, as shown in FIG. 19, a fourth manufacturing electrically insulating layer 140 is formed by photolithography. The fourth manufacturing electrically insulating layer 140 is in contact with the undersurface of the third manufacturing electrically insulating layer 130 in the drawing but is not in contact with the undersurface of the magnetic layer 42 in the drawing. The air core body 21 of the air core coil 20 is formed by the third manufacturing electrically insulating layer 130 and the fourth manufacturing electrically insulating layer 140.

Figure 20:
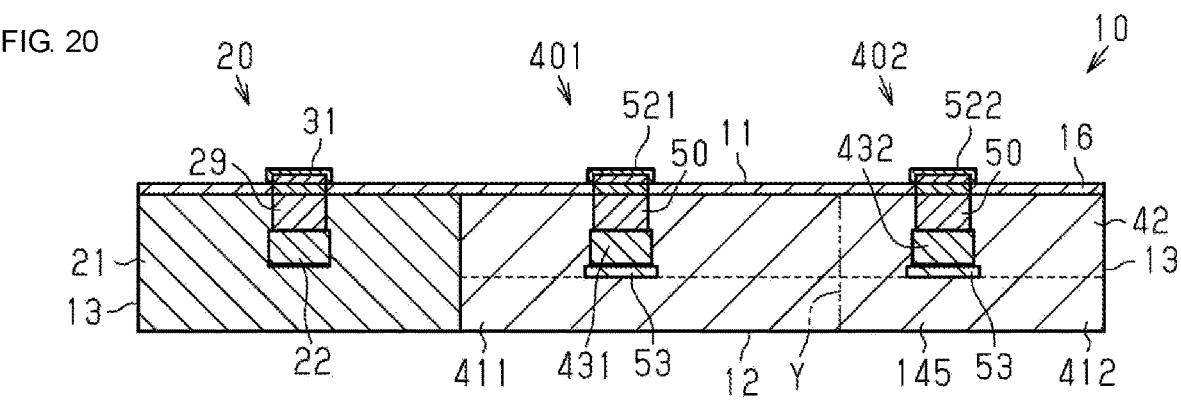
FIG. 20 is a diagram illustrating the manufacturing method.

When formation of the air core body 21 completes, the next step starts. In this step, as shown in FIG. 20, the magnetic core body 411 of the magnetic core coil 401 and the magnetic core body 412 of the magnetic core coil 402 are formed by pressing a magnetic sheet 145 against the magnetic layer 42.

When formation of the magnetic core bodies 411, 412 completes, the next step starts. In this step, the air core body 21, the magnetic core body 411, and the magnetic core body 412 are combined or integrated by thermal curing. When the bodies 21, 411, 412 are combined or integrated, the next step starts. In this step, as shown in FIG. 20, the outer terminals 30, 31, 511, 512, 521, 522 are formed. Thus, a series of steps that compose the manufacturing method for the inductor component 10 ends.

The above-described manufacturing method is an example of the case where the inductor component 10 is manufactured one by one. However, the manufacturing method for the inductor component 10 is not limited thereto. For example, portions to be a plurality of inductor components 10 may be disposed in a matrix on the substrate 100, and diced by a dicer after the end of a step of forming the outer terminals 30, 31, 511, 512, 521, 522. A curing step, such as heating, may be performed as needed after applying a non-magnetic electrically insulating resin or after pressing a magnetic sheet. A step of combining or integrating the bodies 21, 411, 412 may be performed after a step of forming the outer terminals 30, 31, 511, 512, 521, 522, or the bodies 21, 411, 412 may be combined or integrated by thermal curing in the middle of each step.

Second Embodiment

Next, a second embodiment of an inductor component will be described with reference to FIG. 21. In the following description, portions different from the first embodiment will be mainly described, like reference signs denote the same or corresponding components to those of the first embodiment, and the description will not be repeated.

Figure 21:
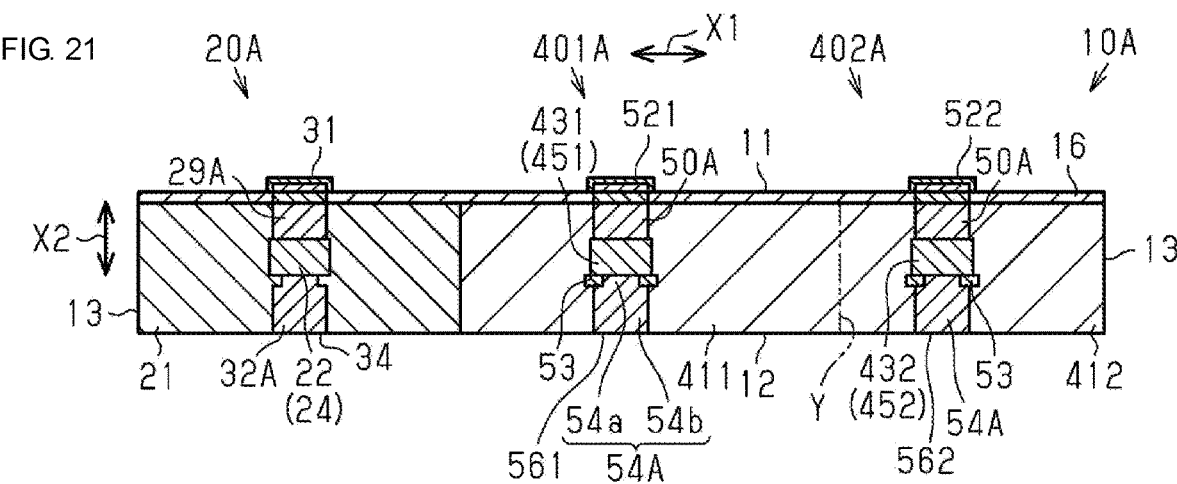
FIG. 21 is a cross-sectional view schematically showing an inductor component.

As shown in FIG. 21, in an inductor component 10A of the present embodiment, an air core coil 20A includes a first vertical wire 29A that is a vertical wire extending from a connection portion with the air core inductor wire 22 toward the first main surface 11, and a second vertical wire 32A that is a vertical wire extending from the connection portion to the second main surface 12. In other words, of both end surfaces of the second vertical wire 32A, the end surface exposed at the second main surface 12 is an air core outer terminal 34 that is an outer terminal. FIG. 21 shows the air core outer terminal 34 electrically connected to the second end portion 24 of the air core inductor wire 22; however, there is also an air core outer terminal 34 electrically connected to the first end portion 23 of the air core inductor wire 22. When the outer terminal exposed at the second main surface 12 and electrically connected to the air core inductor wire 22 is defined as a third air core outer terminal, the air core outer terminal 34 corresponds to the third air core outer terminal.

A magnetic core coil 401A includes a first vertical wire 50A that is a vertical wire extending from a connection portion with the magnetic core inductor wire 431 toward the first main surface 11, and a second vertical wire 54A extending from the connection portion to the second main surface 12. A magnetic core coil 402A includes a first vertical wire 50A that is a vertical wire extending from a connection portion with the magnetic core inductor wire 432 toward the first main surface 11, and a second vertical wire MA extending from the connection portion to the second main surface 12. In other words, of both end surfaces of the second vertical wire MA, the end surface exposed at the second main surface 12 is a magnetic core outer terminal 561 or a magnetic core outer terminal 562 that is an outer terminal. FIG. 21 shows the magnetic core outer terminal 561 electrically connected to the second end portion 451 of the magnetic core inductor wire 431, and the magnetic core outer terminal 562 electrically connected to the second end portion 452 of the magnetic core inductor wire 432; however, there are also a magnetic core outer terminal 561 electrically connected to the first end portion 441 of the magnetic core inductor wire 431 and a magnetic core outer terminal 562 eclectically connected to the first end portion 442 of the magnetic core inductor wire 432. When the outer terminal exposed to the second main surface 12 and electrically connected to the magnetic core inductor wire 431 is defined as a third magnetic core outer terminal, the magnetic core outer terminal 561 corresponds to the third magnetic core outer terminal. When the outer terminal exposed to the second main surface 12 and electrically connected to the magnetic core inductor wire 432 is defined as a third magnetic core outer terminal, the magnetic core outer terminal 562 corresponds to the third magnetic core outer terminal.

Each second vertical wire 54A extends through the electrically insulating layer 53. In other words, each second vertical wire 54A has a via 54a extending through the electrically insulating layer 53, and a columnar wire 54b connected to the via 54a.

According to the present embodiment, in addition to advantageous effects equivalent to (1-1) to (1-11), the following advantageous effect is further obtained.

(2-1) In mounting the inductor component 10A on a circuit board, the inductor component 10A can be mounted such that the first main surface 11 faces the circuit board or the inductor component 10A may be mounted such that the second main surface 12 faces the circuit board. In other words, in mounting the inductor component 10A on a circuit board, the mounting flexibility is enhanced.

Third Embodiment

Next, a third embodiment of an inductor component will be described with reference to FIG. 22 to FIG. 24. In the following description, portions different from the first embodiment will be mainly described, like reference signs denote the same or corresponding components to those of the first embodiment, and the description will not be repeated.

Figure 22:
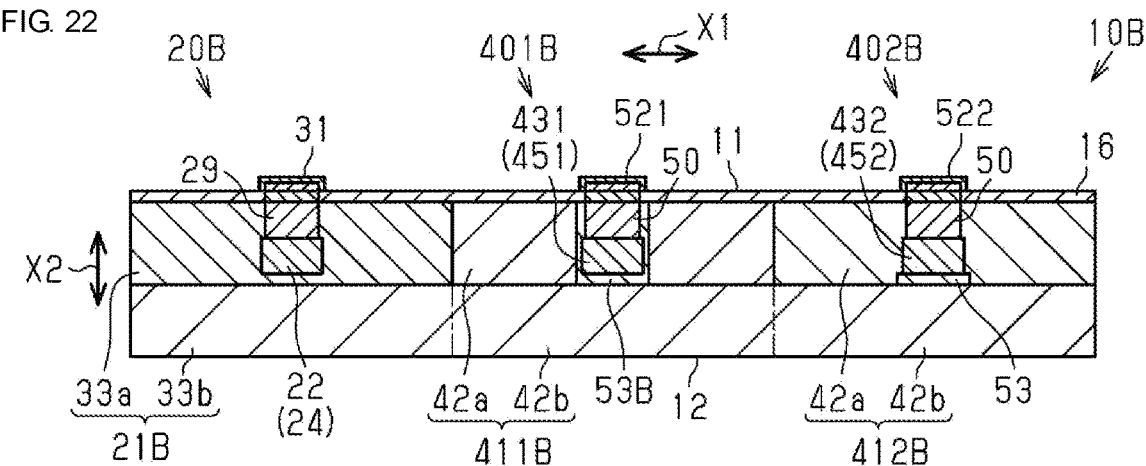
FIG. 22 is a cross-sectional view schematically showing an inductor component.
Figure 23:
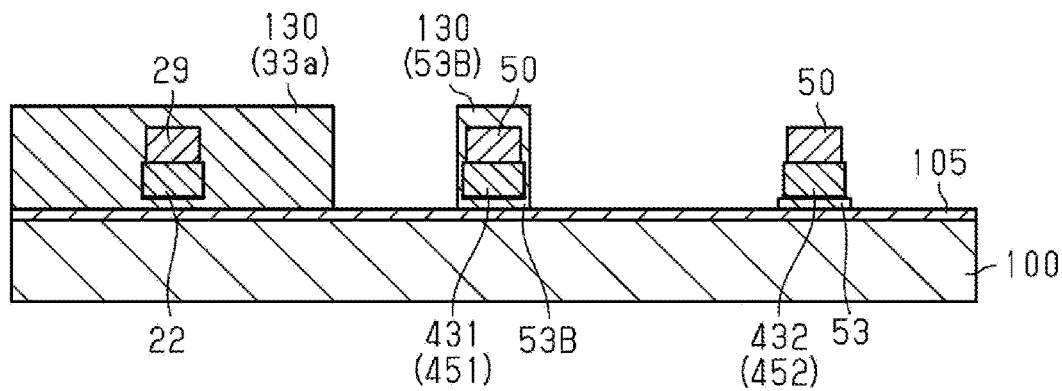
FIG. 23 is a diagram illustrating a manufacturing method for the inductor component.

As shown in FIG. 22, in an inductor component 10B of the present embodiment, an air core body 21B of an air core coil 20B includes an electrically insulating layer 33a and a magnetic layer 33b that are laminated along the thickness direction X2. Specifically, in the thickness direction X2, the electrically insulating layer 33a and the magnetic layer 33b are laminated such that the electrically insulating layer 33a is located between the surface layer 16 and the magnetic layer 33b. The air core inductor wire 22 is provided in the electrically insulating layer 33a. In this case, the electrically insulating layer 33a is a non-magnetic electrical insulator. The magnetic layer 33b contains a magnetic material. The magnetic layer 33b is made up of, for example, a resin containing metal magnetic particles.

In the present embodiment, the air core inductor wire 22 is disposed in the electrically insulating layer 33a. In the peripheral region FA around the air core inductor wire 22, the magnetic material content Ra is lower than about 50%, with the result that the air core coil 20 is provided in the inductor component 10B.

In the inductor component 10B, a magnetic core body 411B of a magnetic core coil 401B includes a first magnetic layer 42a and a second magnetic layer 42b laminated along the thickness direction X2. In addition, a magnetic core body 412B of a magnetic core coil 402B, as well as the magnetic core body 411B, includes a first magnetic layer 42a and a second magnetic layer 42b laminated along the thickness direction X2. Specifically, in the thickness direction X2, the first magnetic layer 42a and the second magnetic layer 42b are laminated such that the first magnetic layer 42a is located between the surface layer 16 and the second magnetic layer 42b. The magnetic core inductor wire 431 is provided in the first magnetic layer 42a. The magnetic core inductor wire 432 is provided in the first magnetic layer 42a.

The first magnetic layer 42a contains a magnetic material not contained in the second magnetic layer 42b. For example, the first magnetic layer 42a may contain iron-based magnetic particles, such as iron and alloys containing iron, and the second magnetic layer 42b may contain another magnetic material, other than iron-based magnetic particles. The second magnetic layer 42b is, for example, a substrate bound by sintering ferrite particles, that is, a sintered body of ferrite particles. The second magnetic layer 42b may be a resin containing non-iron-based magnetic particles. In such a case, the second magnetic layer 42b does not contain iron-based magnetic particles. A magnetic material contained in the second magnetic layer 42b may be the same as a magnetic material contained in the first magnetic layer 42a.

In the present embodiment, the magnetic core inductor wire 431 and the vertical wires 50 are provided in the first magnetic layer 42a in a state of being covered with an electrically insulating film 53B all around. The electrically insulating film 53B is exceedingly thin. For this reason, in the peripheral region FB around the magnetic core inductor wire 431, the magnetic material content Ra is higher than or equal to about 50%. On the other hand, the magnetic core inductor wire 432 is not covered with the electrically insulating film 53B. For this reason, in the peripheral region FC around the magnetic core inductor wire 432 as well, the magnetic material content Ra is higher than or equal to about 50%. Thus, the magnetic core coils 401B, 402B can be provided in the inductor component 10B.

In the present embodiment, the magnetic layer 33b of the air core body 21B, the second magnetic layer 42b of the magnetic core body 411B, and the second magnetic layer 42b of the magnetic core body 412B contain the same magnetic material. Alternatively, the second magnetic layer 42b of the magnetic core body 411B may contain a magnetic material not contained in any of the magnetic layer 33b of the air core body 21B and the second magnetic layer 42b of the magnetic core body 412B. Alternatively, the magnetic layer 33b of the air core body 21B may contain a magnetic material not contained in any of the second magnetic layer 42b of the magnetic core body 411B and the second magnetic layer 42b of the magnetic core body 412B. Alternatively, the magnetic layer 42b of the magnetic core body 412B may contain a magnetic material not contained in any of the magnetic layer 33b of the air core body 21B and the second magnetic layer 42b of the magnetic core body 411B.

According to the present embodiment, in addition to advantageous effects equivalent to (1-1) to (1-12), the following advantageous effect is further obtained.

(3-1) A laminated body of a plurality of magnetic layers containing different magnetic materials is used as the magnetic core bodies 411B, 412B, so the magnetic permeability and direct-current superposition characteristic of each of the magnetic core coils 401B, 402B are more easily set to an appropriate magnitude.

Next, part of an example of a manufacturing method for the inductor component 10B will be described with reference to FIG. 23 and FIG. 24. The manufacturing method is similar to the manufacturing method described in the first embodiment until the third manufacturing electrically insulating layer 130 that covers the inductor wires 22, 431, 432 is formed. In the next step after formation of the third manufacturing electrically insulating layer 130, part of the third manufacturing electrically insulating layer 130 is removed as shown in FIG. 23. Specifically, a portion that makes up the air core body 21B of the air core coil 20B and a portion that makes up the electrically insulating film 53B that covers the magnetic core inductor wire 431 and vertical wires 50 of the magnetic core coil 401B are left, and the other portion is removed.

Figure 24:
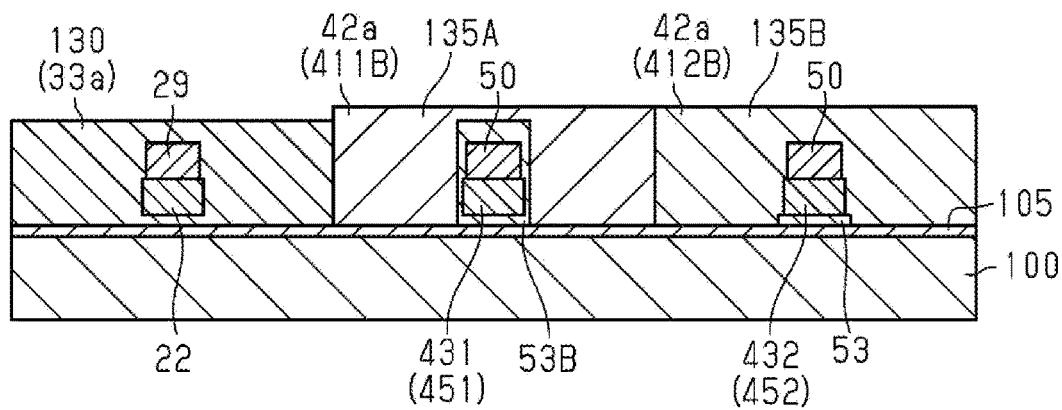
FIG. 24 is a diagram illustrating the manufacturing method.

In the next step, as shown in FIG. 24, the first magnetic layer 42a of the magnetic core body 411B of the magnetic core coil 401B is formed. In other words, a first magnetic sheet 135A for forming the first magnetic layer 42a is pressed against the substrate 100. Subsequently, the first magnetic layer 42a of the magnetic core body 412B of the magnetic core coil 402B is formed. In other words, a second magnetic sheet 135B for forming the first magnetic layer 42a is pressed against the substrate 100.

After that, the electrically insulating layer 33a of the air core body 21B and the first magnetic layers 42a of the magnetic core coils 401B, 402B are formed by grinding. After that, the substrate 100 and the first manufacturing electrically insulating layer 105 are removed by grinding. In this state, the magnetic layer 33b of the air core body 21B and the second magnetic layers 42b of the magnetic core coils 401B, 402B are formed. When the substrate 100 is a sintered body of ferrite, the substrate 100 can be formed into the electrically insulating layer 33a of the air core body 21B and the first magnetic layers 42a of the magnetic core coils 401B, 402B, so the substrate 100 does not need to be removed.

Fourth Embodiment

Next, a fourth embodiment of an inductor component will be described with reference to FIG. 25 to FIG. 27. In the following description, portions different from the first embodiment will be mainly described, like reference signs denote the same or corresponding components to those of the first embodiment, and the description will not be repeated.

Figure 25:
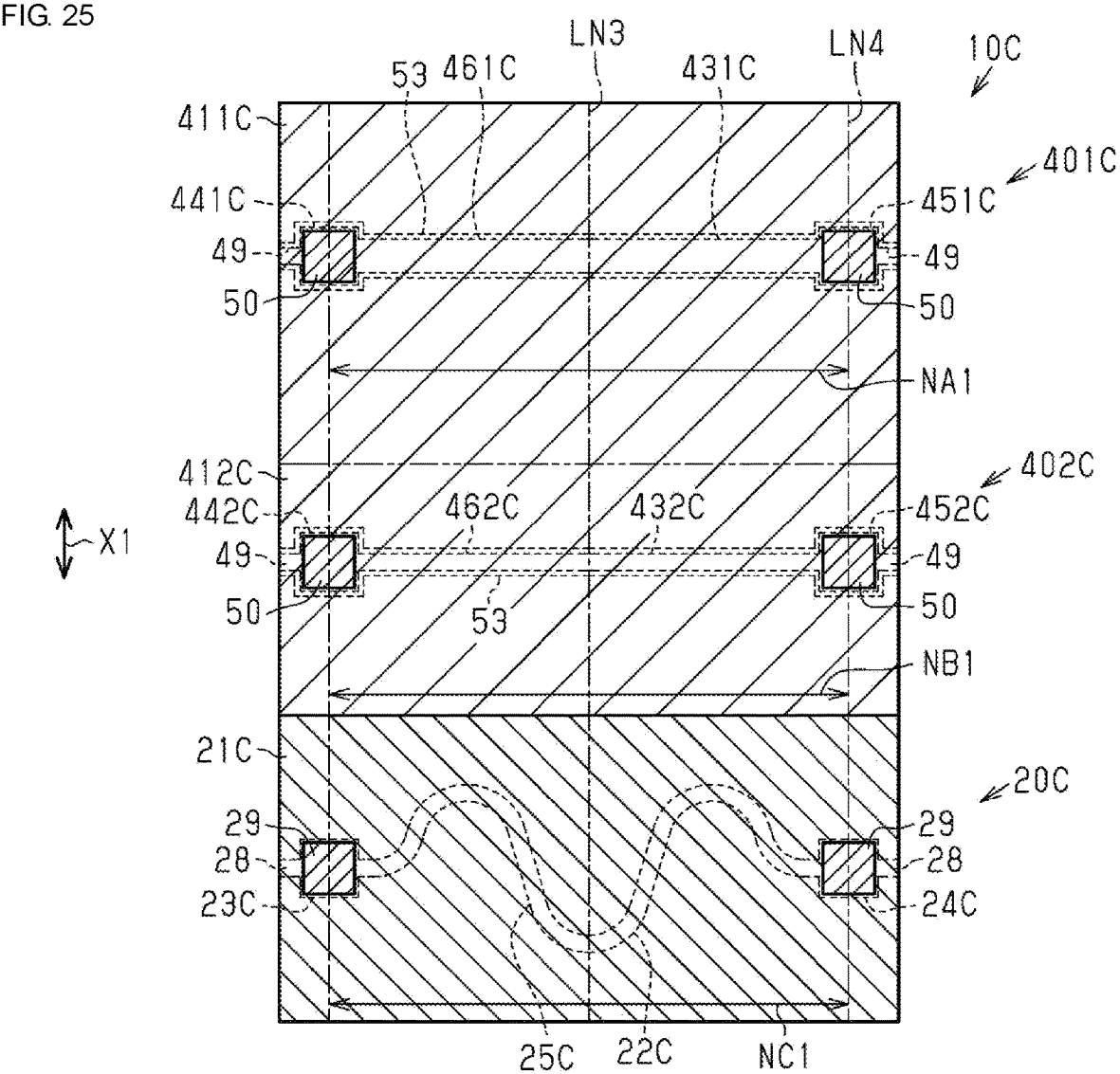
FIG. 25 is a cross-sectional view schematically showing an inductor component.

FIG. 25 is a cross-sectional view of an inductor component 10C of the present embodiment. FIG. 26 is a view showing a cross section when the inductor component 10C is cut along the line LN3 indicated by the alternate long and short dashed line in FIG. 25. FIG. 27 is a view showing a cross section when the inductor component 10C is cut along the line LN4 indicated by the alternate long and short dashed line in FIG. 25. The line LN4 is an imaginary straight line parallel to the line LN3.

Figure 26:
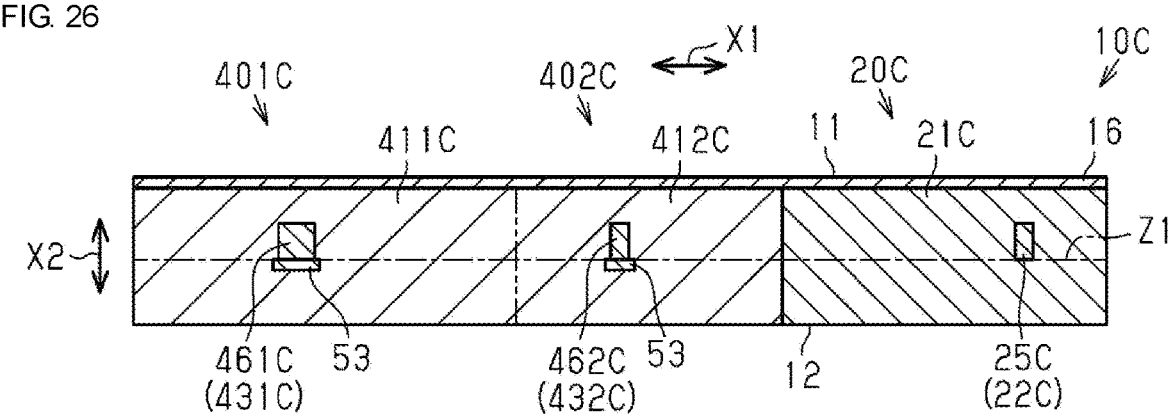
FIG. 26 is a cross-sectional view of the inductor component.
Figure 27:
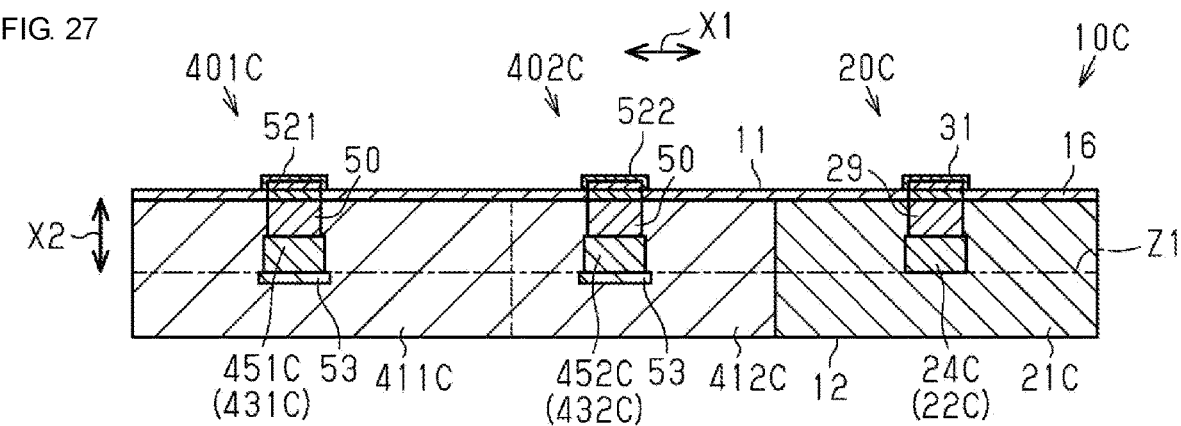
FIG. 27 is a cross-sectional view of the inductor component.

As shown in FIG. 25 and FIG. 26, the inductor component 10C is an array component in which an air core coil and magnetic core coils are combined or integrated. In this example, as shown in FIG. 25, the inductor component 10C includes two magnetic core coils 401C, 402C and one air core coil 20C. The magnetic core coils 401C, 402C and the air core coil 20C are arranged in the up-and-down direction in the drawing. In other words, in the up-and-down direction in the drawing, the magnetic core coils 401C, 402C and the air core coil 20C are arranged such that the magnetic core coil 402C is disposed between the magnetic core coil 401C and the air core coil 20C. Thus, a magnetic core body 412C of the magnetic core coil 402C is in contact with any of a magnetic core body 411C of the magnetic core coil 401C and an air core body 21C of the air core coil 20C. In the magnetic core coil 401C, a magnetic core inductor wire 431C is provided in the magnetic core body 411C. In the magnetic core coil 402C, a magnetic core inductor wire 432C is provided in the magnetic core body 412C. In the air core coil 20C, an air core inductor wire 22C is provided in the air core body 21C. As shown in FIG. 26, the inductor wires 431C, 432C, 22C are disposed in the predetermined disposition plane Z1 located between the first main surface 11 and the second main surface 12 in the up-and-down direction in the drawing.

The line LN3 is an imaginary straight line set so as to pass through an intermediate position between the first air core outer terminal 30 and the second air core outer terminal 31 electrically connected to the air core inductor wire 22C of the air core coil 20C, an intermediate position between the first magnetic core outer terminal 511 and the second magnetic core outer terminal 521 electrically connected to the magnetic core inductor wire 431C of the magnetic core coil 401C, and an intermediate position between the first magnetic core outer terminal 512 and the second magnetic core outer terminal 522 electrically connected to the magnetic core inductor wire 432C of the magnetic core coil 402C. The line LN4 is an imaginary straight line set at a position where a second end portion 24C of the air core inductor wire 22C, a second end portion 451C of the magnetic core inductor wire 431C, and a second end portion 452C of the magnetic core inductor wire 432C can be cut.

In the present embodiment, the magnetic core body 411C of the magnetic core coil 401C has a magnetic layer, and the magnetic core body 412C of the magnetic core coil 402C has a magnetic layer. The magnetic layer is configured such that the magnetic material content Ra is higher than or equal to about 50% in the peripheral region F around the magnetic core inductor wire 431C and the magnetic material content Ra is higher than or equal to about 50% in the peripheral region F around the magnetic core inductor wire 432C. For this reason, the inductor component 10C including the magnetic core coils is provided. The air core body 21C of the air core coil 20C has an electrically insulating layer. The electrically insulating layer is configured such that the magnetic material content Ra in the peripheral region F around the air core inductor wire 22C is lower than about 50%. For this reason, the inductor component 10C including the air core coil is provided.

The volume of the magnetic core body 411C of the magnetic core coil 401C is different from the volume of the magnetic core body 412C of the magnetic core coil 402C. In this example, as shown in FIG. 25 to FIG. 27, the volume of the magnetic core body 411C is greater than the volume of the magnetic core body 412C. The volume of the magnetic core body 411C may be the same as the volume of the magnetic core body 412C or may be less than the volume of the magnetic core body 412C.

As shown in FIG. 25, the magnetic core inductor wire 431C extends in the right-and-left direction in the drawing in the magnetic core coil 401C. Similarly, the magnetic core inductor wire 432C extends in the right-and-left direction in the drawing in the magnetic core coil 402C. In the magnetic core inductor wire 431C, the vertical wire 50 is connected to a first end portion 441C that is the left end portion in the drawing, and the vertical wire 50 is connected to a second end portion 451C that is the right end portion in the drawing. In the magnetic core inductor wire 432C, the vertical wire 50 is connected to a first end portion 442C that is the left end portion in the drawing, and the vertical wire 50 is connected to a second end portion 452C that is the right end portion in the drawing. The magnetic core inductor wire 431C includes a wire body 461C that connects the first end portion 441C and the second end portion 451C. The magnetic core inductor wire 432C includes a wire body 462C that connects the first end portion 442C and the second end portion 452C. In this example, as shown in FIG. 26, the area of the cross section of the wire body 461C of the magnetic core inductor wire 431C is greater than the area of the cross section of the wire body 462C of the magnetic core inductor wire 432C.

The magnetic core coil 401C includes the first magnetic core outer terminal 511 electrically connected to the first end portion 441C of the magnetic core inductor wire 431C via the vertical wire 50, and the second magnetic core outer terminal 521 electrically connected to the second end portion 451C of the magnetic core inductor wire 431C via the vertical wire 50. The magnetic core coil 402C includes the first magnetic core outer terminal 512 electrically connected to the first end portion 442C of the magnetic core inductor wire 432C via the vertical wire 50, and the second magnetic core outer terminal 522 electrically connected to the second end portion 452C of the magnetic core inductor wire 432C via the vertical wire 50. A direct distance NA1 from the first magnetic core outer terminal 511 to the second magnetic core outer terminal 521 in the magnetic core coil 401C is equal to a direct distance NB1 from the first magnetic core outer terminal 512 to the second magnetic core outer terminal 522 in the magnetic core coil 402C.

The air core inductor wire 22C of the air core coil 20C includes a first end portion 23C disposed at the same position as the first end portions 441C, 442C of the magnetic core inductor wires 431C, 432C in the right-and-left direction in FIG. 25, a second end portion 24C disposed at the same position as the second end portions 451C, 452C of the magnetic core inductor wires 431C, 432C in the right-and-left direction in FIG. 25, and a wire body 25C that connects the first end portion 23C and the second end portion 24C. The wire body 25C extends from a connection portion with the first end portion 23C to a connection portion with the second end portion 24C while meandering. For this reason, the line length of the air core inductor wire 22C is greater than the line length of each of the magnetic core inductor wires 431C, 432C. In this example, as shown in FIG. 26, the area of the cross section of the wire body 25C of the air core inductor wire 22C is equivalent to the area of the cross section of the wire body 462C of the magnetic core inductor wire 432C and is less than the area of the cross section of the wire body 461C of the magnetic core inductor wire 431C. With this configuration, the direct current electric resistance of the air core coil 20C is made higher than the direct current electric resistance of each of the magnetic core coils 401C, 402C.

The air core coil 20C includes the first air core outer terminal 30 electrically connected to the first end portion 23C of the air core inductor wire 22C via the vertical wire 29, and the second air core outer terminal 31 electrically connected to the second end portion 24C of the air core inductor wire 22C via the vertical wire 29. A direct distance NC1 from the first air core outer terminal 30 to the second air core outer terminal 31 in the air core coil 20C is equal to each of the direct distances NA1, NB1.

With the above configuration, in addition to advantageous effects equivalent to (1-1), (1-2), and (1-4) to (1-12), the following advantageous effect is further obtained.

(4-1) In the present embodiment, the direct current electric resistance of the air core coil 20C is higher than the direct current electric resistance of each of the magnetic core coils 401C, 402C. Although the inductance of the air core coil 20C is less than the inductance of each of the magnetic core coils 401C, 402C, the inductance of the air core coil 20C can be relatively increased. For this reason, when the inductor component 10C is used in the DC-DC converter 80, the inductance of the inductor component 10C can be increased at the time of passing a current through the air core coil 20C. As a result, the efficiency of the DC-DC converter 80 at the time of passing a current through the air core coil 20C is enhanced.

Fifth Embodiment

Next, a fifth embodiment of an inductor component will be described with reference to FIG. 28 to FIG. 45. In the following description, portions different from the first embodiment will be mainly described, like reference signs denote the same or corresponding components to those of the first embodiment, and the description will not be repeated.

Figure 28:
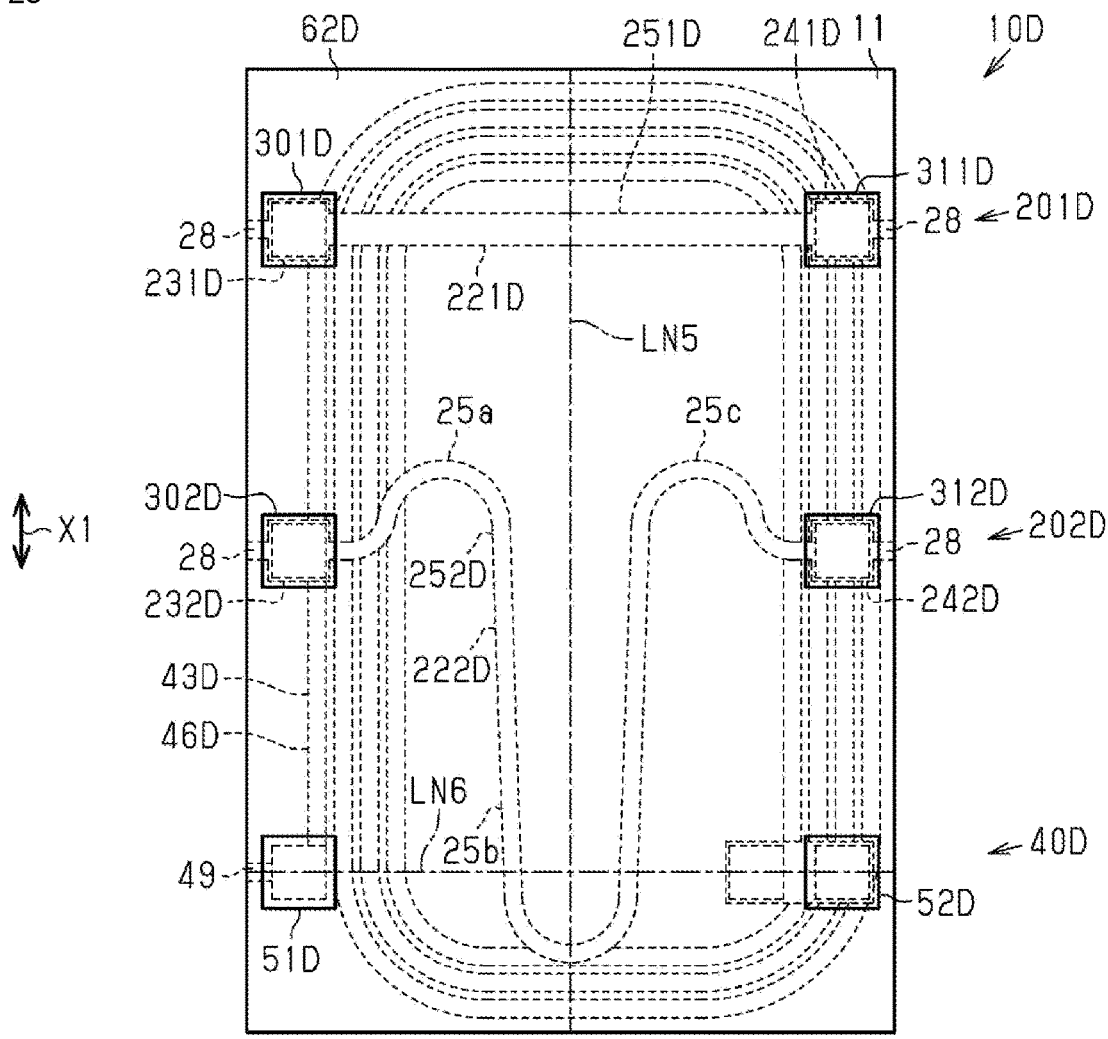
FIG. 28 is a plan view schematically showing an inductor component.
Figure 29:
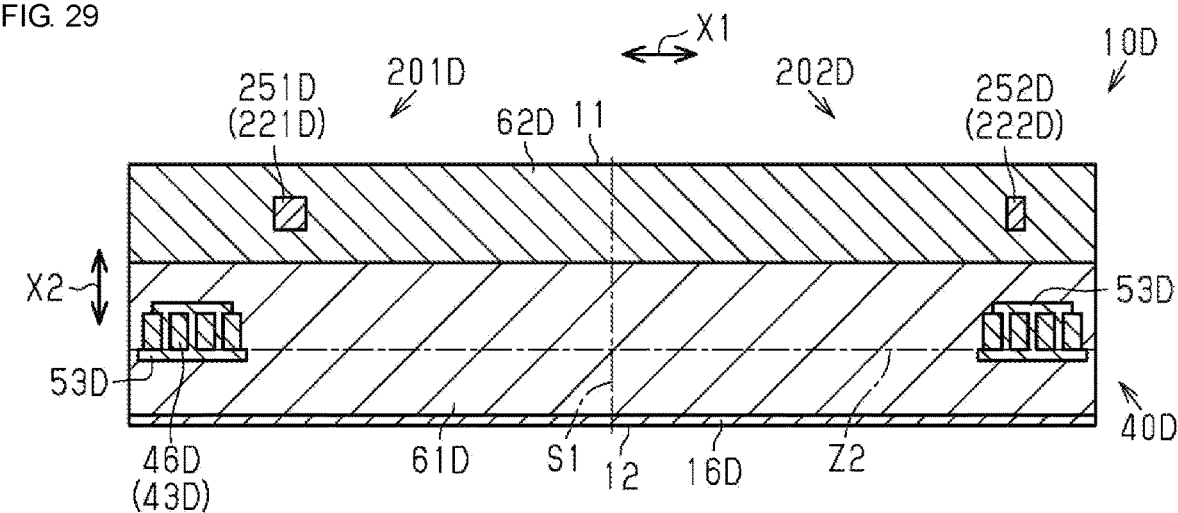
FIG. 29 is a cross-sectional view of the inductor component.
Figure 30:
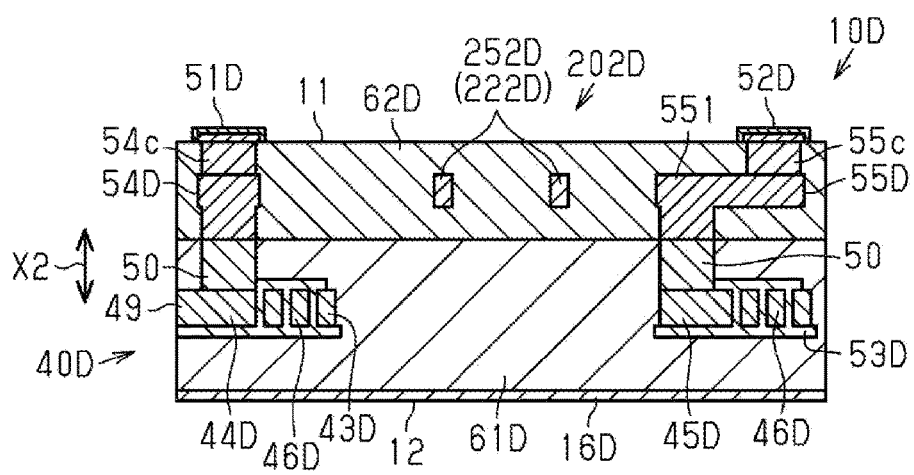
FIG. 30 is a cross-sectional view of the inductor component.

FIG. 28 is a plan view showing an inductor component 10D of the present embodiment. FIG. 29 is a view showing a cross section when the inductor component 10D is cut along the line LN5 indicated by the alternate long and short dashed line in FIG. 28. FIG. 30 is a view showing a cross section when the inductor component 10D is cut along the line LN6 indicated by the alternate long and short dashed line in FIG. 28. The line LN6 is an imaginary straight line perpendicular to the line LN5. In FIG. 29 and FIG. 30, the up-and-down direction in the drawing is the thickness direction X2. A direction in which the line LN5 extends and that is the right-and-left direction in FIG. 29 is defined as the width direction X1.

The inductor component 10D is an array inductor component in which a plurality of air core coils 201D, 202D and one magnetic core coil 40D are combined or integrated. As shown in FIG. 28 and FIG. 29, the air core coils 201D, 202D and the magnetic core coil 40D are disposed at different positions in the thickness direction X2. In this example, the air core coils 201D, 202D are located on a first side in the thickness direction X2, which is the upper side in the drawing, and the magnetic core coil 40D is located on a second side in the thickness direction X2, which is the lower side in the drawing.

As shown in FIG. 28, first air core outer terminals 301D, 302D and second air core outer terminals 311D, 312D of the air core coils 201D, 202D and a first magnetic core outer terminal 51D and second magnetic core outer terminal 52D of the magnetic core coil 40D are exposed at the first main surface 11 of the inductor component 10D. The first air core outer terminals 301D, 302D and the first magnetic core outer terminal 51D are located on a first side (left side in the drawing) of the center in the right-and-left direction in the drawing, and the second air core outer terminals 311D, 312D and the second magnetic core outer terminal 52D are located on a second side (right side in the drawing) of the center in the right-and-left direction in the drawing. In the up-and-down direction in the drawing, the air core outer terminals 301D, 311D of the air core coil 201D are located on the uppermost side, the air core outer terminals 302D, 312D of the air core coil 202D are located in the middle, and the magnetic core outer terminals 51D, 52D of the magnetic core coil 40D are located on the lowermost side.

A direct distance from the first air core outer terminal 301D to the second air core outer terminal 311D in the air core coil 201D is defined as a first air core direct distance, and a direct distance from the first air core outer terminal 302D to the second air core outer terminal 312D in the air core coil 202D is defined as a second air core direct distance. A direct distance from the first magnetic core outer terminal 51D to the second magnetic core outer terminal 52D in the magnetic core coil 40D is defined as a magnetic core direct distance. In this case, the first air core direct distance, the second air core direct distance, and the magnetic core direct distance are equal to one another. A direct distance is, of a pair of electrically connected outer terminals, the length of a straight line connecting the center of a first outer terminal and the center of a second outer terminal.

In this example, the second main surface 12 of the inductor component 10D is made up of a surface layer 16D that is a non-magnetic electrical insulator. In other words, in the thickness direction X2, the surface layer 16D is disposed on the side across the magnetic core coil 40D from the air core coils 201D, 202D.

The inductor component 10D includes a magnetic portion 61D and an electrically insulating portion 62D disposed along the thickness direction X2. The magnetic portion 61D and the electrically insulating portion 62D are disposed such that the magnetic portion 61D is located between the surface layer 16D and the magnetic portion 61D. The magnetic portion 61D may be a laminated body in which a plurality of magnetic layers is laminated in the thickness direction X2 or may be made up of a single magnetic layer. Similarly, the electrically insulating portion 62D may be a laminated body in which a plurality of electrically insulating layers is laminated in the thickness direction X2 or may be made up of a single electrically insulating layer.

When a portion that has magnetism and in which the magnetic core inductor wire 43D is provided is defined as a magnetic core body, the magnetic portion 61D corresponds to the magnetic core body. When a portion that is a nonmagnetic electrical insulator and in which an air core inductor wire is provided is defined as an air core body, the electrically insulating portion 62D includes both the air core body of the air core coil 201D and the air core body of the air core coil 202D.

The magnetic core inductor wire 43D includes a first end portion 44D electrically connected to the first magnetic core outer terminal MD, a second end portion 45D electrically connected to the second magnetic core outer terminal 52D, and a wire body 46D connecting the first end portion 44D and the second end portion 45D. The wire body 46D extends along a predetermined magnetic core plane Z2. In other words, in the present embodiment, the magnetic core plane Z2 corresponds to a predetermined plane. As shown in FIG. 28 and FIG. 29, the wire body 46D has a substantially spiral shape about a central axis Si of the inductor component 10D shown in FIG. 29 in the predetermined magnetic core plane Z2. When viewed from above, the wire body 46D is wound in a substantially spiral shape in the counterclockwise direction in the drawing from the radially outer first end portion 44D toward the radially inner second end portion 45D.

The number of turns of the inductor wire is determined in accordance with an imaginary vector. The starting point of the imaginary vector is placed in an imaginary center line extending through the center of the inductor wire in the wire width in a direction in which the inductor wire extends. When the imaginary vector is viewed in the thickness direction X2, the imaginary vector is tangent to the imaginary center line extending in the direction in which the inductor wire extends. When the starting point of the imaginary vector is moved from a state where the starting point is placed at one end of the imaginary center line to the other end of the imaginary center line, the number of turns is determined as "1.0 turn" when the angle of rotation of the orientation of the imaginary vector is 360°. Therefore, when, for example, wound 180°, the number of turns is 0.5.

Incidentally, in this example, the number of turns of the wire body 46D of the magnetic core inductor wire 43D is greater than or equal to about three. As shown in FIG. 29, and FIG. 30, an electrically insulating film 53D that is in contact with the magnetic core inductor wire 43D is provided in the magnetic portion 61D. The electrically insulating film 53D may be omitted.

The air core inductor wire 221D of the air core coil 201D includes a first end portion 231D electrically connected to the first air core outer terminal 301D, a second end portion 241D electrically connected to the second air core outer terminal 311D, and a wire body 251D connecting the first end portion 231D and the second end portion 241D. The wire body 251D extends parallel to the magnetic core plane Z2. In this example, as shown in FIG. 28, the wire body 251D extends in the right-and-left direction in the drawing. In other words, the number of turns of the air core inductor wire 221D is less than the number of turns of the magnetic core inductor wire 43D of the magnetic core coil 40D. More specifically, the number of turns of the air core inductor wire 221D is less than about 1.0.

The inductor wire 222D of the air core coil 202D includes a first end portion 232D electrically connected to the first air core outer terminal 302D, a second end portion 242D electrically connected to the second air core outer terminal 312D, and a wire body 252D connecting the first end portion 232D and the second end portion 242D. The wire body 252D extends parallel to the magnetic core plane Z2. The wire body 252D includes a first body portion 25a connected to the first end portion 232D, a second body portion 25b connected to the first body portion 25a, and a third body portion 25c connected to the second body portion 25b and the second end portion 242D. The first body portion 25a approaches from a connection portion with the first end portion 232D to the air core inductor wire 221D in the up-and-down direction in the drawing, leaves away from the inductor wire 221D, and connects with the second body portion 25b. The second body portion 25b extends in a direction away from the air core inductor wire 221D (downward in the drawing) in the up-and-down direction in the drawing from a connection portion with the first body portion 25a, approaches to the air core inductor wire 221D, and connects with the third body portion 25c. The third body portion 25c approaches from a connection portion with the second body portion 25b to the air core inductor wire 221D in the up-and-down direction in the drawing, leaves away from the air core inductor wire 221D, and connects with the second end portion 242D. For this reason, the number of turns of the inductor wire 222D is less than the number of turns of the magnetic core inductor wire 43D of the magnetic core coil 40D. More specifically, the number of turns of the inductor wire 222D is less than about 1.0.

In the present embodiment, as shown in FIG. 29 and FIG. 30, the magnetic core inductor wire 43D of the magnetic core coil 40D is disposed in the magnetic portion 61D. As shown in FIG. 29, the air core inductor wires 221D, 222D of the air core coils 201D, 202D are disposed in the electrically insulating portion 62D. The magnetic portion 61D and the electrically insulating portion 62D are configured such that the magnetic material content Ra is lower than about 50% in the peripheral region F around the air core inductor wire 221D, the magnetic material content Ra is lower than about 50% in the peripheral region F around the air core inductor wire 222D, and the magnetic material content Ra is higher than or equal to about 50% in the peripheral region F around the magnetic core inductor wire 43D. Thus, the inductor component 10D includes the magnetic core coil 40D and the air core coils 201D, 202D.

The line LN5 shown in FIG. 28 is an imaginary straight line set so as to pass through an intermediate position between the first air core outer terminal 301D and the second air core outer terminal 311D electrically connected to the air core inductor wire 221D, an intermediate position between the first air core outer terminal 302D and the second air core outer terminal 312D electrically connected to the air core inductor wire 222D, and an intermediate position between the first magnetic core outer terminal 51D and the second magnetic core outer terminal 52D electrically connected to the magnetic core inductor wire 43D. The line LN6 is an imaginary straight line set at a position where the first magnetic core outer terminal 51D and the second magnetic core outer terminal 52D can be cut.

Figure 31:
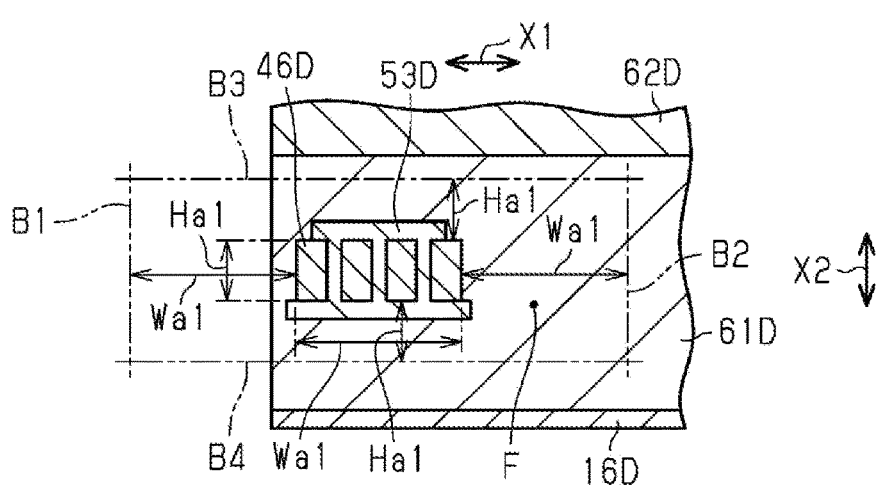
FIG. 31 is an enlarged cross-sectional view of part of FIG. 29.

The definition of the peripheral region F associated with an inductor wire of which the number of turns is greater than or equal to about 1.0 will be described with reference to FIG. 29 and FIG. 31. The cross section shown in FIG. 29 is a cross section when the inductor component 10D is cut in a direction perpendicular to the magnetic core inductor wire 43D at an intermediate position between the two magnetic core outer terminals 51D, 52D electrically connected to the magnetic core inductor wire 43D. When the magnetic core inductor wire 43D is turned as in the case of this example, it is preferable that the magnetic material content Ra be checked at a portion closer to the middle of the line length of the magnetic core inductor wire 43D. In other words, in the cross section shown in FIG. 31, a distance from the inner-side end of a portion located on the innermost side to the outer-side end of a portion located on the outermost side in the magnetic core inductor wire 43D is defined as a wire width Wa1 of the magnetic core inductor wire 43D. In the cross section, a dimension in the thickness direction X2 of the magnetic core inductor wire 43D is defined as a wire thickness Ha1 of the magnetic core inductor wire 43D. In this case, the first straight line B1, the second straight line B2, the third straight line B3, and the fourth straight line B4 that define the peripheral region F are set as follows.

The first straight line B1 is a straight line that passes through a portion spaced the wire width Wa1 apart from the magnetic core inductor wire 43D in the width direction X1 from the outer-side end of a portion located on the outermost side in the magnetic core inductor wire 43D.

The second straight line B2 is a straight line that passes through a portion spaced the wire width Wa1 apart from the magnetic core inductor wire 43D in the width direction X1 from the inner-side end of a portion located on the innermost side in the magnetic core inductor wire 43D.

The third straight line B3 is a line that passes through a portion spaced the wire thickness Ha1 apart in the thickness direction X2 from a first end (upper end in the drawing) in the thickness direction X2 of the magnetic core inductor wire 43D.

The fourth straight line B4 is a line that passes through a portion spaced the wire thickness Ha1 apart in the thickness direction X2 from a second end (lower end in the drawing) in the thickness direction X2 of the magnetic core inductor wire 43D.

As shown in FIG. 29, the area of the cross section of the wire body 251D of the air core inductor wire 221D of the air core coil 201D is greater than the area of the cross section of the wire body 252D of the air core inductor wire 222D of the air core coil 202D. The line length of the air core inductor wire 221D is less than the line length of the air core inductor wire 222D. The area of the cross section of the wire body 46D of the magnetic core inductor wire 43D of the magnetic core coil 40D is equal to the area of the cross section of the wire body 252D of the air core inductor wire 222D and is less than the area of the cross section of the wire body 251D of the air core inductor wire 221D. The line length of the magnetic core inductor wire 43D is greater than any of the line length of the air core inductor wire 221D and the line length of the air core inductor wire 222D. For this reason, the direct current electric resistance of the magnetic core coil 40D is made higher than the direct current electric resistance of each of the air core coils 201D, 202D. The direct current electric resistance of the air core coil 202D is made higher than the direct current electric resistance of the air core coil 201D.

FIG. 30 shows a connection structure between the magnetic core inductor wire 43D and each of the magnetic core outer terminals 51D, 52D in the magnetic core coil 40D. The magnetic core coil 40D includes the vertical wire 50 connected to the first end portion 44D of the magnetic core inductor wire 43D, and the vertical wire 50 connected to the second end portion 45D of the magnetic core inductor wire 43D. Each vertical wire 50 is located in the magnetic portion 61D and extends to the boundary between the magnetic portion 61D and the electrically insulating portion 62D. A first lead wire 54D connected to the first magnetic core outer terminal 51D and a second lead wire 55D connected to the second magnetic core outer terminal 52D are provided in the electrically insulating portion 62D. As shown in FIG. 30, the second end portion 45D of the magnetic core inductor wire 43D is located on the inner side of the second magnetic core outer terminal 52D in the right-and-left direction in the drawing. For this reason, the second lead wire 55D has an extended portion 551 extending in the right-and-left direction in the drawing. In other words, the extended portion 551 extends parallel to the magnetic core plane Z2.

According to the present embodiment, in addition to the advantageous effects of (1-1) to (1-5), (1-7), and (1-12), the following advantageous effects are further obtained.

(5-1) The inductance of the magnetic core coil 40D can be increased by setting the number of turns of the magnetic core inductor wire 43D of the magnetic core coil 40D to greater than or equal to about 1.0. Therefore, when the inductor component 10D is used in the DC-DC converter 80, the efficiency of the DC-DC converter 80 at the time when a current flows through the magnetic core coil 40D is enhanced.

(5-2) When the lead wire 54D is provided in the line electrically connecting the magnetic core inductor wire 43D and the magnetic core outer terminal 51D and the lead wire 55D is provided in the line electrically connecting the magnetic core inductor wire 43D and the magnetic core outer terminal 52D, the flexibility of design of the shape of the magnetic core inductor wire 43D is increased. In other words, irrespective of the installation positions of the magnetic core outer terminals 51D, 52D, the position and shape of the magnetic core inductor wire 43D can be determined.

Next, an example of a manufacturing method for the above-described inductor component 10D will be described with reference to FIG. 32 to FIG. 45. The manufacturing method described here is a method using a semiadditive process to form the inductor wires 221D, 222D, 43D.

Figure 32:
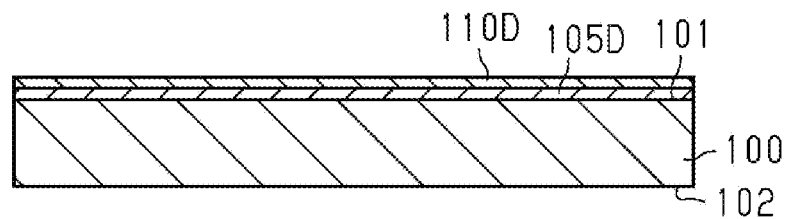
FIG. 32 is a diagram illustrating a manufacturing method for the inductor component.

As shown in FIG. 32, in the first step, a first manufacturing electrically insulating layer 105D is formed on the substrate 100. In other words, the first manufacturing electrically insulating layer 105D is formed on the substrate 100 to cover the whole front surface 101 of the substrate 100. The first manufacturing electrically insulating layer 105D may be formed by, for example, applying polyimide varnish containing trifluoromethyl group and silsesquioxane onto the substrate 100 by spin coating.

When formation of the first manufacturing electrically insulating layer 105D completes, the next step starts. In this step, a second manufacturing electrically insulating layer 110D is formed on the first manufacturing electrically insulating layer 105D. As will be described in detail later, part of the second manufacturing electrically insulating layer 110D becomes part of the electrically insulating film 53D that contacts with the magnetic core inductor wire 43D in the magnetic core coil 40D. The second manufacturing electrically insulating layer 110D may be formed by, for example, applying polyimide varnish containing trifluoromethyl group and silsesquioxane onto the first manufacturing electrically insulating layer 105D by spin coating.

Figure 33:
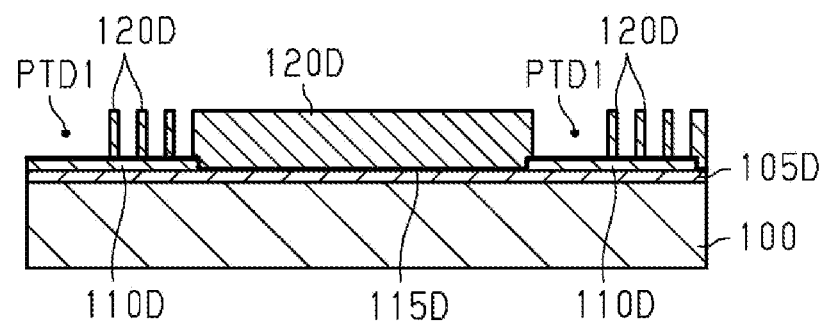
FIG. 33 is a diagram illustrating the manufacturing method.

When formation of the second manufacturing electrically insulating layer 110D completes, the next step starts. In this step, the second manufacturing electrically insulating layer 110D is subjected to working as shown in FIG. 33. Part of the second manufacturing electrically insulating layer 110D is removed by, for example, photolithography. In the example shown in FIG. 33, in the second manufacturing electrically insulating layer 110D, a portion that makes up the electrically insulating film 53D is left, and the other portion is removed.

When working of the second manufacturing electrically insulating layer 110D completes, the next step starts. In this step, a seed layer 115D is formed. In other words, as shown in FIG. 33, the seed layer 115D is formed so as to cover the exposed portion of the first manufacturing electrically insulating layer 105D and the whole top surface of the second manufacturing electrically insulating layer 110D in the drawing. The seed layer 115D containing copper is formed by, for example, sputtering. As will be described in detail later, part of the seed layer 115D makes up the magnetic core inductor wire 43D.

When formation of the seed layer 115D completes, the next step starts. In this step, a first protective film 120D is formed as shown in FIG. 33. A photoresist is applied onto the seed layer 115D by, for example, spin coating. Subsequently, exposure is performed by using an exposure apparatus. Thus, in the photoresist, a portion corresponding to a position where the magnetic core inductor wire 43D is formed can be removed through a development process (described later), and the other portion is cured. Subsequently, as shown in FIG. 33, a portion corresponding to a position where the magnetic core inductor wire 43D is formed in the photoresist is removed through a development process using a developer. The cured portion of the photoresist is left as the first protective film 120D. A wiring pattern PTD1 is formed by patterning the first protective film 120D in this way. The wiring pattern PTD1 has an opening shape corresponding to the shape of the magnetic core inductor wire 43D.

Figure 34:
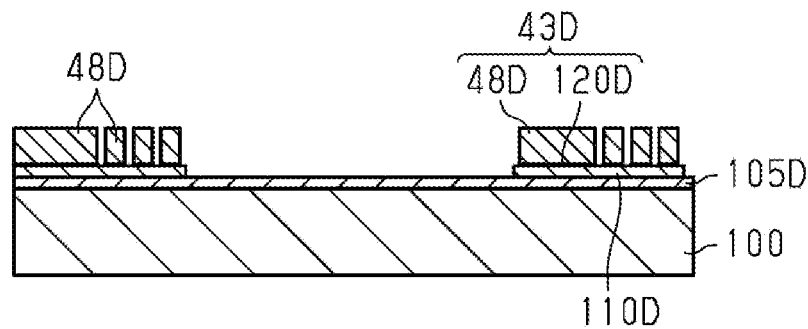
FIG. 34 is a diagram illustrating the manufacturing method.

When formation of the wiring pattern PTD1 completes, the next step starts. In this step, the electrically conductive layer 48D as shown in FIG. 34 is formed by supplying an electrically conductive material into the wiring pattern PTD1. Copper and a small amount of sulfur mainly precipitate on the exposed portion of the seed layer 115D by, for example, performing electrolytic copper plating using a copper sulfate solution. Thus, the electrically conductive layer 48D is formed. The magnetic core inductor wire 43D is made up of the electrically conductive layer 48D and a portion with which the electrically conductive layer 48D contacts in the seed layer 115D.

When formation of the electrically conductive layer 48D completes, the first protective film 120D is removed as shown in FIG. 34 through a process using a stripper solution. When removal of the first protective film 120D completes, a portion that has been in contact with the first protective film 120D in the seed layer 115D is removed. The portion that has been in contact with the first protective film 120D in the seed layer 115D is removed by, for example, wet etching. In other words, a portion other than the portion that makes up the magnetic core inductor wire 43D in the seed layer 115D is removed.

Figure 35:
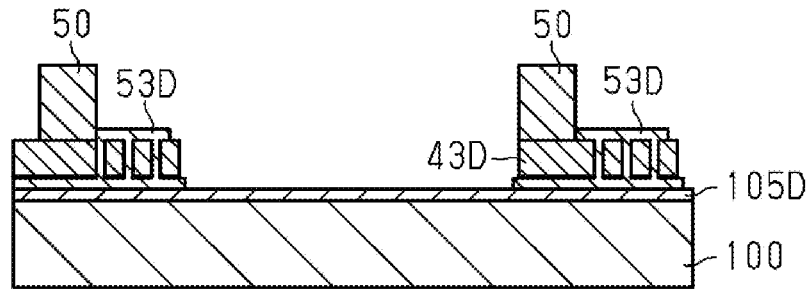
FIG. 35 is a diagram illustrating the manufacturing method.
Figure 36:
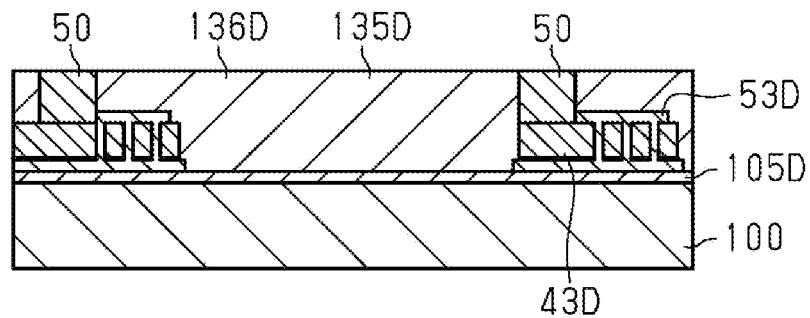
FIG. 36 is a diagram illustrating the manufacturing method.

In this step, the electrically insulating film 53D is formed as shown in FIG. 35. The electrically insulating film 53D is removed by, for example, photolithography. In other words, a protective film for forming the electrically insulating film 53D is formed by applying a photoresist and then performing exposure with an exposure apparatus. Subsequently, an electrically insulating material is supplied into a pattern formed in the protective film. Then, the electrically insulating film 53D is formed by curing the electrically insulating material in the pattern. After that, the protective film is removed through a process using a stripper solution.

When formation of the electrically insulating film 53D completes, the next step starts. In this step, as shown in FIG. 35, the vertical wires 50 connected to the magnetic core inductor wire 43D are formed. The vertical wires 50 are formed by, for example, photolithography. In other words, a protective film for forming the vertical wires 50 is formed by applying a photoresist and then performing exposure with an exposure apparatus. Subsequently, an electrically conductive material is supplied into a pattern formed in the protective film. The vertical wires 50 can be formed in the pattern by, for example, performing electrolytic copper plating using a copper sulfate solution. In this case, when electric power is supplied to the magnetic core inductor wire 43D, copper is supplied as an electrically conductive material into the pattern. When a copper sulfate solution is used in this way, a small amount of sulfur is contained in the vertical wires 50. When formation of the vertical wires 50 completes, the protective film is removed through a process using a stripper solution.

When formation of the vertical wires 50 completes, the next step starts. In this step, a first manufacturing magnetic layer 136D is formed by pressing a magnetic sheet 135D from the upper side in FIG. 36. At this time, the first manufacturing magnetic layer 136D may be formed by laminating a plurality of magnetic sheets 135D in the up-and-down direction in the drawing. In this case, when the magnetic sheet 135D is pressed, the vertical wires 50 can be covered with the magnetic sheet 135D. For this reason, after the magnetic sheet 135D is pressed, the magnetic sheet 135D may be ground until the end surfaces of the vertical wires 50 are exposed.

Figure 37:
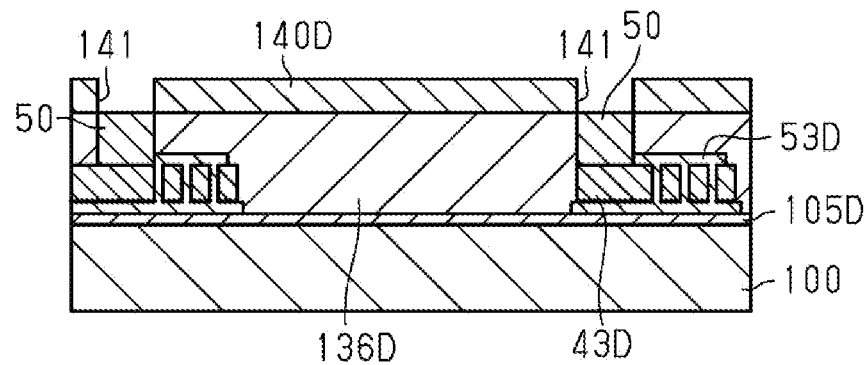
FIG. 37 is a diagram illustrating the manufacturing method.

When formation of the first manufacturing magnetic layer 136D completes, the next step starts. In this step, a fourth manufacturing electrically insulating layer 140D is formed on the first manufacturing magnetic layer 136D as shown in FIG. 37. The fourth manufacturing electrically insulating layer 140D makes up the electrically insulating portion 62D. In this example, through-holes 141 for exposing the end surfaces of the vertical wires 50 are formed in the fourth manufacturing electrically insulating layer 140D. The fourth manufacturing electrically insulating layer 140D is formed by, for example, photolithography.

Figure 38:
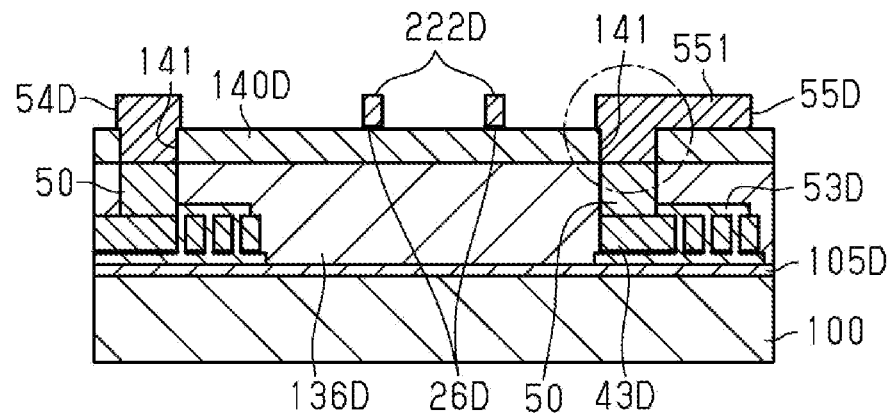
FIG. 38 is a diagram illustrating the manufacturing method.
Figure 39:
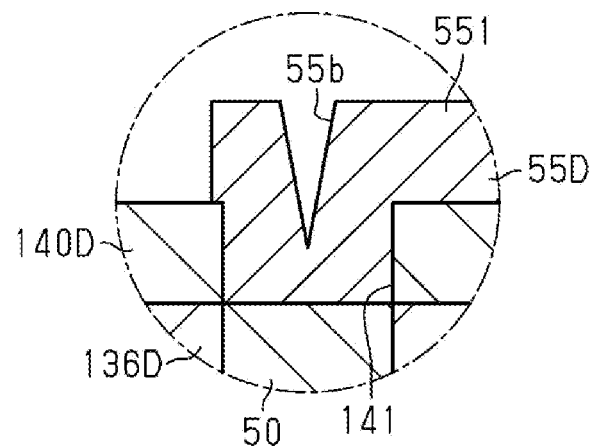
FIG. 39 is a diagram illustrating the manufacturing method.

When formation of the fourth manufacturing electrically insulating layer 140D completes, the next step starts. In this process, as shown in FIG. 38, the lead wires 54D, 55D of the magnetic core coil 40D and the air core inductor wires 221D, 222D of the air core coils 201D, 202D are formed. For example, seed layers 26D are formed at positions where the air core inductor wires 221D, 222D are formed. When the seed layers 26D are formed, a protective film is formed by photolithography. The protective film has a wiring pattern that opens at the positions where the air core inductor wires 221D, 222D are formed and the positions where the lead wires 54D, 55D are formed. Then, an electrically conductive material is supplied into the wiring pattern by, for example, electrolytic plating. At this time, via filling plating may also be performed to supply an electrically conductive material into the through-holes 141 of the fourth manufacturing electrically insulating layer 140D. Thus, the lead wires MD, 55D and the air core inductor wires 221D, 222D are formed. When a copper sulfate solution is used in electrolytic plating, a small amount of sulfur is contained in the lead wires MD, 55D and the air core inductor wires 221D, 222D. When via filling plating is performed, a recess 55b may be formed in the lead wire 55D as shown in FIG. 39.

Figure 40:
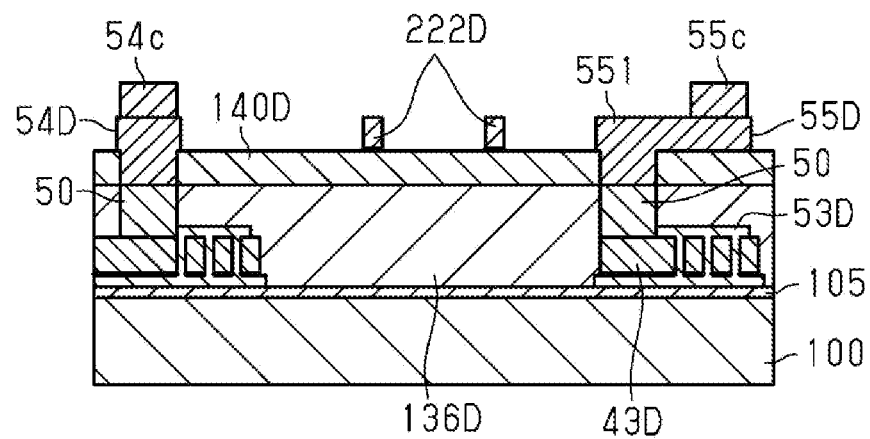
FIG. 40 is a diagram illustrating the manufacturing method.

Subsequently, as shown in FIG. 40, a connection portion Mc of the lead wire MD and a connection portion 55c of the lead wire 55D are formed. The connection portion Mc is a portion connected to the magnetic core outer terminal 51D, and the connection portion 55c is a portion connected to the magnetic core outer terminal 52D. The connection portions 54c, 55c are formed by, for example, photolithography. In other words, a wiring pattern for forming the connection portions 54c, 55c are formed in a protective film to be formed by photolithography. The connection portions 54c, 55c are formed by supplying an electrically conductive material into the wiring pattern. At this time, when electrolytic plating is performed by using a copper sulfate solution, a small amount of sulfur is contained in the connection portions 54c, 55c.

Figure 41:
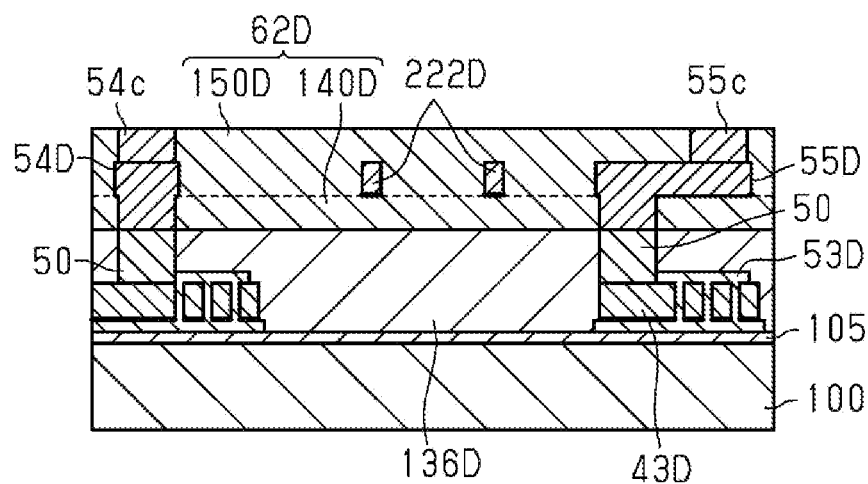
FIG. 41 is a diagram illustrating the manufacturing method.

At the time of forming the connection portions 54c, 55c, the vertical wires 29 of the air core coils 201D, 202D are also formed. When formation of the lead wires 54D, 55D completes, the next step starts. In this step, a fifth manufacturing electrically insulating layer 150D is formed on the fourth manufacturing electrically insulating layer 140D as shown in FIG. 41. The fifth manufacturing electrically insulating layer 150D makes up the electrically insulating portion 62D. The fifth manufacturing electrically insulating layer 150D may be formed by, for example, applying an electrically insulating material onto the fourth manufacturing electrically insulating layer 140D. At this time, when the lead wires 54D, 55D are covered with the fifth manufacturing electrically insulating layer 150D, the end surfaces of the lead wires 54D, 55D are exposed by grinding the surface of the fifth manufacturing electrically insulating layer 150D.

Figure 42:
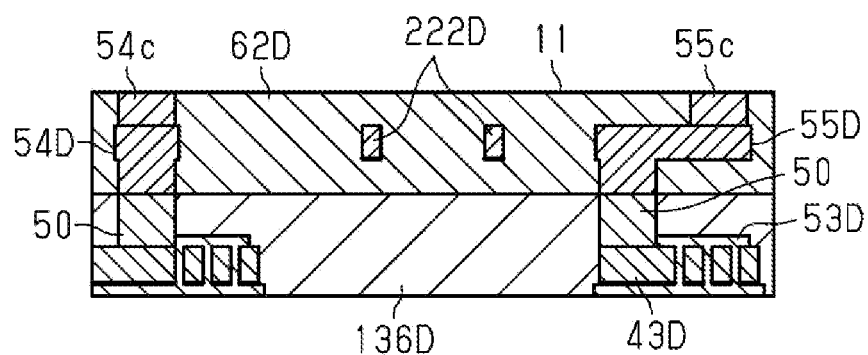
FIG. 42 is a diagram illustrating the manufacturing method.
Figure 43:
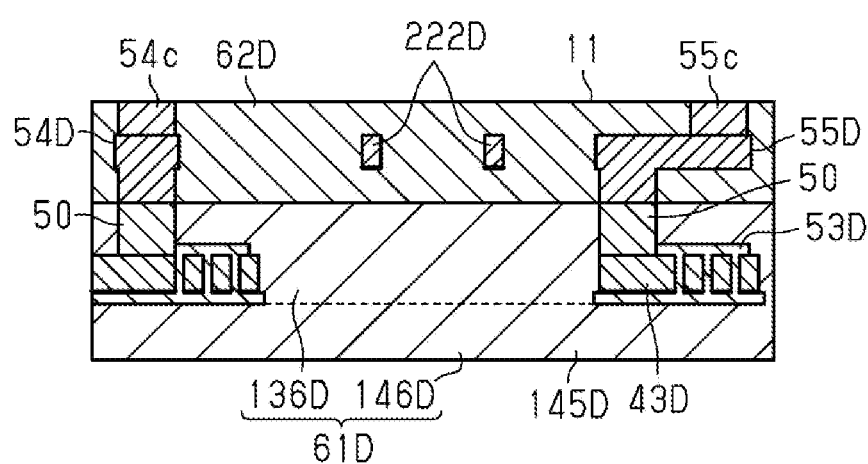
FIG. 43 is a diagram illustrating the manufacturing method.

When formation of the second manufacturing electrically insulating layer 110D, that is, the electrically insulating portion 62D, completes, the next step starts. In this step, as shown in FIG. 42, the substrate 100 and the first manufacturing electrically insulating layer 105D are removed by grinding.

When grinding completes, the next step starts. In this step, a second manufacturing magnetic layer 146D is formed by pressing a magnetic sheet 145D from the lower side in FIG. 43. At this time, the second manufacturing magnetic layer 146D may be formed by laminating a plurality of magnetic sheets 145D in the up-and-down direction in the drawing. In other words, in this step, the magnetic portion 61D is made up of the first manufacturing magnetic layer 136D and the second manufacturing magnetic layer 146D.

Figure 44:
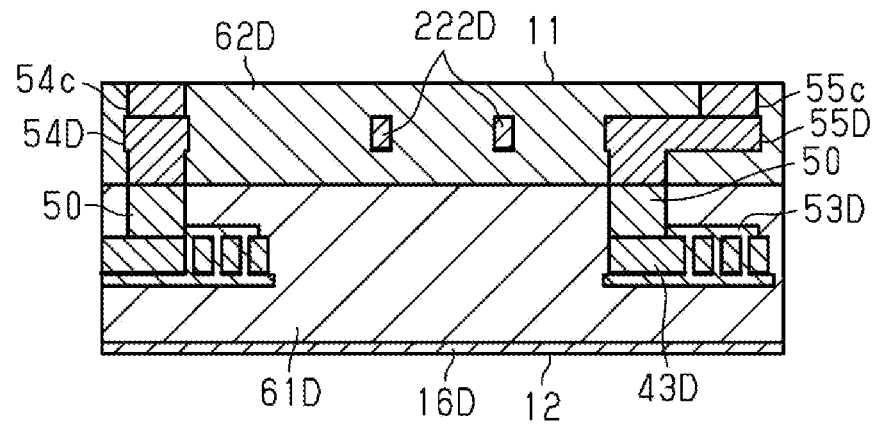
FIG. 44 is a diagram illustrating the manufacturing method.

When formation of the magnetic portion 61D completes, the next step starts. In this step, the magnetic portion 61D and the electrically insulating portion 62D are combined or integrated by thermal curing. When the bodies 21, 411, 412 are combined or integrated, the next step starts. In this step, the surface layer 16D is formed as shown in FIG. 44. In this step, the surface layer 16D is formed by applying an electrically insulating material onto the undersurface of the magnetic portion 61D in FIG. 44.

Figure 45:
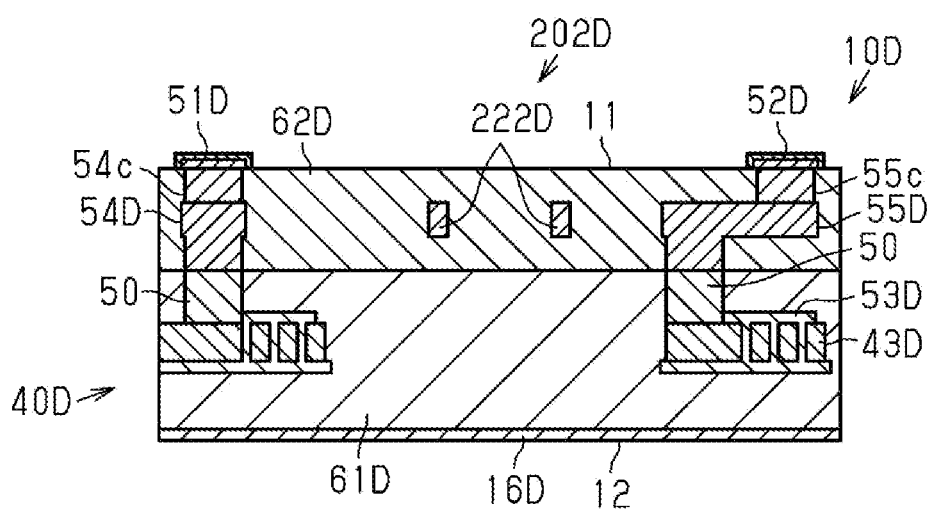
FIG. 45 is a diagram illustrating the manufacturing method.

When formation of the surface layer 16D completes, the next step starts. In this step, as shown in FIG. 45, the outer terminals 301D, 311D, 302D, 312D, 51D, 52D are formed. Thus, a series of steps that compose the manufacturing method for the inductor component 10D ends.

The above-described manufacturing method is an example of the case where the inductor component 10D is manufactured one by one. However, the manufacturing method for the inductor component 10D is not limited thereto. For example, portions to be a plurality of inductor components 10D may be disposed in a matrix on the substrate 100, and diced by a dicer after the end of a step of forming the outer terminals 301D, 311D, 302D, 312D, 51D, 52D. A curing step, such as heating, may be performed as needed after applying a non-magnetic electrically insulating resin or after pressing a magnetic sheet.

Sixth Embodiment

Next, a sixth embodiment of an inductor component will be described with reference to FIG. 46 to FIG. 48. In the following description, portions different from the fifth embodiment will be mainly described, like reference signs denote the same or corresponding components to those of the fifth embodiment, and the description will not be repeated.

Figure 46:
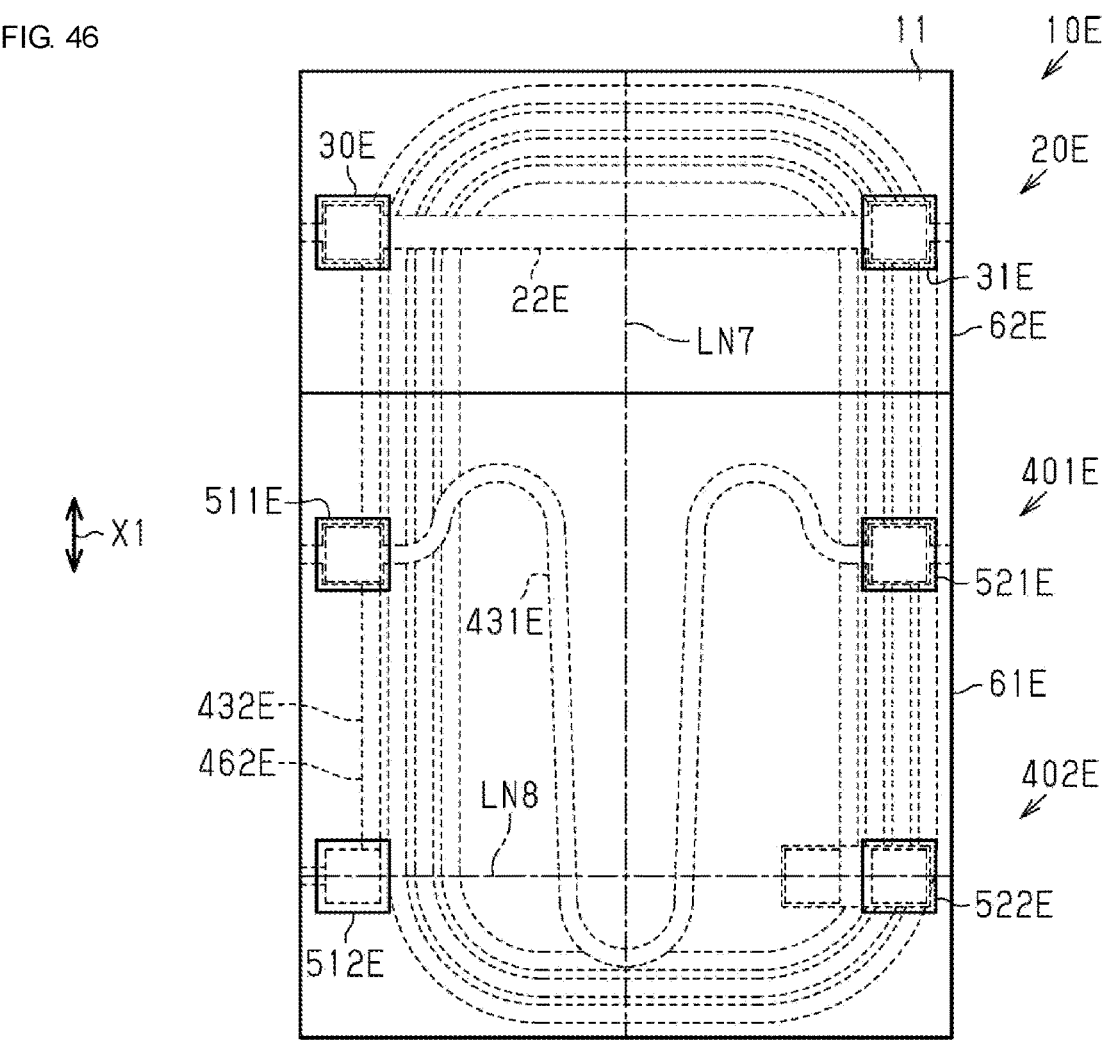
FIG. 46 is a plan view schematically showing an inductor component.

FIG. 46 is a plan view showing an inductor component 10E of the present embodiment. FIG. 47 is a view showing a cross section when the inductor component 10E is cut along the line LN7 indicated by the alternate long and short dashed line in FIG. 46. FIG. 48 is a view showing a cross section when the inductor component 10E is cut along the line LN8 indicated by the alternate long and short dashed line in FIG. 46. In FIG. 47 and FIG. 48, the up-and-down direction in the drawing is the thickness direction X2. A direction in which the line LN7 extends and that is the right-and-left direction in FIG. 47 is defined as the width direction X1.

The inductor component 10E is an array inductor component in which one air core coil 20E and two magnetic core coils 401E, 402E are combined or integrated. As shown in FIG. 46 and FIG. 47, the air core coil 20E and the magnetic core coil 401E are disposed at the same position in the thickness direction X2. The magnetic core coil 402E is disposed at a different position in the thickness direction X2 from the air core coil 20E or the magnetic core coil 401E.

A direct distance from the first air core outer terminal 30E to the second air core outer terminal 31E in the air core coil 20E is defined as an air core direct distance. A direct distance from the first magnetic core outer terminal 511E to the second magnetic core outer terminal 521E in the magnetic core coil 401E is defined as a first magnetic core direct distance, and a direct distance from the first magnetic core outer terminal 512E to the second magnetic core outer terminal 522E in the magnetic core coil 402E is defined as a second magnetic core direct distance. In this case, the air core direct distance, the first magnetic core direct distance, and the second magnetic core direct distance are equal to one another.

Figure 47:
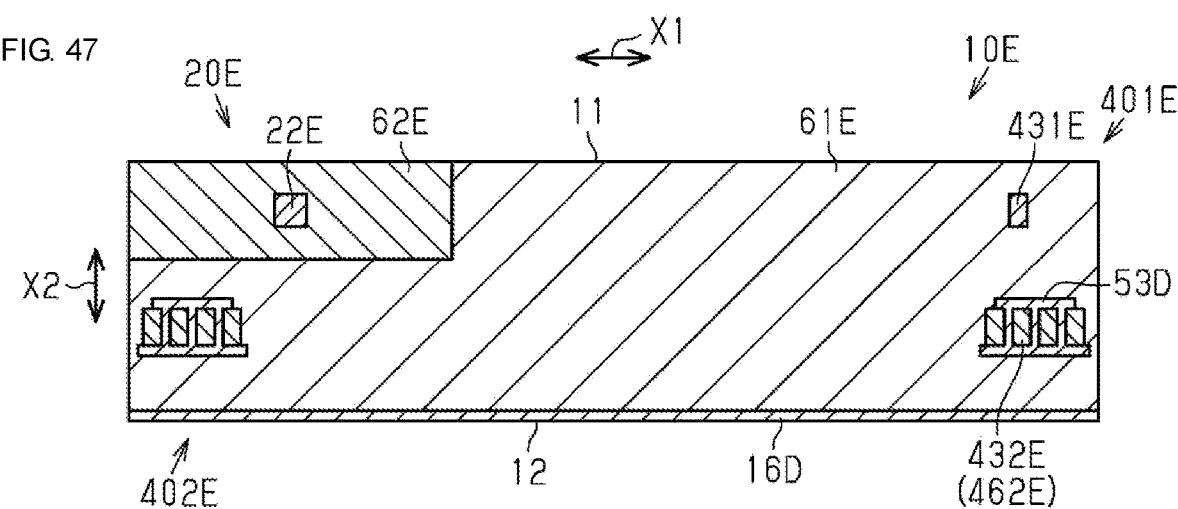
FIG. 47 is a cross-sectional view of the inductor component.
Figure 48:
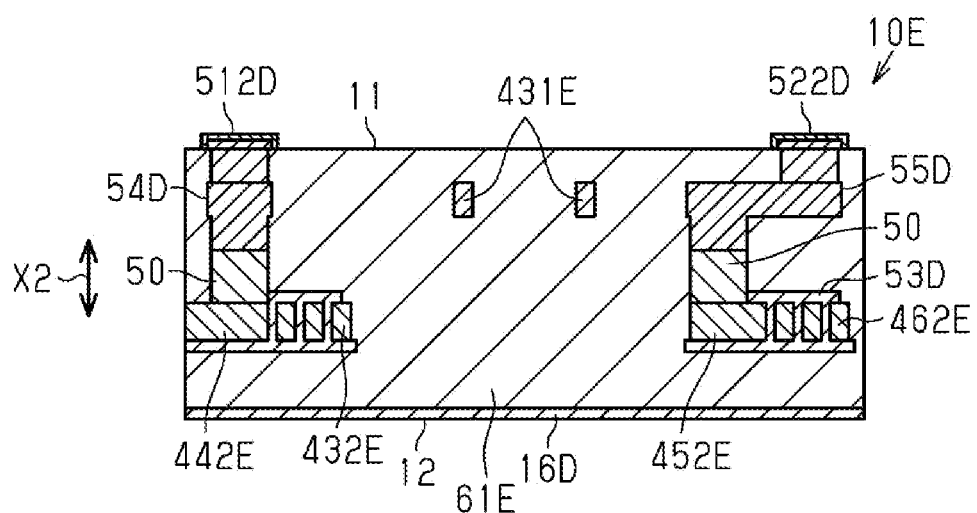
FIG. 48 is a cross-sectional view of the inductor component.

As shown in FIG. 47 and FIG. 48, magnetic core inductor wires 431E, 432E of the magnetic core coils 401E, 402E are disposed in a magnetic portion 61E. An air core inductor wire 22E of the air core coil 20E is disposed in an electrically insulating portion 62E. The magnetic portion 61E contains a magnetic material. The electrically insulating portion 62E contains a non-magnetic electrically insulating material. For example, the magnetic portion 61E is a laminated body made up of laminated magnetic layers, and the electrically insulating portion 62E is a laminated body made up of laminated electrically insulating layers. The magnetic portion 61E and the electrically insulating portion 62E are configured such that the magnetic material content Ra is lower than about 50% in the peripheral region F around the air core inductor wire 22E, the magnetic material content Ra is higher than or equal to about 50% in the peripheral region F around the magnetic core inductor wire 431E, and the magnetic material content Ra is higher than or equal to about 50% in the peripheral region F around the magnetic core inductor wire 432E. Thus, the inductor component 10E includes the magnetic core coils 401E, 402E and the air core coil 20E.

The line LN7 shown in FIG. 46 is an imaginary straight line set so as to pass through an intermediate position between the first air core outer terminal 30E and the second air core outer terminal 31E electrically connected to the air core inductor wire 22E, an intermediate position between the first magnetic core outer terminal 511E and the second magnetic core outer terminal 521E electrically connected to the magnetic core inductor wire 431E, and an intermediate position between the first magnetic core outer terminal 512E and the second magnetic core outer terminal 522E electrically connected to the magnetic core inductor wire 432E. The line LN8 is an imaginary straight line set at a position where the first magnetic core outer terminal 512E and the second magnetic core outer terminal 522E can be cut.

When viewed from above, the wire body 462E of the magnetic core inductor wire 432E is wound in a substantially spiral shape in the counterclockwise direction in the drawing from the radially outer first end portion 442E toward the radially inner second end portion 452E. In other words, the number of turns of the magnetic core inductor wire 432E is greater than or equal to about 1.0. On the other hand, the number of turns of the magnetic core inductor wire 431E and the number of turns of the air core inductor wire 22E are less than about 1.0. In other words, the number of turns of the air core inductor wire 22E is less than the number of turns of the magnetic core inductor wire 432E.

According to the present embodiment, advantageous effects similar to those of the fifth embodiment are obtained.

Seventh Embodiment

Next, a seventh embodiment of an inductor component will be described with reference to FIG. 49 to FIG. 51. In the following description, portions different from the fifth embodiment will be mainly described, like reference signs denote the same or corresponding components to those of the fifth embodiment, and the description will not be repeated.

Figure 49:
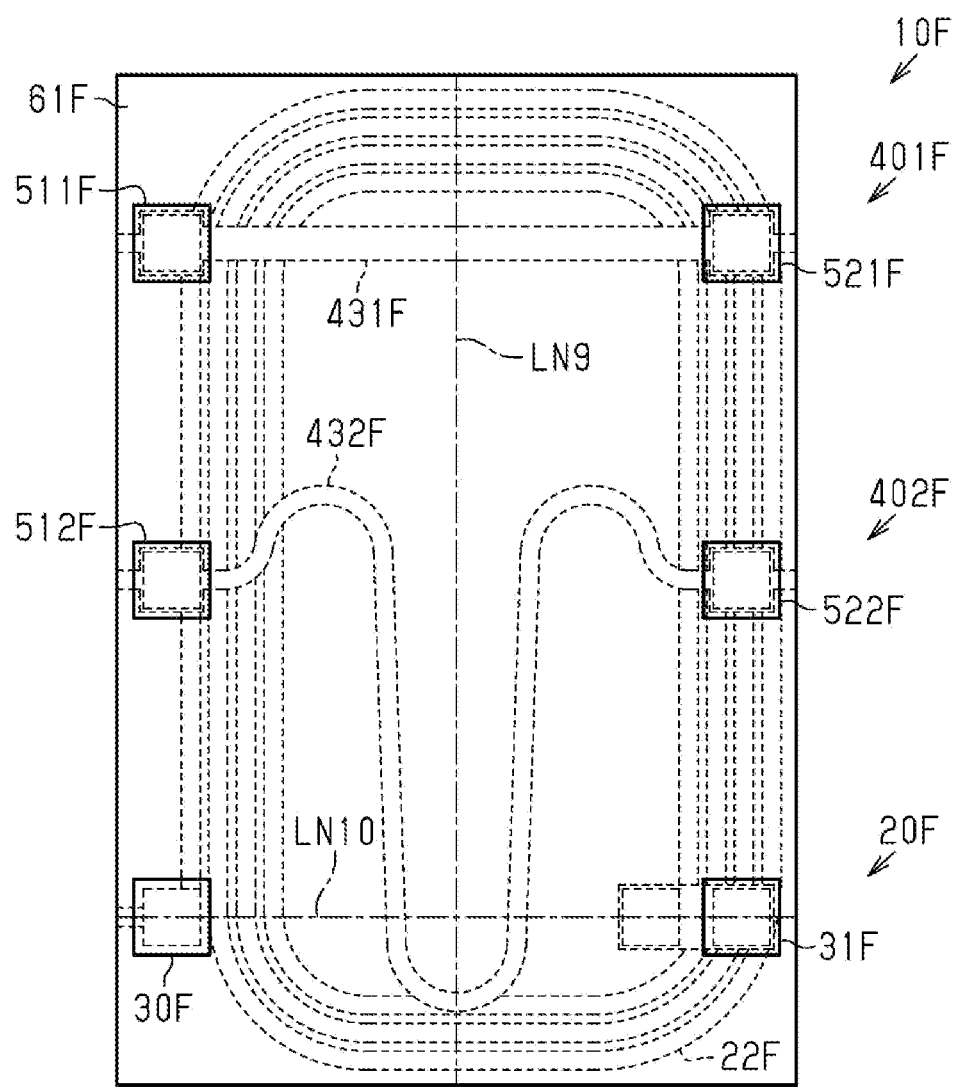
FIG. 49 is a plan view schematically showing an inductor component.

FIG. 49 is a plan view showing an inductor component 10F of the present embodiment. FIG. 50 is a view showing a cross section when the inductor component 10F is cut along the line LN9 indicated by the alternate long and short dashed line in FIG. 49. FIG. 51 is a view showing a cross section when the inductor component 10F is cut along the line LN10 indicated by the alternate long and short dashed line in FIG. 49.

The inductor component 10F is an array inductor component in which a plurality of magnetic core coils 401F, 402F and one air core coil 20F are combined or integrated. As shown in FIG. 50 and FIG. 51, the magnetic core coils 401F, 402F and the air core coil 20F are disposed at different positions in the thickness direction X2. In this example, the magnetic core coils 401F, 402F are located on a first side in the thickness direction X2, which is the upper side in the drawing, and the air core coil 20F is located on a second side in the thickness direction X2, which is the lower side in the drawing.

In this example, of a magnetic portion 61F and an electrically insulating portion 62F, the electrically insulating portion 62F is located on the second side (lower side in FIG. 50 and FIG. 51) in the thickness direction X2. The magnetic portion 61F is located on the first side (upper side in FIG. 50 and FIG. 51) in the thickness direction X2. For this reason, an air core inductor wire 22F of the air core coil 20F is electrically connected to an air core outer terminal 30F via a lead wire 32F and is electrically connected to an air core outer terminal 31F via a lead wire 32F.

The magnetic portion 61F has a plurality of magnetic layers laminated in the thickness direction X2. Of the magnetic layers, the layer represented by the dashed line in FIG. 50 and FIG. 51 is a low-content magnetic layer 61A having a less content of magnetic particles (magnetic material) than the other magnetic layer. A dimension in the thickness direction X2 of the low-content magnetic layer 61A is exceedingly small, so the low-content magnetic layer 61A is represented by the dashed line in FIG. 50 and FIG. 51. In this example, the bottom surface (undersurface in the drawing) of the low-content magnetic layer 61A is located in the same plane as the bottom surfaces (undersurfaces in the drawing) of the magnetic core inductor wires 431F, 432F. For this reason, the low-content magnetic layer 61A is in contact with the magnetic core inductor wires 431F, 432F. The bottom surface of the low-content magnetic layer 61A is, of both main surfaces of the low-content magnetic layer 61A, the main surface located closer to the second main surface 12. The bottom surfaces of the magnetic core inductor wires 431F, 432F are main surfaces located closer to the second main surface 12.

The phrase "having a less content of magnetic particles than the other magnetic layer" means that the content of magnetic particles is less than or equal to half of the content of magnetic particles in the other magnetic layer. The content of magnetic particles is the ratio of a portion occupied by magnetic particles to the volume of a magnetic layer.

The line LN9 shown in FIG. 49 is an imaginary straight line set so as to pass through an intermediate position between a first magnetic core outer terminal 511F and a second magnetic core outer terminal 521F electrically connected to the magnetic core inductor wire 431F, an intermediate position between a first magnetic core outer terminal 512F and a second magnetic core outer terminal 522F electrically connected to the magnetic core inductor wire 432F, and an intermediate position between a first air core outer terminal 30F and a second air core outer terminal 31F electrically connected to the air core inductor wire 22F. The line LN10 is an imaginary straight line set at a position where the first air core outer terminal 30F and the second air core outer terminal 31F can be cut.

According to the present embodiment, in addition to advantageous effects equivalent to those of the fifth embodiment, the following advantageous effect is further obtained.

(7-1) The magnetic portion 61F is a laminated body made up of a plurality of laminated magnetic layers. Of the magnetic layers, one magnetic layer is the low-content magnetic layer 61A having a lower content of magnetic particles than the other magnetic layer. By providing the low-content magnetic layer 61A in this way, a magnetic saturation characteristic is improved as compared to the case where the magnetic portion 61F has no low-content magnetic layer 61A. In other words, it is possible to make magnetic saturation difficult to occur in the magnetic core coils 401F, 402F.

Modifications

The above-described embodiments may be modified as follows. The above-described embodiments and the following modifications may be implemented in combination without any technical contradiction.

Figure 50:
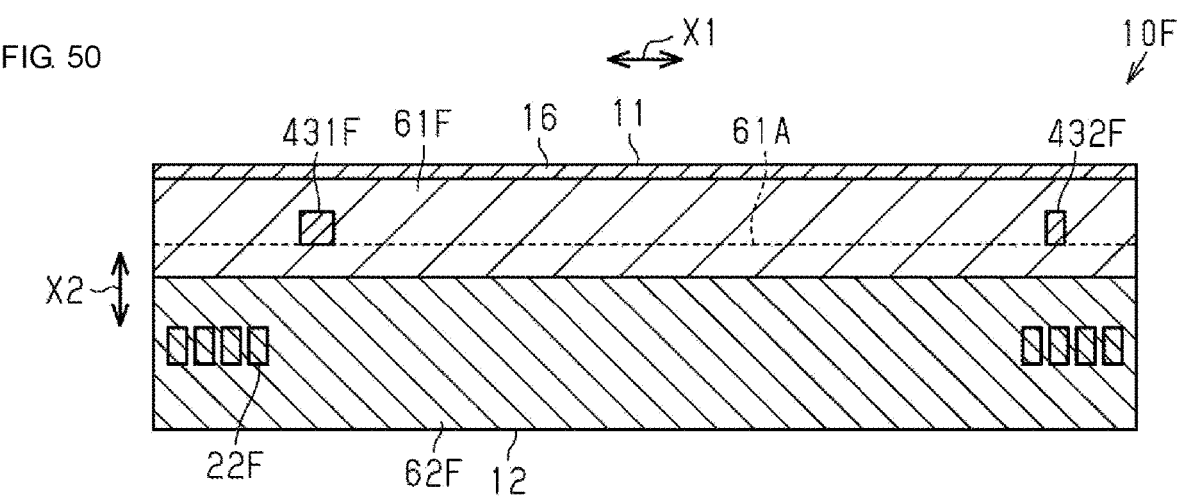
FIG. 50 is a cross-sectional view of the inductor component.
Figure 51:
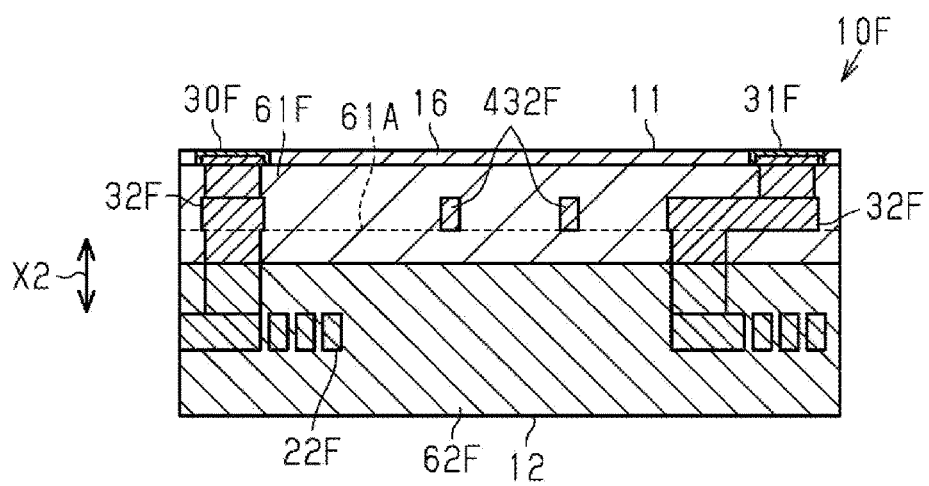
FIG. 51 is a cross-sectional view of the inductor component.

In the seventh embodiment, as long as the low-content magnetic layer 61A is in contact with a magnetic core inductor wire in the magnetic portion 61F, the low-content magnetic layer 61A may be in contact with a portion other than the undersurface of the magnetic core inductor wire in FIG. 50.

In the seventh embodiment, as long as the magnetic portion 61F is made up of a plurality of magnetic layers including the low-content magnetic layer 61A, the low-content magnetic layer 61A does not need to be in contact with a magnetic core inductor wire in the magnetic portion 61F.

In the seventh embodiment, a laminated body that makes up the magnetic portion 61F does not need to include the low-content magnetic layer 61A.

In the fifth embodiment, the sixth embodiment, and the seventh embodiment, the outer terminals electrically connected to the inductor wire located on the second main surface 12 side in the thickness direction X2, of the inductor wires, may be exposed not at the first main surface 11 but at the second main surface 12.

In the above-described embodiments, the electrically insulating layer or electrically insulating film that is in contact with the magnetic core inductor wire does not need to be provided in the magnetic core body of the magnetic core coil.

In the above-described embodiments, the surface layer does not need to be provided.

In the fifth embodiment, of the air core coils 201D, 202D, at least one air core coil may be configured such that the number of turns of the air core inductor wire is greater than or equal to about 1.0. However, it is desirable that the number of turns of the air core inductor wire of the air core coil be less than the number of turns of the magnetic core inductor wire 43D of the magnetic core coil 40D.

In the sixth embodiment, the air core coil 20E may be configured such that the number of turns of the air core inductor wire 22E is greater than or equal to about 1.0. However, it is preferable that the number of turns of the air core inductor wire be less than the number of turns of the magnetic core inductor wire 432E of the magnetic core coil 402E.

Figure 52:
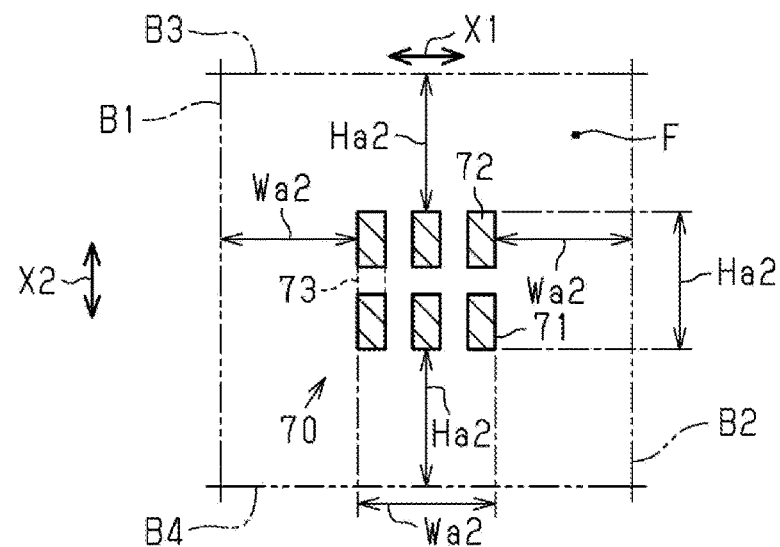
FIG. 52 is a schematic diagram illustrating a peripheral region associated with an inductor wire.

The inductor wire may have a plurality of wiring portions disposed at different positions from each other in the thickness direction X2. FIG. 52 shows an example of an inductor wire 70 having two wiring portions 71, 72 disposed at different positions from each other in the thickness direction X2. The inductor wire 70 includes a first wiring portion 71 having the number of turns greater than or equal to about 1.0, a second wiring portion 72 having the number of turns greater than or equal to about 1.0, and a coupling wiring portion 73 that connects the first wiring portion 71 and the second wiring portion 72. The number of turns of the first wiring portion 71 may be the same as the number of turns of the second wiring portion 72 or may be different from the number of turns of the second wiring portion 72.

In this case, when the magnetic material content Ra that is the percentage of a magnetic material in a portion other than all the inductor wires in the peripheral region F around the inductor wire 70 is higher than or equal to about 50%, the inductor including the inductor wire 70 is a magnetic core coil. On the other hand, when the magnetic material content Ra is lower than about 50%, the inductor including the inductor wire 70 is an air core coil.

The definition of the peripheral region F associated with the inductor wire 70 including the plurality of wiring portions 71, 72 will be described with reference to FIG. 52. In other words, in the cross section shown in FIG. 52, a distance from the inner-side end of a portion located on the innermost side to the outer-side end of a portion located on the outermost side in the inductor wire 70 is defined as a wire width Wa2 of the inductor wire 70. In the cross section, a distance from the upper-side end in the drawing to the lower-side end in the drawing in the inductor wire 70 is defined as a wire thickness Ha2 of the inductor wire 70. In this case, the first straight line B1, the second straight line B2, the third straight line B3, and the fourth straight line B4 that define the peripheral region F are set as follows.

The first straight line B1 is a straight line that passes through a portion spaced the wire width Wa2 apart from the inductor wire 70 in the width direction X1 from the outer-side end of a portion located on the outermost side in the inductor wire 70.

The second straight line B2 is a straight line that passes through a portion spaced the wire width Wa2 apart from the inductor wire 70 in the width direction X1 from the inner-side end of a portion located on the innermost side in the inductor wire 70.

The third straight line B3 is a line that passes through a portion spaced the wire thickness Ha2 apart in the thickness direction X2 from a first end (upper end in the drawing) in the thickness direction X2 of the inductor wire 70.

The fourth straight line B4 is a line that passes through a portion spaced the wire thickness Ha2 apart in the thickness direction X2 from a second end (lower end in the drawing) in the thickness direction X2 of the inductor wire 70.

In the seventh embodiment, of the magnetic core coils 401F, 402F, at least one magnetic core coil may be configured such that the number of turns of the magnetic core inductor wire is greater than or equal to about 1.0. However, it is preferable that the number of turns of the magnetic core inductor wire of the magnetic core coil be less than the number of turns of the air core inductor wire 22F of the air core coil 20F.

In the above-described embodiments, a direct distance from the first magnetic core outer terminal to the second magnetic core outer terminal in the magnetic core coil is the same as a direct distance from the first air core outer terminal to the second air core outer terminal in the air core coil; however, the configuration is not limited thereto. For example, a direct distance from the first magnetic core outer terminal to the second magnetic core outer terminal in the magnetic core coil may be varied from a direct distance from the first air core outer terminal to the second air core outer terminal in the air core coil.

In the above-described embodiments, the line length may be the same in any of the inductor wires.

In the above-described embodiments, the area of the cross section of the wire body may be the same in any of the inductor wires.

In the above-described embodiments, the magnetic core inductor wire may contain an electrically conductive material not contained in the air core inductor wire.

In the above-described embodiments, the direct current electric resistance of the magnetic core coil may be the same as the direct current electric resistance of the air core coil.

In the first embodiment, the second embodiment, the third embodiment, and the fourth embodiment, the inductor component may be configured such that the number of air core coils is greater than the number of magnetic core coils. Alternatively, the inductor component may be configured such that the number of air core coils is the same as the number of magnetic core coils.

In the first embodiment, the second embodiment, the third embodiment, and the fourth embodiment, the inductor component may be configured such that an air core coil is disposed between two magnetic core coils.

In the above-described embodiments, as long as the inductor component includes both a magnetic core coil and an air core coil, the sum of the number of magnetic core coils and the number of air core coils may be two. Alternatively, as long as the inductor component includes both a magnetic core coil and an air core coil, the sum of the number of magnetic core coils and the number of air core coils may be greater than or equal to four.

The magnetic core coil of the inductor component may be configured such that an electrically insulating layer is provided inside a magnetic layer. However, in this case as well, the magnetic material content Ra in the peripheral region around the magnetic core inductor wire is higher than or equal to about 50%.

In the third embodiment, the inductor component may be configured such that the air core coil 20B is disposed directly on the second magnetic layer 42b. However, in the air core coil 20B, the magnetic material content Ra in the peripheral region around the air core inductor wire is lower than about 50%.

A DC-DC converter on which the inductor component is mounted may have a configuration different from that of the DC-DC converter 80 described in the above-described embodiments. The DC-DC converter is not limited to the one that passes a current through the magnetic core coil under low load and passes a current through the air core coil under high load and may be, for example, a DC-DC converter that passes a current through two lines, that is, a load with a small load current and a load with a relatively large maximum load current. Such a DC-DC converter may be configured to pass a current through the magnetic core coil to a load with a small load current and pass a current through the air core coil to a load with a large maximum load current. The DC-DC converter may be a multiphase DC-DC converter.

The inductor component may be mounted on another electronic device other than the DC-DC converter 80.

The inductor component may be manufactured by another manufacturing method that does not use a semiadditive process. The inductor component may be manufactured by using, for example, sheet lamination, printing lamination, or the like. The inductor wire may be formed by a thin-film method, such as sputtering and vapor deposition, a thick-film method, such as printing and application, or a plating method, such as a full-additive process and a subtractive process.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:
an air core coil that includes an air core body containing a non-magnetic material, an air core inductor wire provided in the air core body and extending along a predetermined plane, a first air core outer terminal electrically connected to a first end portion of the air core inductor wire, and a second air core outer terminal electrically connected to a second end portion of the air core inductor wire; and a magnetic core coil that includes a magnetic core body containing a magnetic material, a magnetic core inductor wire provided in the magnetic core body and extending parallel to the predetermined plane, a first magnetic core outer terminal electrically connected to a first end portion of the magnetic core inductor wire, and a second magnetic core outer terminal electrically connected to a second end portion of the magnetic core inductor wire, wherein the first air core outer terminal, the second air core outer terminal, the first magnetic core outer terminal, and the second magnetic core outer terminal are each exposed at a first main surface, in a predetermined cross section taken in a direction perpendicular to a direction in which the air core inductor wire or the magnetic core inductor wire extends, a direction parallel to the predetermined plane is defined as a width direction, a direction perpendicular to the predetermined plane is defined as a thickness direction, a dimension in the width direction of the air core inductor wire or the magnetic core inductor wire in the predetermined cross section is defined as a wire width, and a dimension in the thickness direction of the air core inductor wire or the magnetic core inductor wire in the predetermined cross section is defined as a wire thickness, in the predetermined cross section, a first straight line is defined as an imaginary straight line passing through a portion spaced the wire width apart in the width direction from a first end in the width direction of the air core inductor wire or the magnetic core inductor wire and extending in the thickness direction, in the predetermined cross section, a second straight line is defined as an imaginary straight line passing through a portion spaced the wire width apart in the width direction from a second end in the width direction of the air core inductor wire or the magnetic core inductor wire and extending in the thickness direction, in the predetermined cross section, a third straight line is defined as an imaginary straight line passing through a portion spaced the wire thickness apart in the thickness direction from a first end in the thickness direction of the air core inductor wire or the magnetic core inductor wire and extending in the width direction, in the predetermined cross section, a fourth straight line is defined as an imaginary straight line passing through a portion spaced the wire thickness apart in the thickness direction from a second end in the thickness direction of the air core inductor wire or the magnetic core inductor wire and extending in the width direction, where, in the predetermined cross section, a peripheral region around the air core inductor wire or the magnetic core inductor wire is defined as a portion having a wiring portion removed from a region surrounded by the first straight line, the second straight line, the third straight line, and the fourth straight line, in the predetermined cross section including an intermediate position between the first air core outer terminal and the second air core outer terminal, a magnetic material content that is a content of magnetic material in the peripheral region around the air core inductor wire is less than 50%, in the predetermined cross section including an intermediate position between the first magnetic core outer terminal and the second magnetic core outer terminal, the magnetic material content in the peripheral region around the magnetic core inductor wire is greater than or equal to 50%, and the air core body and the magnetic core body are combined or integrated.

2. The inductor component according to claim 1, wherein in each of the predetermined cross section including the first end portion of the air core inductor wire and the predetermined cross section including the second end portion of the air core inductor wire, the magnetic material content in the peripheral region around the air core inductor wire is less than 50%, and in each of the predetermined cross section including the first end portion of the magnetic core inductor wire and the predetermined cross section including the second end portion of the magnetic core inductor wire, the magnetic material content in the peripheral region around the magnetic core inductor wire is greater than or equal to 50%.

3. The inductor component according to claim 2, wherein an effective magnetic permeability in the magnetic core coil is greater than or equal to 3 in a case where a frequency of current input to the magnetic core inductor wire is from 1 MHz to 50 MHz.

4. The inductor component according to claim 1, wherein an inductance of the magnetic core coil is greater than an inductance of the air core coil when the magnetic core coil is not magnetically saturated, and the inductance of the magnetic core coil is less than the inductance of the air core coil when the magnetic core coil is magnetically saturated.

5. The inductor component according to claim 4, wherein a direct current electric resistance of the air core coil is lower than a direct current electric resistance of the magnetic core coil.

6. The inductor component according to claim 5, wherein an area of the air core inductor wire included in the predetermined cross section of the air core inductor wire is greater than an area of the magnetic core inductor wire included in the predetermined cross section of the magnetic core inductor wire.

7. The inductor component according to claim 5, wherein a line length of the magnetic core inductor wire is longer than a line length of the air core inductor wire.

8. The inductor component according to claim 1, wherein the air core coil comprises a first air core coil and a second air core coil, and a direct current electric resistance of the first air core coil is lower than a direct current electric resistance of the second air core coil.

9. The inductor component according to claim 1, wherein the magnetic core coil comprises a first magnetic core coil and a second magnetic core coil, and an inductance of the first magnetic core coil is greater than an inductance of the second magnetic core coil.

10. The inductor component according to claim 1, wherein the magnetic core coil comprises a first magnetic core coil and a second magnetic core coil, and the magnetic core body of the first magnetic core coil contains a magnetic material different from a magnetic material contained in the magnetic core body of the second magnetic core coil.

11. The inductor component according to claim 1, wherein the magnetic core coil comprises a first magnetic core coil and a second magnetic core coil, and a volume of the magnetic core body of the first magnetic core coil is greater than a volume of the magnetic core body of the second magnetic core coil.

12. The inductor component according to claim 1, wherein the predetermined plane is parallel to the first main surface.

13. The inductor component according to claim 1, wherein the air core body and the magnetic core body are arranged in a direction along the first main surface, the inductor component further comprises an electrically insulative surface layer covering both a main surface of the air core body and a main surface of the magnetic core body, and the surface layer has the first main surface.

14. The inductor component according to claim 1, wherein the air core coil and the magnetic core coil are laminated in a direction perpendicular to the predetermined plane.

15. The inductor component according to claim 1, wherein the magnetic core body includes a plurality of magnetic layers laminated in a direction perpendicular to the predetermined plane, and of the plurality of magnetic layers, one of the magnetic layers is a low-content magnetic layer having a lower content of magnetic material than an other one of the magnetic layers.

16. The inductor component according to claim 15, wherein a bottom surface of the low-content magnetic layer is in a same plane with a bottom surface of the magnetic core inductor wire.

17. The inductor component according to claim 1, wherein the air core inductor wire and the magnetic core inductor wire are laminated in a direction perpendicular to the predetermined plane, and the air core inductor wire is disposed between the first main surface and the magnetic core inductor wire, and a lead wire electrically connecting the magnetic core inductor wire to a corresponding one of the magnetic core outer terminals and extending parallel to the predetermined plane is provided in the air core body.

18. The inductor component according to claim 1, wherein an electrically insulating layer that is in contact with the magnetic core inductor wire is provided in the magnetic core body.

19. A DC-DC converter comprising:

the inductor component according to claim 1;

a first switching element for the air core coil electrically connected to the air core coil; and a second switching element for the magnetic core coil electrically connected to the magnetic core coil.

20. The DC-DC converter according to claim 19, wherein when a load current is less than or equal to a predetermined current, the first switching element for the air core coil turns off and the second switching element for the magnetic core coil turns on, and a current flows through the magnetic core coil, and when a load current exceeds the predetermined current, the first switching element for the air core coil turns on and the second switching element for the magnetic core coil turns off, and a current flows through the air core coil.

* * * * *